US010919745B2

(12) United States Patent
Perlstein

(10) Patent No.: US 10,919,745 B2
(45) Date of Patent: Feb. 16, 2021

(54) AUTOMATING THE OPERATION OF VEHICLE LIFTS

(71) Applicant: Baldomar Systems LLC, Niskayuna, NY (US)

(72) Inventor: Zachary Perlstein, Amsterdam, NY (US)

(73) Assignee: MOHAWK LIFTS LLC, Amsterdam, NY (US)

( * ) Notice: Subject to any disclaimer, the term of this patent is extended or adjusted under 35 U.S.C. 154(b) by 0 days.

(21) Appl. No.: 16/694,598

(22) Filed: Nov. 25, 2019

(65) Prior Publication Data

US 2020/0087126 A1 Mar. 19, 2020

Related U.S. Application Data

(63) Continuation of application No. 15/603,320, filed on May 23, 2017, now Pat. No. 10,538,418.

(51) Int. Cl.
*B66F 3/46* (2006.01)
*B66F 7/28* (2006.01)
(Continued)

(52) U.S. Cl.
CPC ............... *B66F 3/46* (2013.01); *B66F 7/20* (2013.01); *B66F 7/28* (2013.01); *G05D 1/0297* (2013.01); *G05D 2201/0216* (2013.01)

(58) Field of Classification Search
CPC ..... B66F 3/46; B66F 7/28; B66F 7/20; G05D 1/0297; G05D 2201/0216
See application file for complete search history.

(56) References Cited

U.S. PATENT DOCUMENTS

| 5,954,160 | A | 9/1999 | Wells et al. |
| 6,182,796 | B1 | 2/2001 | Perlstein et al. |

(Continued)

FOREIGN PATENT DOCUMENTS

| CN | 2050033 | 12/1989 |
| FR | 2972183 | 9/2012 |

OTHER PUBLICATIONS

Chitre, Mandar. "DSAAV—A distributed software architecture for autonomous vehicles." Oceans 2008. IEEE, 2008 (Year: 2008).
(Continued)

*Primary Examiner* — Alan D Hutchinson
(74) *Attorney, Agent, or Firm* — Heslin Rothenberg Farley & Mesiti P.C.

(57) ABSTRACT

Techniques are disclosed for methods and systems for automating the operation of vehicle lifts in the servicing of automotive vehicles. The lifts may be motorized mobile column lifts and/or fixed lifts, including two-post lifts with swing-arms and a variety of drive-on lifts. Motorized mobile lifts have a motorized transport mechanism. A guidance system first assigns available motorized mobile lifts to the axled wheels of a vehicle and then directs their transport mechanism for transporting them to their engagement locations. It also guides the engagement of both the motorized mobile lifts and the fixed lifts in the service center. A number of technologies may be used for this purpose, including sensors onboard the vehicles and/or the lifts and/or the service center. A computer vision pipeline may also be utilized to assist in the process. Machine learning may also be employed. Techniques are also extended to autonomous vehicles as well as interfacing with fleet management software.

25 Claims, 27 Drawing Sheets

(51) Int. Cl.
*B66F 7/20* (2006.01)
*G05D 1/02* (2020.01)

(56) References Cited

U.S. PATENT DOCUMENTS

| | | |
|---|---|---|
| 6,279,685 B1 | 8/2001 | Kogan et al. |
| 6,315,079 B1 | 11/2001 | Berends et al. |
| 6,634,461 B1 | 10/2003 | Baker |
| 6,983,196 B2 | 1/2006 | Green et al. |
| 7,191,038 B2 | 3/2007 | Green et al. |
| 7,219,770 B2 | 5/2007 | Baker |
| 7,644,807 B2 | 1/2010 | Finkbeiner |
| 8,083,034 B2 | 12/2011 | Bordwell et al. |
| 8,282,075 B2 | 10/2012 | Chan |
| 8,313,086 B2 | 11/2012 | Gray et al. |
| 8,567,761 B2 | 10/2013 | Jong et al. |
| 9,365,128 B2 | 6/2016 | Sarkar et al. |
| 9,376,296 B2 | 6/2016 | Nussbaum |
| 9,679,421 B2 | 6/2017 | Jaipaul et al. |
| 9,940,840 B1 | 4/2018 | Schubert et al. |
| 2008/0116013 A1 | 5/2008 | Vandewinckel et al. |
| 2009/0288918 A1 | 11/2009 | Schmitt |
| 2011/0097187 A1 | 4/2011 | Kelley et al. |
| 2013/0240300 A1 | 9/2013 | Fagan et al. |
| 2014/0264203 A1 | 9/2014 | Elliott |
| 2014/0324214 A1 | 10/2014 | Elliott |
| 2015/0307334 A1 | 10/2015 | Houten et al. |
| 2016/0272471 A1 | 9/2016 | Jaipaul |
| 2016/0275729 A1 | 9/2016 | Jaipaul et al. |
| 2017/0050623 A1 | 2/2017 | Betz |
| 2018/0265929 A1 | 9/2018 | Zuckerman et al. |

OTHER PUBLICATIONS

Krig, "Computer Vision Metrics", Chapter 8: "Vision Pipelines and Optimizations", May 23, 2014, pp. 313-363.
Rotarylift, "Rotary MCH19 FLEX Mobile Lifting System", www.rotarylift.com, Apr. 17, 2017, 5 pgs.
Rotary, "Shockwave Lift", www.rotarylift.com/shockwave, May 17, 2017, 2 pgs.
Revathi, G., et al., "Smart Parking Systems and Sensors: A Survey", Conference Paper, DOI:10.1109/ICCCA.2012.6179195, Anna University of Technology, Tamil Nadu, India, Feb. 2012, 5 pgs.

AUTOMATING THE OPERATION OF VEHICLE LIFTS

FIELD OF THE INVENTION

This invention relates generally to vehicle lifts and more specifically to automating the operation of automotive vehicle lifts.

BACKGROUND ART

In recent years, there has been significant investment in the industry in the area of automotive vehicle maintenance operations. This investment has been heavy in shop or facility or service center optimization for increasing the efficiency of the technician/worker as well as their effectiveness and safety. From shop design and scheduling systems to integration of handheld devices for personal display of vehicles diagnostics, investments in Lean Operations are paying off in terms of human capital efficiency, volume, and margin. Fleet managers frequently measure service center efficiency in terms of percentage of labor hours billed, and number of jobs completed/vehicle turnover. Service providers operate under the assumption that improving these metrics increases service center profitability.

Automotive technicians spend approximately fifteen to twenty minutes per service order, or approximately seventy-five minutes per day when servicing five vehicles, on the following routine exercises: retrieving the vehicle from the service center parking lot, driving it to the service bay equipped with a suitable vehicle lift, aligning it to the vehicle lift, manually positioning the lift to the vehicle lifting points to ensure a secure and safe hoist, disengaging the lift from the vehicle, and subsequently returning the vehicle to the service center parking lot once the service has been completed. This time typically depends on service center setup, vehicle type and vehicle lift type.

As a general rule, it is required to raise a vehicle above ground in order to perform various services, such as inspection, repair or other maintenance on the vehicle. For this purpose, various types of lifts have been devised in the industry. The lifts of particular relevance for the present disclosure are lifts that require a non-trivial amount of human/technician expertise and/or time for properly aligning and engaging them with the vehicle being serviced. Such lifts may be frame-engaging or wheel-engaging, they may be mobile or fixed lifts, and they may be drive-on or in-ground type.

A mobile column lift is a lift in which a manually moveable column or vertical lift is used at each axled wheel of an automotive vehicle. As such, these are by design wheel-engaging lifts, but with appropriate frame adapters, such as bumper-adapters, they can be converted into frame-engaging lifts as well. The column lifts are coordinated by a control system that supervises the lifting and lowering of the vehicle in a controlled, safe and stable manner. A representative prior art mobile column or vertical lift 100 is depicted in FIG. 1A. FIG. 1A shows a left isometric view of a column/vertical lift 100 having a carriage assembly 102. Carriage assembly 102 of lift 100 has an engagement mechanism 104 for engaging an axled wheel of a vehicle.

The lift also has two resting arms 112A and 112B that rest on the ground as carriage assembly 102 with its engagement mechanism 104 lifts an axled wheel of a vehicle. There is also a hand-truck or dolly or tie-bar mechanism 106 with its handle 108 using which a technician can manually transport lift 100 on three wheels 110A, 110B and 110C to a desired engagement location. The engagement location is in a service bay of a service shop/facility where the vehicle is being serviced.

FIG. 1B shows lift 100 in its raised position. In this position, engagement mechanism 104 is engaged with an axled wheel 120 of a vehicle being serviced. FIG. 1B also shows axle 122 of wheel 120 while the rest of the vehicle is omitted from the drawing to avoid detraction. Note that FIG. 1B shows the vehicle being serviced raised above ground so a technician or service/repair person can view the underside of the vehicle. In this position, resting arms 112A and 112B firmly rest on the ground for stably supporting/compensating the weight of the vehicle that is in turn being held in the raised position by carriage assembly 102 and its corresponding engagement mechanism 104.

Obviously, FIG. 1A-B show one column/vertical lift 100 of a system of presumably several lifts. One mobile column/lift such as lift 100 is used to raise each axled wheel of the vehicle being serviced. The rest of the mechanical or electrical componentry of the lift, including any lifting gears, hydraulics, motors, etc. are well known to those skilled in the art, and are not explicitly shown in FIG. 1A-B.

There are many different techniques in the prior art that describe the use of such mobile column lifts. Lift manufacturers have continually developed and integrated technology into their products to increase the percentage of labor hours billed and the vehicle turnover per lift or bay per day. For example, Rotary Lift has released its remote-control product Rotary MCH19 FLEX Mobile Lifting System to control mobile column lifting and lowering from a distance. Also Rotary Shockwave increases the lifting speed to increase productivity, which the Rotary Lift Shockwave ROI Calculator claims can increase vehicle turnover by one vehicle per week per lift, simply by cutting approximately thirty seconds off lifting time.

U.S. Patent Publication No. 2011/0097187 A1 to Kelley et al. discloses a mobile column lift system comprising a column lift and one or more laser modules. The lift includes one or more lifting members that are operable to selectively raise and lower a vehicle. The laser modules are operable to emit at least one laser beam to provide a visual indicator on a vehicle positioned relative to the one or more lifting members. The visual indicator may include a line, crosshairs, target, dot, including combinations and patterns. The visual indicator may flash or remain solid. The visual indicator may be any color. One or more sensors may provide activation and/or de-activation of the laser modules in response to sensing the presence of a vehicle. An operator may view the visual indicator on the vehicle to confirm proper positioning of the vehicle relative to the lifting members.

U.S. Pat. No. 8,083,034 B2 to Bordwell et al. teaches a lift control interface operable to control and monitor a mobile column lift system for its vertical lifting/lowering operations. Each column lift in the system has such a lift control interface. The lift control interface allows a user to assign column lifts to a lift system. One or more of the assigned lifts may be assigned to a column control group. The user may lock the selection of these columns. The status of the assigned, selected, and locked lift columns may appear on every lift control interface in the lift system. The user may govern operation of the selected columns in the column control group from a single control interface, such as any control interface at any of the selected lifts. The lift control may include visual representations showing the relationships between the column lifts and a vehicle, such as with lift column icons being positioned around a vehicle icon.

U.S. Pat. No. 8,567,761 B2 to Jong et al. discloses a system and method for lifting and lowering an object such as a vehicle. It uses at least two mobile column lifts, communication means for communication with the two column lifts and a position-determining means for carrying out a position determination for each of the two column lifts. It also has a selection means for selecting at least one of the column lifts on the basis of the position determination.

It further has a control unit co-acting with the communication means during use for the purpose of controlling the column lifts selected with the selection means.

U.S. Pat. No. 6,634,461 B1 to Baker teaches a mobile column lift system that coordinates the raising and lowering of a vehicle relative to a surface by using wireless communications. The lift system includes at least two lift mechanisms each having a post, a carriage, an actuating device and a control device. The carriage is slidably coupled to the post and is adapted to support a portion of the vehicle. The actuating device is coupled with the carriage and is capable of moving the carriage relative to the post. The control device is coupled with the actuating device and is capable of communicating by wireless signals with the other control device. The control devices communicate by wireless signals to coordinate the movement of the carriages relative to the posts to raise or lower the vehicle. Further, a rechargeable battery can provide power to the control device to allow for increased mobility of the lift system.

U.S. Patent Publication No. 2014/0324214 A1 to Elliott teaches a lift control system and method including a plurality of mobile column lifts with a lift unit having a lift mechanism configured to respond to a motion command. It also includes a lift processor configured to determine a lift speed value, and a lift transceiver configured to transmit the lift speed value. The lift control system further includes a central control unit having a central transceiver configured to receive the lift speed value from the lift control unit. The central processor is configured to determine a communicated speed value in response to the lift speed value. The lift transceiver is operable to receive the communicated speed value and the lift processor is operable to modify a lift operating speed of the lift mechanism in response to the communicated speed value and the motion command.

After a brief review of mobile column lifts of the prior art, let us now review fixed vehicle lifts. A fixed lift obviously stays attached to the service bay where it is installed in a service center or shop or facility. A typical configuration, called a fixed column lift is a lift that has arms to engage an automotive vehicle. Typically, the arms are swing-arms that extend underneath the vehicle. These lifts are typically frame-engaging lifts, but with appropriate wheel adapters, they can be turned into wheel-engaging lifts as well.

FIG. 1C shows a two-post fixed lift system 150 consisting of a fixed lift, column or post 152A and another fixed lift, column or post 152B. Lift 150 has carriage assemblies 154A and 154B that move up and down in columns 152A and 152B respectively powered by the motors shown. Note that in the left isometric view of lift 150 shown in FIG. 1C, only carriage assembly 154B is visible. The lift engages with a vehicle using swing-arms 156A, 156B attached to carriage assembly 154A, and swing-arms 156C, 156D attached to carriage assembly 154B. Note that swing-arm 156B is not visible in the view shown in FIG. 1C but is presumed to exist.

Swings arms 156A-D are also telescopic and can extend inward or outward as shown. Further, swing-arms 156A-D can swing or rotate or pivot about their axes. At the end of each swing-arm of fixed lift 150, there is a lift pad or support plate, which eventually makes contact with a lifting point of the vehicle during its lifting/lowering. Specifically, there is a lift pad 158A at the end of swing-arm 156A, lift pad 158B at the end of swing-arm 156B, and so on. Similarly to the mobile column lifts, there are many prior art references that discuss such a fixed two-post or twin lift configuration with swing-arms.

U.S. Pat. No. 9,376,296 B2 to Nussbaum teaches a fixed two-post hoist/lift with two lifting columns arranged at both sides of a vehicle. Each lift has two support arms that are supported in a horizontally pivotal and longitudinally adjustable fashion at the lifting column, and each having at their free end a support plate. The support plates are position-able at support positions underneath a vehicle as specified by the vehicle manufacturer by an appropriate movement of the support arm. The manufacturer support positions are saved as target positions according to corresponding vehicle model in a data memory of the hoist.

The system allows for a semi-automatic or automatic operation by employing a camera affixed in the service bay above the vehicle for optically detecting the contour of the vehicle in reference to the hoist. The coordinates of actual positions of the support plates of the hoist are determined by measurements and perhaps calculations. A computer makes a comparison between the target and actual coordinates, and enables a lifting process of the support arms only when differences between the target and the actual coordinates are within a predetermined tolerance.

U.S. Pat. No. 6,279,685 B1 to Kogan et al. teaches a twin post lift system with a master and slave cylinder. The master and slave cylinders each drive a lifting carriage, and each of the lifting carriages is mounted within, and is restricted to longitudinal travel within an upright/vertical member. In the event that there is a loss of pressure in the hydraulic system under load, it is important that the lift be prevented from descending unexpectedly, or uncontrolledly. The upright member can be manufactured in the form of a roll formed channel section.

The legs of the channel section are formed to define guides for guide followers mounted on the lifting carriage, thereby restraining the travel of the lifting carriages to travel in the vertical direction. The lifting carriage has a rack formed on its back face. The rack is nested within the upright member and is not visible in use. The back of the channel is formed with an outwardly protruding step to accommodate the rack. A safety stop, in the nature of a spring-loaded safety dog, is mounted to the upright member and extends through the wall of the protrusion to engage the rack.

U.S. Pat. No. 5,954,160 to Wells et al. discusses a wheel engaging vehicle lift for raising a vehicle relative to the ground and for supporting the vehicle in a raised position. It includes first and second support columns standing vertically upward from the ground. A first carriage is movably attached to the first support column and a second carriage is movably attached to the second support column. A first pair of arms extend away from the first carriage and a second pair of arms extend away from the second carriage. The first and second pairs of arms are each rotatable about a substantially vertical axis proximate to a first end of the arms. A wheel engaging adapter is removably secured proximate to an opposite end of the first and second pairs of arms. The adapters are each rotatable about a substantially vertical axis proximate to the second end. The structure enables a conventional two-post frame-engaging lift to be converted into a two-post wheel-engaging vehicle lift, and vice versa.

It is easily observed that the prior art only teaches systems of lifts where a technician is required for the proper positioning of the lift underneath the vehicle. The technician may perform this operation either completely manually or with some opticalaid. In the case of mobile column lifts, the technician is also required to transport the column lift, such as lift 100 of FIG. 1A-B to its engagement location. This is accomplished by the technician by using a hand-truck/dolly/tie-bar mechanism 106, handle 108 and wheels 110A-C as shown in FIG. 1-B. In the case of two-post fixed lifts, the technician is required to position arms 156A-D and lift pads 158A-D of lift 150 of FIG. 1C underneath the lifting points of the vehicle for safe hoisting.

Thus, a key limitation of the prior art is that it fails to disclose vehicle lifts whose operation can be fully automated. In the case of mobile column lifts, this automation may involve motorization of the transport mechanism of mobile column lifts so that they are self-propelled or self-guided. In the case of both fixed and mobile column lifts, this automation may further involve motorization/automation of their engagement mechanism to engage with the vehicle.

Explained further, there are no teachings in the prior art that would enable mobile column lifts to automatically transport to and engage with an automotive vehicle without requiring a technician or requiring only a minimal assistance of a human technician. Similarly, there are no prior art teachings that provide for automating the engagement of fixed column lifts for properly positioning the swing-arms underneath the vehicle without requiring technician assistance.

There are also no teachings in the traditional art that will enable an autonomous vehicle to automatically drive itself to a service bay with a suitable lift in a service center when a service of the vehicle is due. The prior art also does not teach any techniques where sensors present onboard the vehicles (autonomous or otherwise) are used to assist in the above mentioned automatic transportation and/or engagement of the lifts. The prior art also does not effectively utilize sensors deployed on the lifts themselves and/or the environment for the above mentioned automation.

An advantage of such a system will be reduced technician time and labor costs, thereby positively influencing the economics of the system and the bottom-line of the service center. That is because, currently vehicle retrieval and engagement process takes a significant percentage of the overall technician time required in a service order. Further, according to industry leaders, ninety percent of accidents are related to human errors, and technicians face both incidental and chronic injuries due to workplace conditions.

Thus, such a system would also have the advantage of increasing worker safety because the majority of vehicle lift accidents occur as a result of human error during engaging the vehicle lift with the vehicle. The improvement in worker safety would lead to a reduction in missed work days due to an improvement in technician workplace ergonomics, as well as avoidance of missed days due to injuries. This will also lead to a reduction in insurance expenses for the service center. Additionally, such a system absent from the prior art, would also minimize potential damage to the vehicle by incorrect positioning of the lifts by human technicians.

OBJECTS OF THE INVENTION

In view of the shortcomings of the prior art, it is an object of the present invention to provide methods and apparatus/systems for automating the operation of vehicle lifts.

It is also an object of the invention to motorize the transport of mobile column lifts so that they are motorized, self-propelled or self-guided.

It is further an object of the invention to provide for methods and apparatus/systems for automating the engagement process for a fixed two-post lift system, as well as that of a motorized mobile column lift system.

It is also an object of the invention to provide for above mentioned automation for both autonomous and semi/non-autonomous vehicles.

It is also an object of the invention to embed sensors onboard the vehicles to assist in the above mentioned automation.

It is yet another object of the invention to reduce the technician time required to operate mobile and fixed vehicle lifts.

It is still another object of the invention to improve worker safety and ergonomics in the service center via automation of the vehicle lifts.

Still other objects and advantages of the invention will become apparent upon reading the detailed description in conjunction with the drawing figures.

SUMMARY OF THE INVENTION

The objects and advantages of the invention are secured by methods and systems for operating a number of automotive lifts. The lifts may be motorized mobile column lifts or fixed lifts.

Each motorized lift has a motorized transport mechanism for automatically transporting it from its present location to its destination in a motorized/automatic fashion. This is a key distinguishing aspect of the invention over the prior art.

The transport mechanism preferably includes a powering mechanism and a steering mechanism. Each lift also has an engagement mechanism for engaging with an axled wheel of a vehicle. A computerized guidance system first assigns available mobile lifts to at least four opposite-facing axled wheels/tires of an automotive vehicle. It then directs/guides the transport mechanism of the assigned motorized mobile lifts commencing their travel/transportation from their current locations and ending at their respective destinations.

The current location of an assigned mobile lift may be a designated home location or the service bay where an earlier vehicle was serviced. More specifically, the current location may be a pre-engagement location to which the lift would have moved to after disengaging from the vehicle already serviced. The destination may be the engagement location underneath the corresponding/assigned axled wheel of an un-serviced vehicle.

Once all mobile lifts have engaged with at least four opposite-facing wheels of the vehicle, a control system manages/controls the raising/lowering of the vehicle. In the preferred embodiment, the lifts can communicate with each other as well as any backend system via a wired or wireless means/modes of communication. The backend system may be the backend/server component of the guidance system. During transportation, the wireless mode of communication is obviously preferred.

In the preferred embodiment, the engagement mechanism of the motorized mobile lifts is adjustable so that it can accommodate wheels of varying sizes/diameters. The adjustable engagement mechanism may be adjusted by manual or motorized means. The clearance of the engagement mechanism is kept sufficiently less than the diameter of the wheel for a safe and stable lift.

In another embodiment, the guidance system uses the make and/or model number of the vehicle to determine the size/diameter of its wheels. This way it can automatically adjust the motorized engagement mechanism of each assigned mobile lift. For engagement to occur, an assigned lift first arrives at a pre-engagement location. The pre-engagement location is a location laterally to the side of the wheel to which the lift is assigned. The lift then turns so that its engagement mechanism faces the wheel. It then moves forward to its ultimate engagement location.

The engagement location is the location directly underneath the wheel to which the motorized mobile lift is assigned. The assigned lift needs to be at this engagement location for the vehicle to be raised or lowered by the lift. During disengagement from the wheel, the lift moves backwards again to its pre-engagement location from prior to the engagement. Of course, engagement and disengagement can only occur when the lift is in its lowered position. Generally, a jack up operation is required before any transportation of the motorized mobile lifts, and a jack down operation is required before they can be used for lifting a vehicle. Typically, while not lifting a vehicle or not in operation, the lifts are in their jacked down state.

The types of services performed on the vehicle once the vehicle is raised include inspection, maintenance, repair/replacement or any other services. Preferably, the lifts are locked/synchronized in conjunction with the control system before raising and lowering of the vehicle in a safe and stable manner. Advantageously, the motorized mobile lifts are also used to service autonomous vehicles. The autonomous vehicles drive automatically to an appropriate empty service bay by virtue of their own self-navigation or in conjunction with the guidance system.

In another preferred embodiment, the guidance system utilizes any combination of sensors, computer vision and machine learning in its guidance of the transport mechanism of the mobile lifts. The sensors may be installed in the service bays, the overall service center as well as the lifts themselves. In the preferred embodiment, the sensors are only installed on the lifts, so that no retrofitting of the service center is required. Preferably, the guidance system guides the transportation of the lifts so that collisions and bottlenecks of the lifts are avoided/minimized.

Sensors used by the system include but are not limited to cellular transceivers, Global Positioning System (GPS) sensors, Wi-Fi transceivers, WiMax transceivers, Ultra-wideband (UWB) sensors, Lidars, radars, sonars, Bluetooth transceivers, beacons, ZigBee sensors, IPv6 over Low power Wireless Personal Area Networks (6LoWPAN) sensors, accelerometers, gyroscopes, vibration sensors, optical flow sensors, compasses, magnetometers, Hall effect sensors, acoustic sensors, microwave sensors, ultrasonic sensors, infrared sensors, radio frequency identification (RFID) sensors, angle sensors, laser based obstruction sensors, image sensors, cameras, and compression sensors, among others.

Guidance system may use an indoor positioning system (IPS) or an IPS-like solution to achieve its objectives. It may also use any suitable stages of a computer vision pipeline to achieve its objectives. Furthermore, it may utilize supervised and unsupervised machine learning in conjunction with computer vision. Advantageously, the lifts travel only on a designated path in the shop or facility. This simplifies the guidance and navigation of the lifts required.

In a highly preferred set of embodiments, sensors are present onboard the vehicles themselves for assisting in the automation. This is another key innovation of the present technology. These sensors may be integrated into the vehicles during their manufacturing process, or they may be installed on the vehicles afterwards. These sensors are then used to communicate the engagement locations of the vehicles to the lifts. The guidance system uses this information to guide the transport mechanism of the lifts to transport them to their corresponding engagement locations. It also guides their eventual engagement locations underneath corresponding assigned axled wheels of the vehicle.

Sensors present on the vehicles include but are not limited to cellular transceivers, Global Positioning System (GPS) sensors, Wi-Fi transceivers, WiMax transceivers, Ultra-wideband (UWB) sensors, Lidars, radars, sonars, Bluetooth transceivers, beacons, ZigBee sensors, 6LoWPAN sensors, accelerometers, gyroscopes, vibration sensors, optical flow sensors, compasses, magnetometers, Hall effect sensors, acoustic sensors, microwave sensors, ultrasonic sensors, infrared sensors, radio frequency identification (RFID) sensors, angle sensors, laser based obstruction sensors, image sensors and cameras. The lifts may again traverse a predesignated path in the service center or in other variations, the path may be dynamically computed. Other features and aspects of the previous embodiments of the instant motorized mobiles lifts, including locking, raising, lowering, disengagement, use of computer vision techniques, etc. also apply to the present embodiments employing sensors onboard the vehicles.

In another highly useful set of variations, sensors onboard the vehicles are used to automate the engagement process of fixed lifts with swing-arms. More specifically, the swing-arms have lift pads which eventually make contact with the vehicle at their respective engagement locations. The engagement locations in the present embodiments consist of prescribed lifting points or regions on the vehicle, typically on its chassis/frame on its underside. Preferably, the engagement locations for the vehicle are determined based on vehicle parameters such as vehicle make/model, vehicle length, vehicle width, diameter of the tires, locations and sizes of the axles, etc. Sensors onboard the vehicle then communicate these engagement locations to the lifts, and more specifically to the guidance system.

The guidance system then guides the swing-arms and lift pads of the fixed lift system to engage with the vehicle at the lifting points within a prescribed tolerance for safe hoisting/lifting of the vehicle. This results in a fully automated and technician-less operation for such a fixed lift system. Sensors present in the service bay and/or the service center and/or on the lifts themselves may also be used to assist in this process. Sensors on the lifts may be present either in an integrated or a retrofitted manner. Moreover, cameras on the vehicles, and/or the service bay and/or the lifts and an associated computer vision pipeline may also be deployed for this automation. Machine learning may also be used in conjunction with computer vision.

Once again, a control system manages/controls the raising/lowering of the vehicle by the fixed lifts in a synchronized manner. Preferably, the lifts are locked/synchronized in conjunction with the control system before raising and lowering of the vehicle. The benefits of sensors onboard the vehicle are also extended to the previous embodiments employing motorized mobile column lifts to assist in guiding their transport mechanism and/or engagement mechanism.

In another very useful set of embodiments, the present techniques are extended to autonomous vehicles with onboard sensors. Autonomous vehicles are automatically directed by the guidance system to the service bay where they are to be serviced. Guidance system may use the make/model, dimensions and weight of the autonomous vehicle to determine an appropriate service bay with an appropriate lift for the service of the vehicle.

Guidance system then computes a path in the facility for the autonomous vehicle to travel to safely arrive at its service bay. Alternatively, the autonomous vehicle locates an available service bay in the service center by itself and drives to it without any guidance from the guidance system. Preferably, the guidance system and the vehicle cooperate together for the vehicle to arrive at the precise location where to securely engage with the lift.

Preferably, sensors/cameras in the service bay/center and/or the lifts are also utilized for the above automation. Preferably, a computer vision pipeline is also employed. Still preferably, machine learning is also used in the above automation. Lifts in the service center may be motorized mobile column lifts or fixed lifts. Fixed lifts include but are not limited to drive-on (for example, scissors, parallelogram and wheel alignment), in-ground as well as multi-post (for example, runway) lifts.

In another useful set of embodiments, the instant lifts interface with a fleet management system using an application programming interface (API). Preferably, it is the guidance system which integrates with the fleet management system. The advantage of this integration is that the guidance system knows in advance when a vehicle is scheduled for its routine maintenance or for some other service. This further automates the vehicle fleet maintenance process and reduces vehicle downtime. The benefits of this integration with a fleet management system are accrued by both fixed and motorized mobile lifts, as well as embodiments employing sensors onboard autonomous or semi/non-autonomous vehicles.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

Figure 3A:
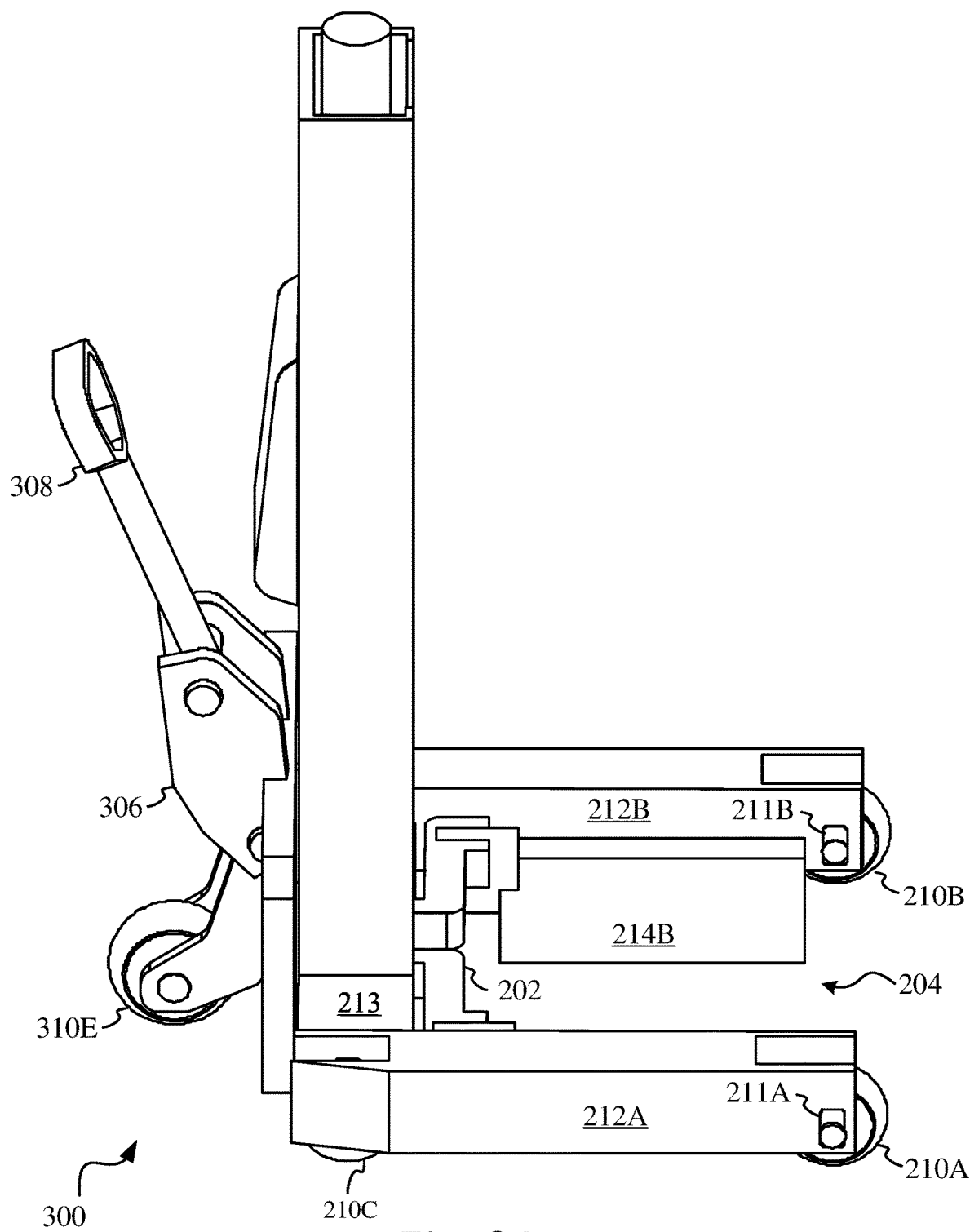

FIG. 3A shows a side view of a lift with a motorized transport mechanism according to the instant principles. The lift also has a manual hand-truck/dolly/tie-bar mechanism. The view is slightly tilted outwards toward the reader to more clearly show the engagement mechanism and both the resting arms of the lift.

Figure 3B:
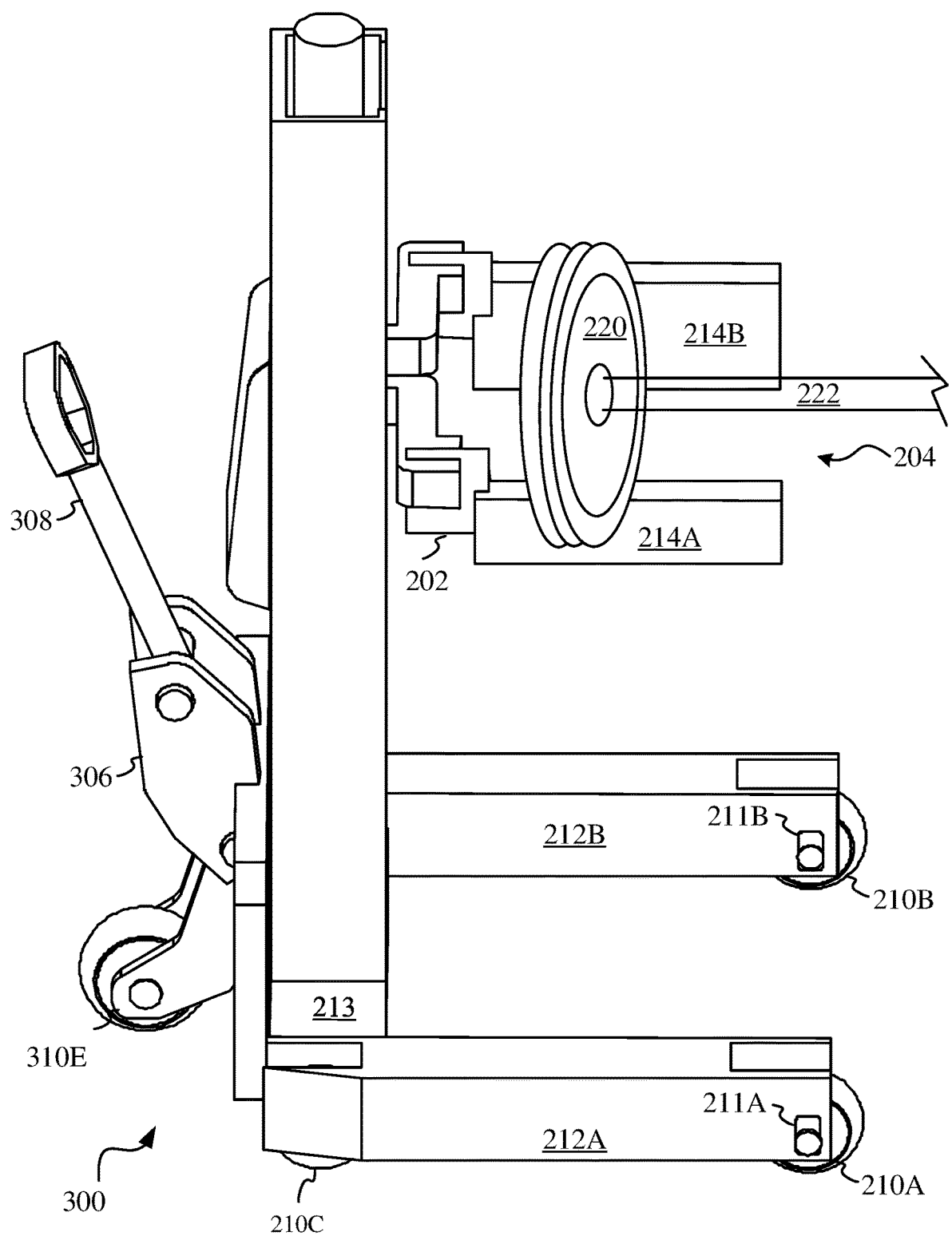

FIG. 3B shows the lift of FIG. 3A in its raised position showing an axled wheel of a vehicle raised above ground.

Figure 4A:
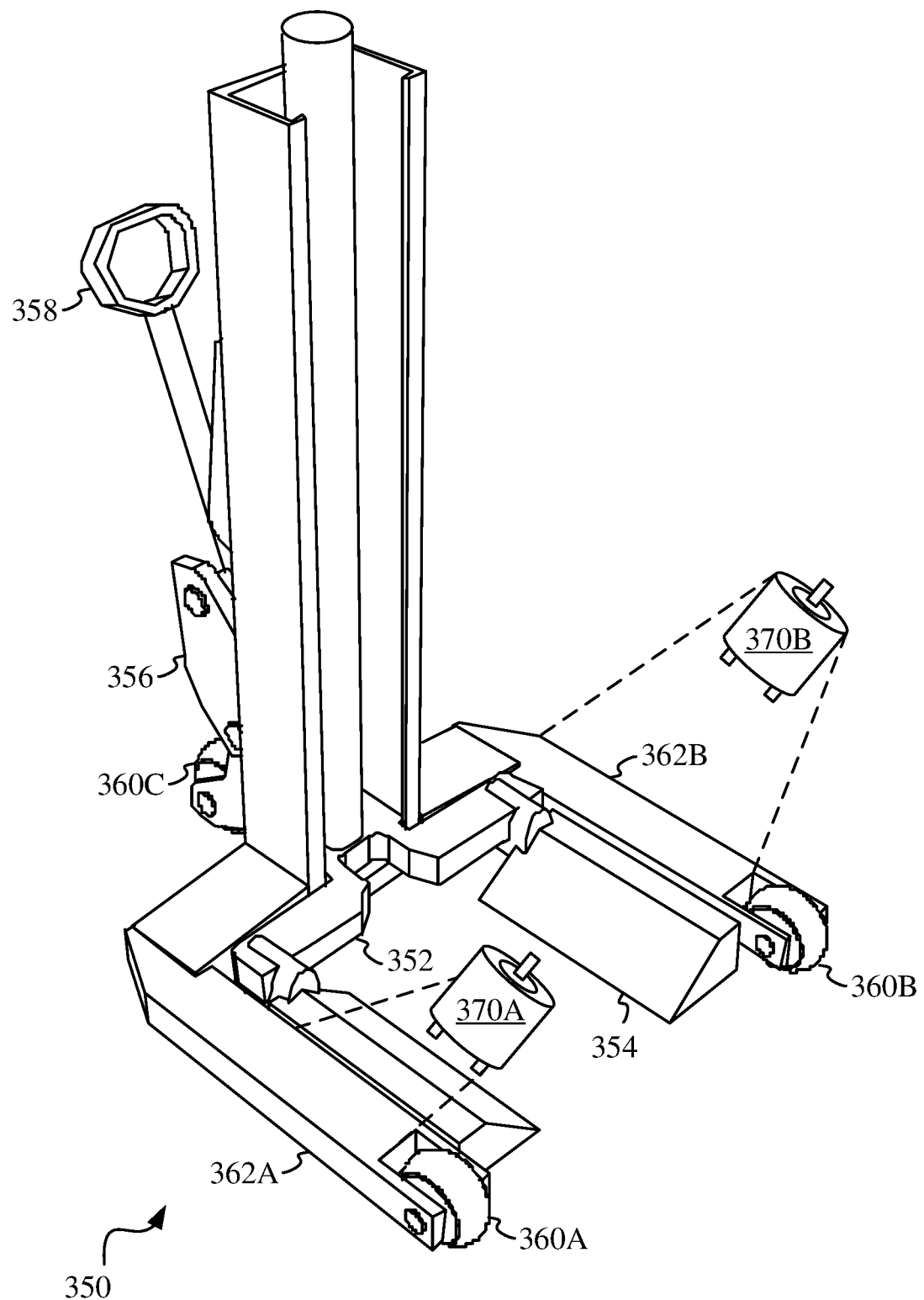

FIG. 4A shows a left isometric view of a motorized mobile lift with three motorized wheels 360A-C. The drawing figure shows the lift in its lowered position.

Figure 4B:
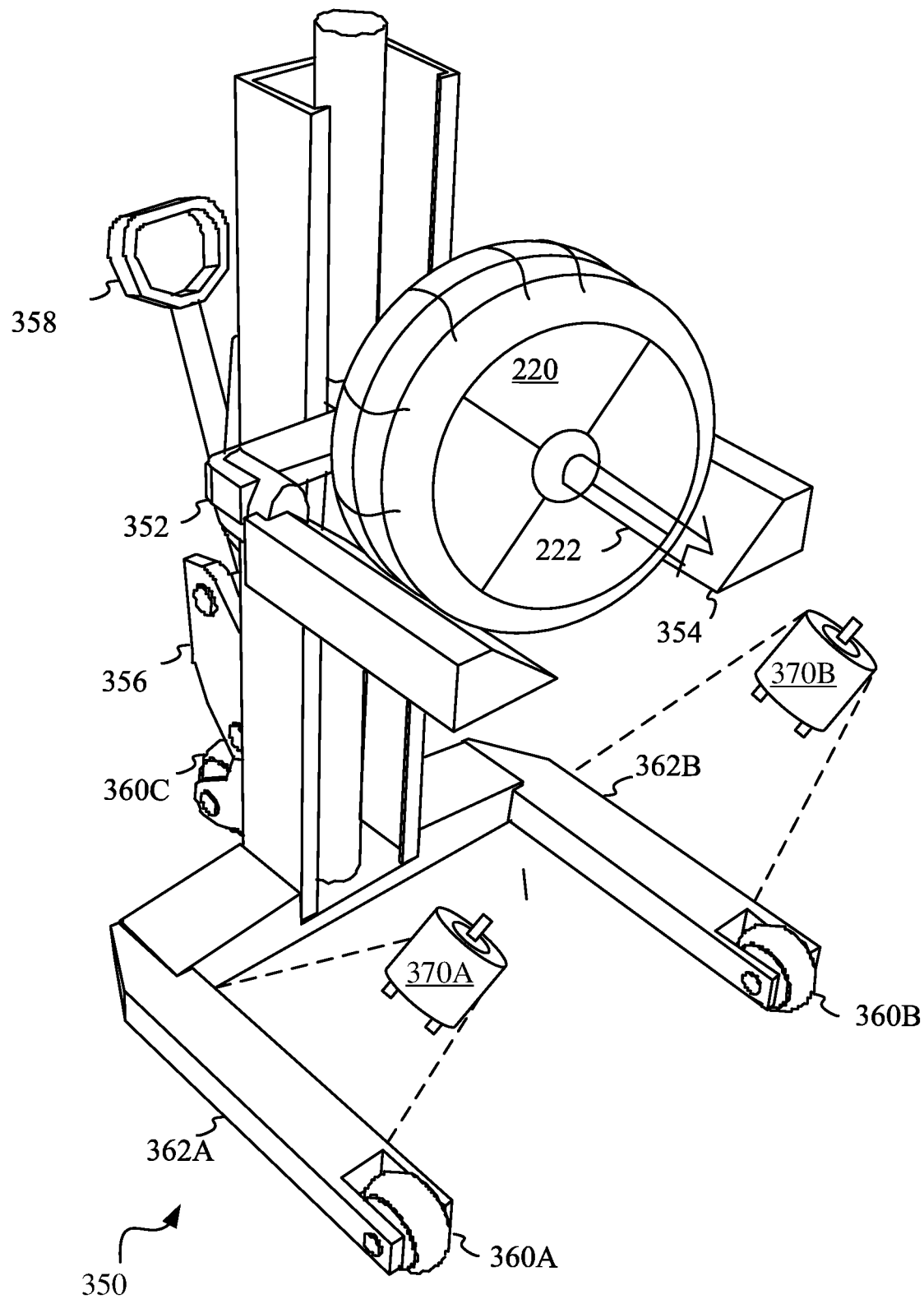

FIG. 4B shows the lift of FIG. 4A in its raised position showing an axled wheel of a vehicle raised above ground.

Figure 5:
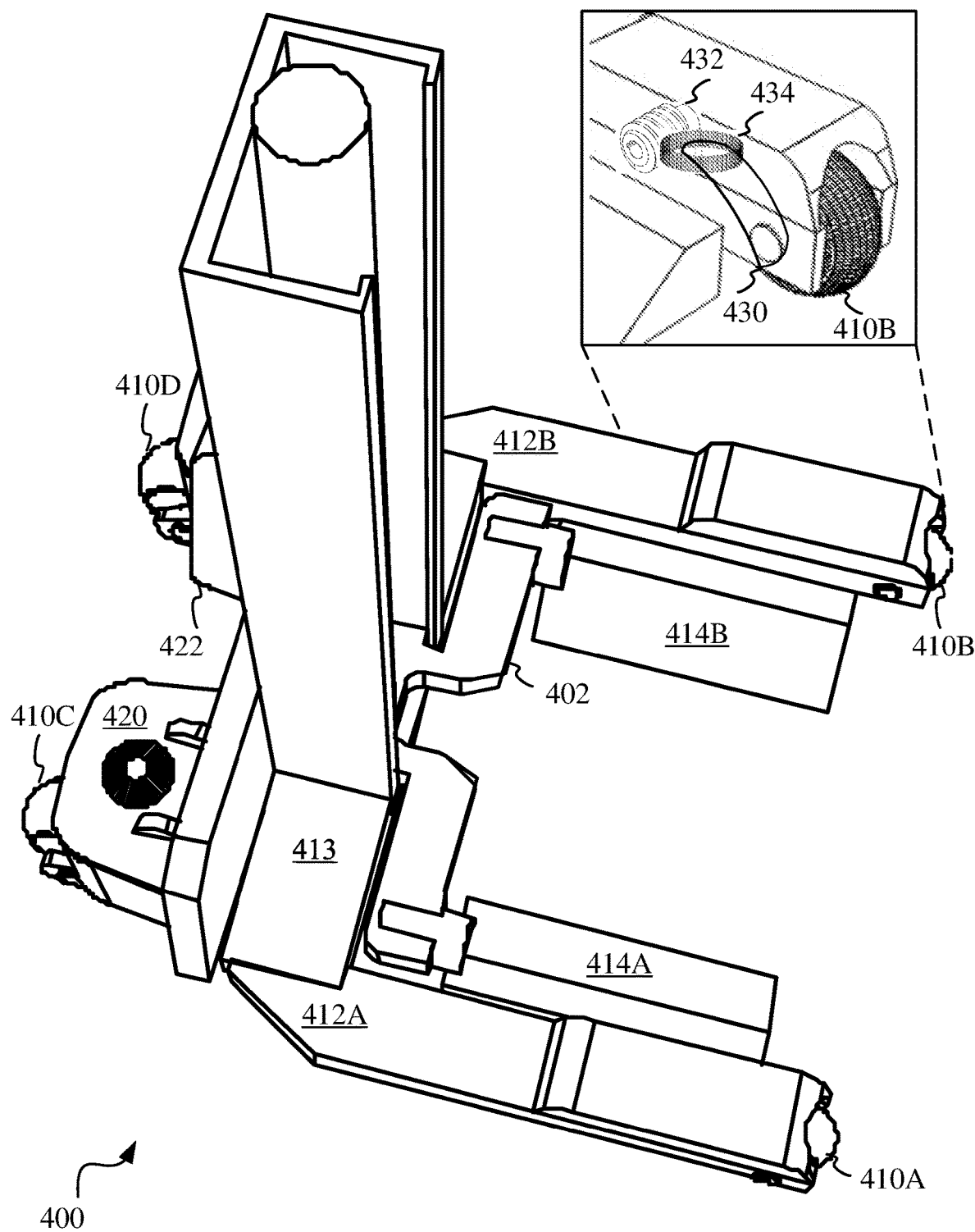

FIG. 5 shows the perspective view of another lift according to the instant design. The lift has a motorized transport mechanism powering the rear wheels, and a steering mechanism associated with the front wheels.

Figure 6:
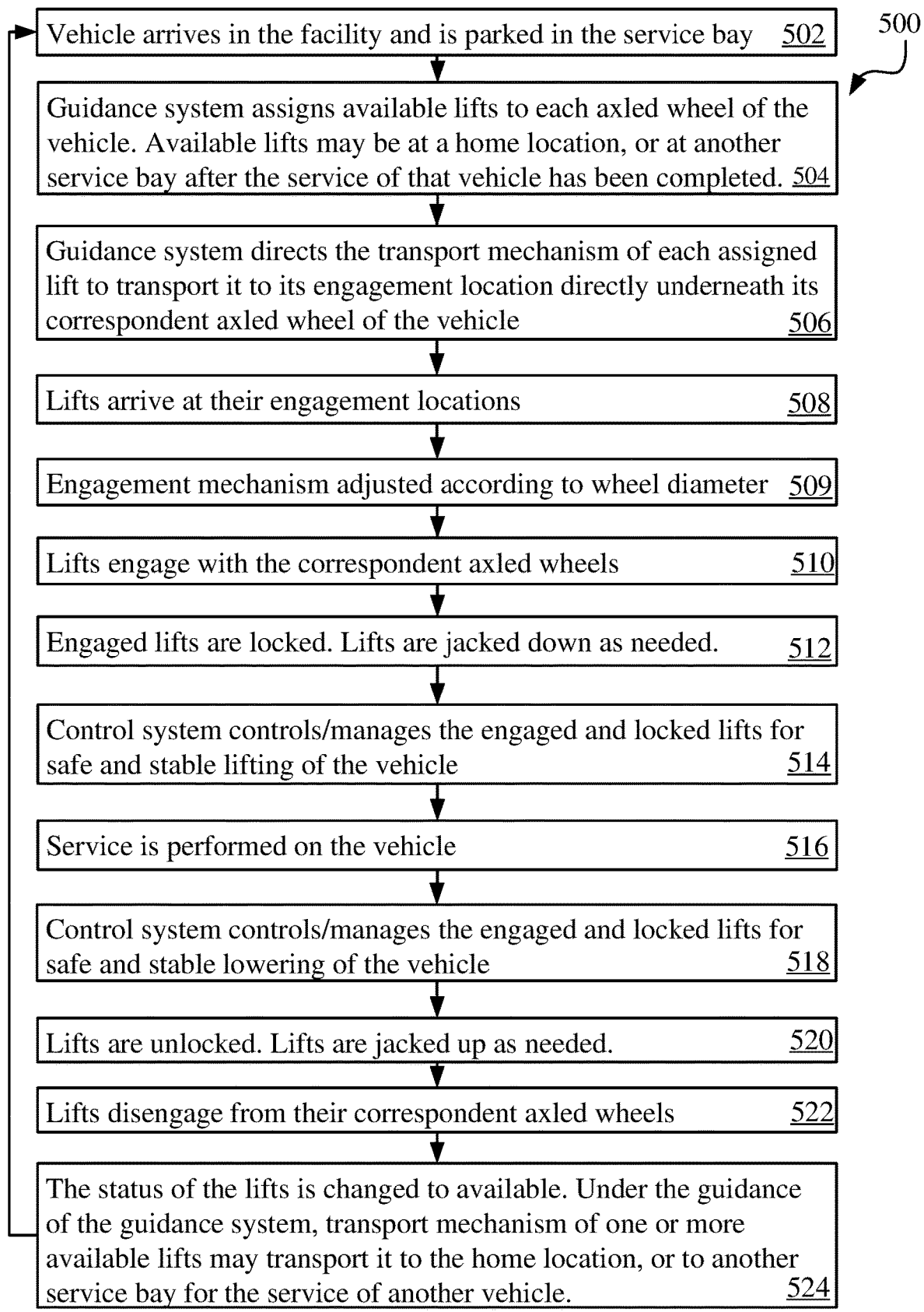

FIG. 6 shows in a flowchart form the steps required to operate a system of motorized mobile lifts according to the instant principles.

Figure 7A:
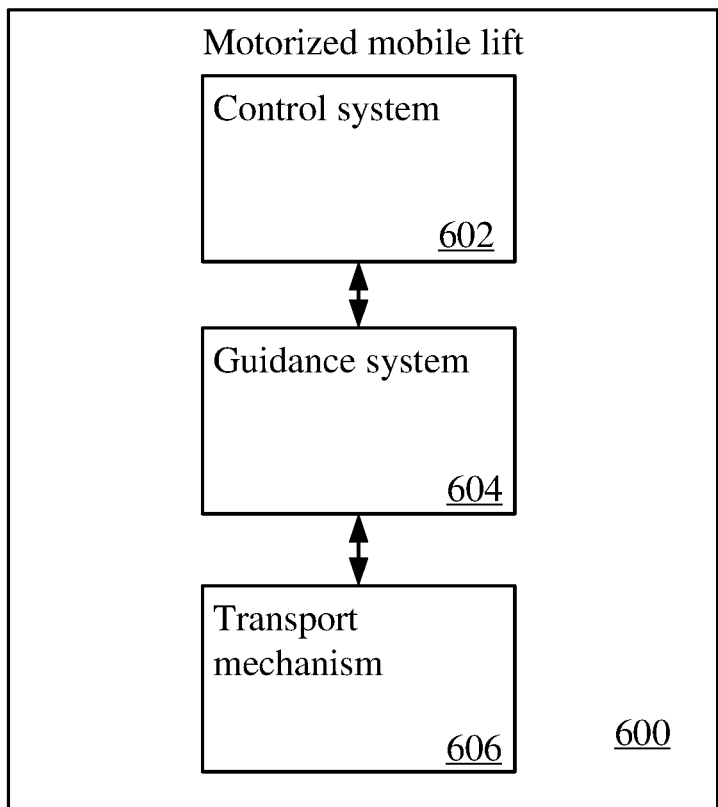

FIG. 7A shows an exemplary block diagram architecture of the various key modules or components of the system employing motorized mobile column lifts.

Figure 7B:
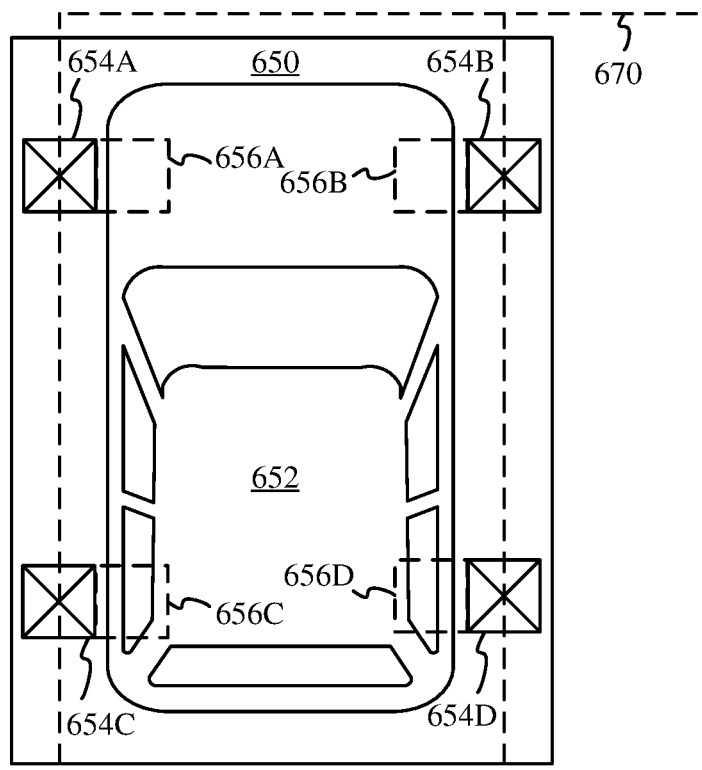

FIG. 7B shows the relationship between pre-engagement locations and corresponding engagement locations in a service bay where an instant motorized mobile lift system is used.

Figure 8:
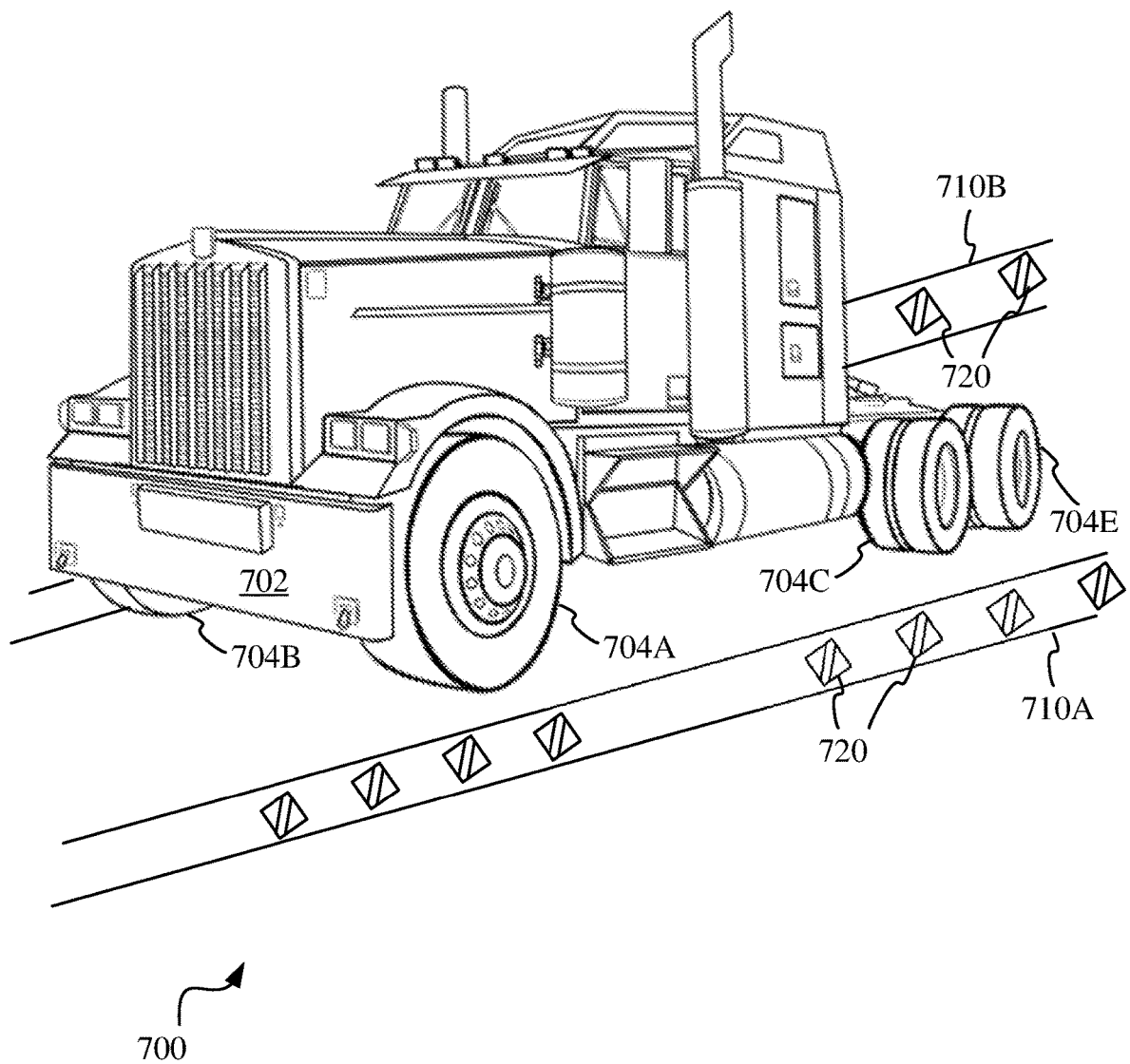

FIG. 8 shows an embodiment utilizing sensors fitted into two rows in a service bay of a service center to assist in the guidance of the transport mechanisms of the lifts. The sensors may be proximity sensors according to the teachings.

Figure 9:
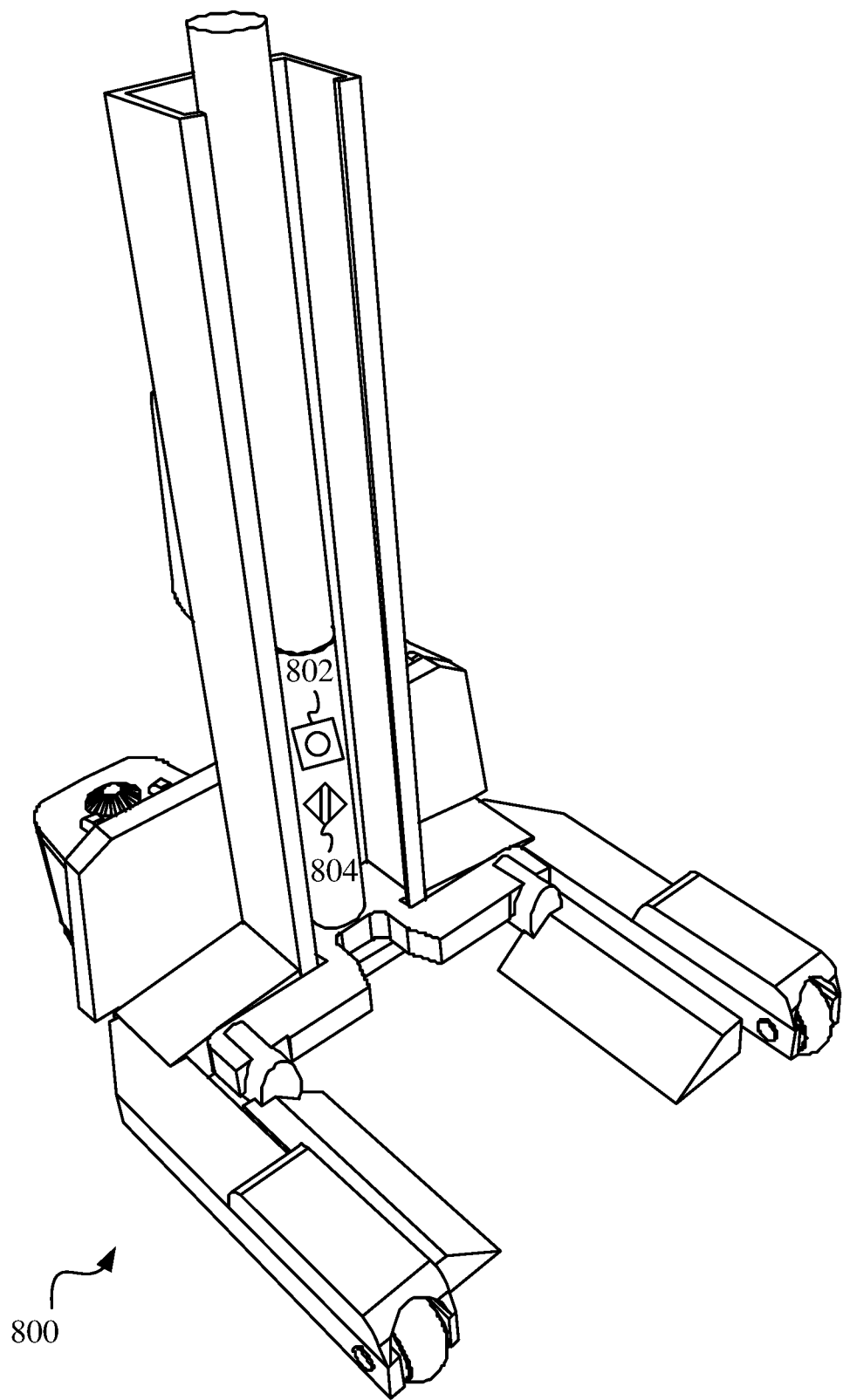

FIG. 9 shows the perspective view of an instant motorized mobile lift fitted with a camera and a proximity sensor.

Figure 10:
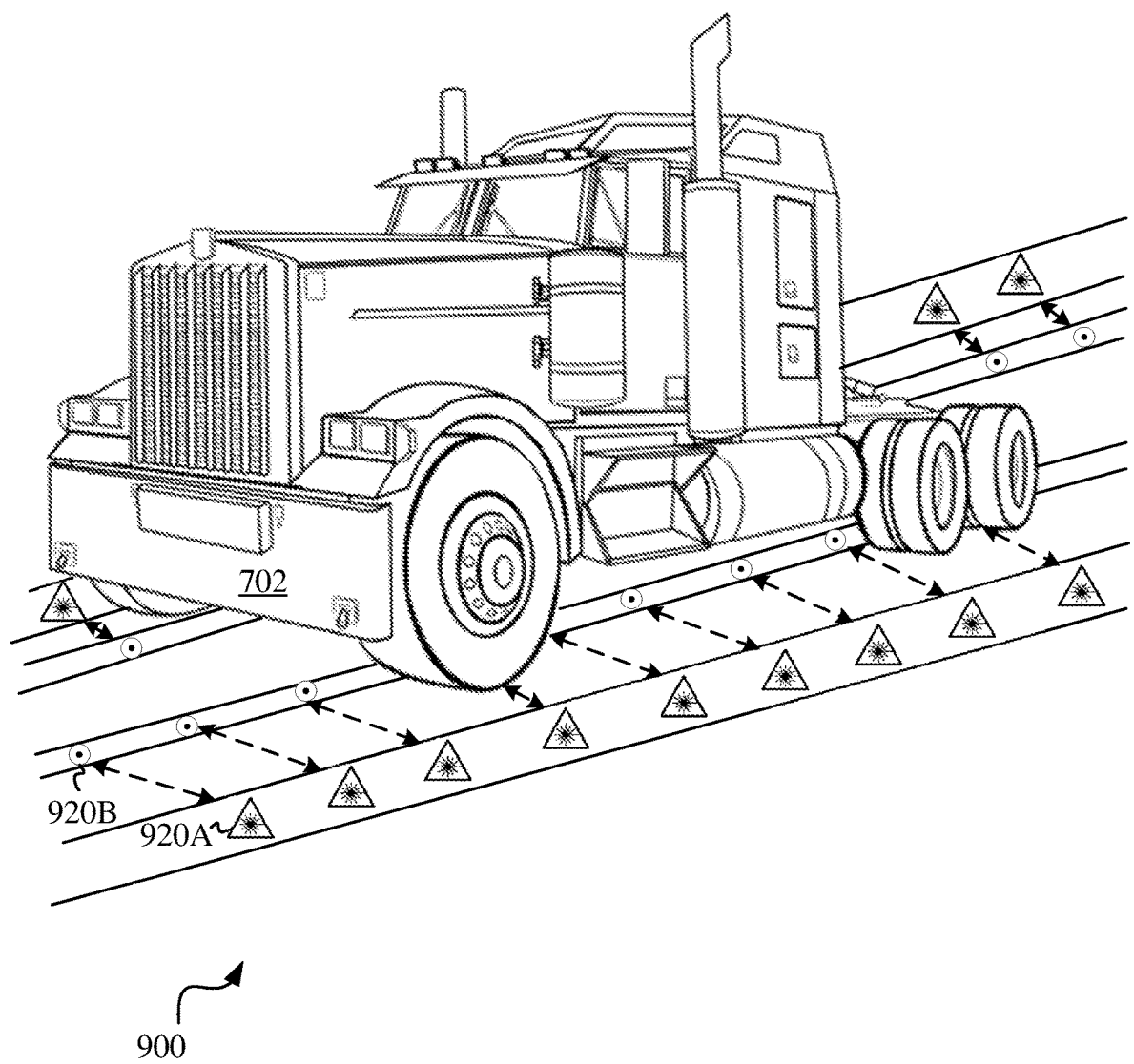

FIG. 10 shows another embodiment utilizing laser/light sensors and receivers fitted in a service bay to assist in the guidance of the transport mechanisms of the lifts.

Figure 11:
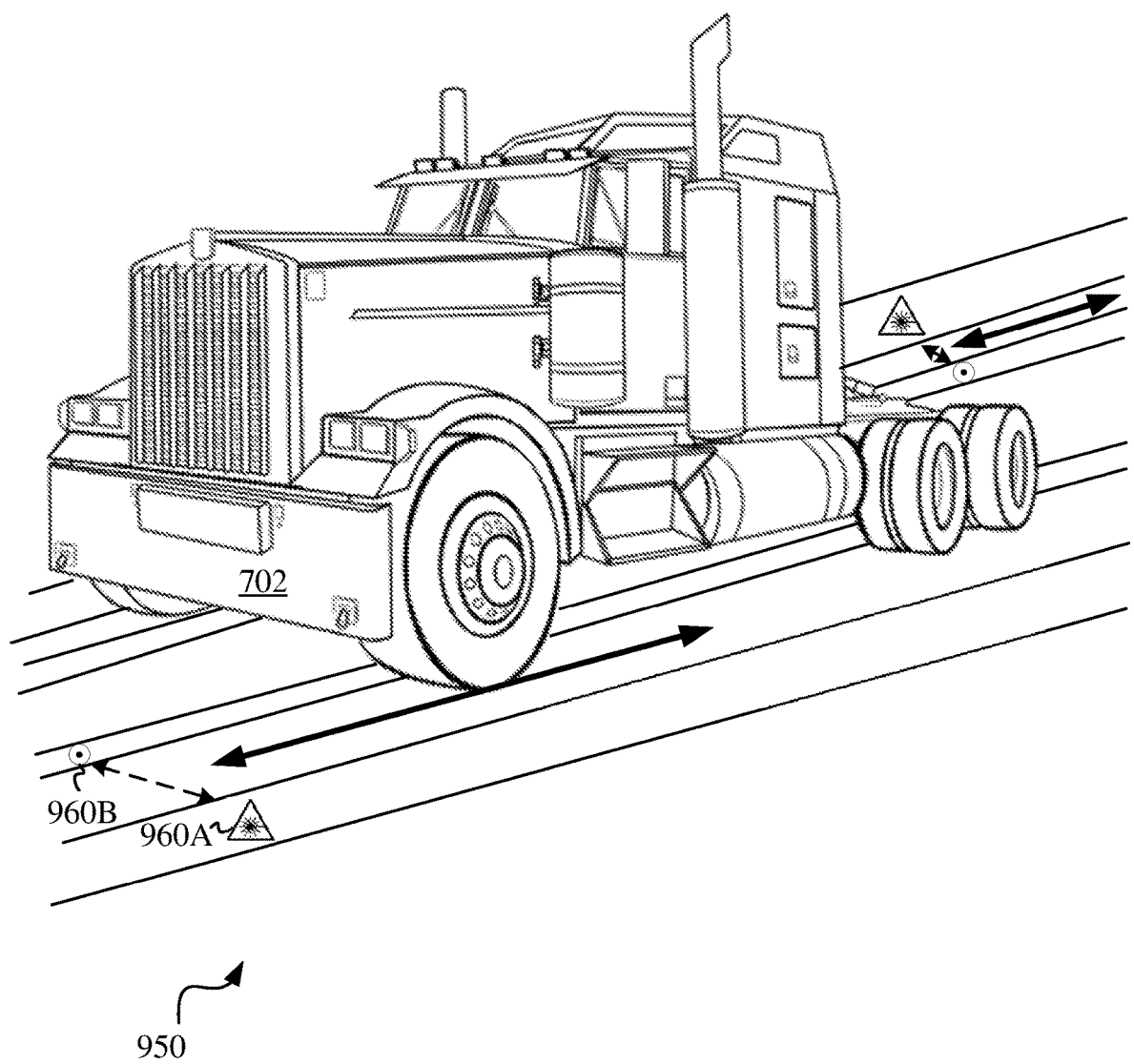

FIG. 11 shows a variation of the embodiment of FIG. 10 where laser/light sensor and receiver pairs are moveable in the service bay.

Figure 12:
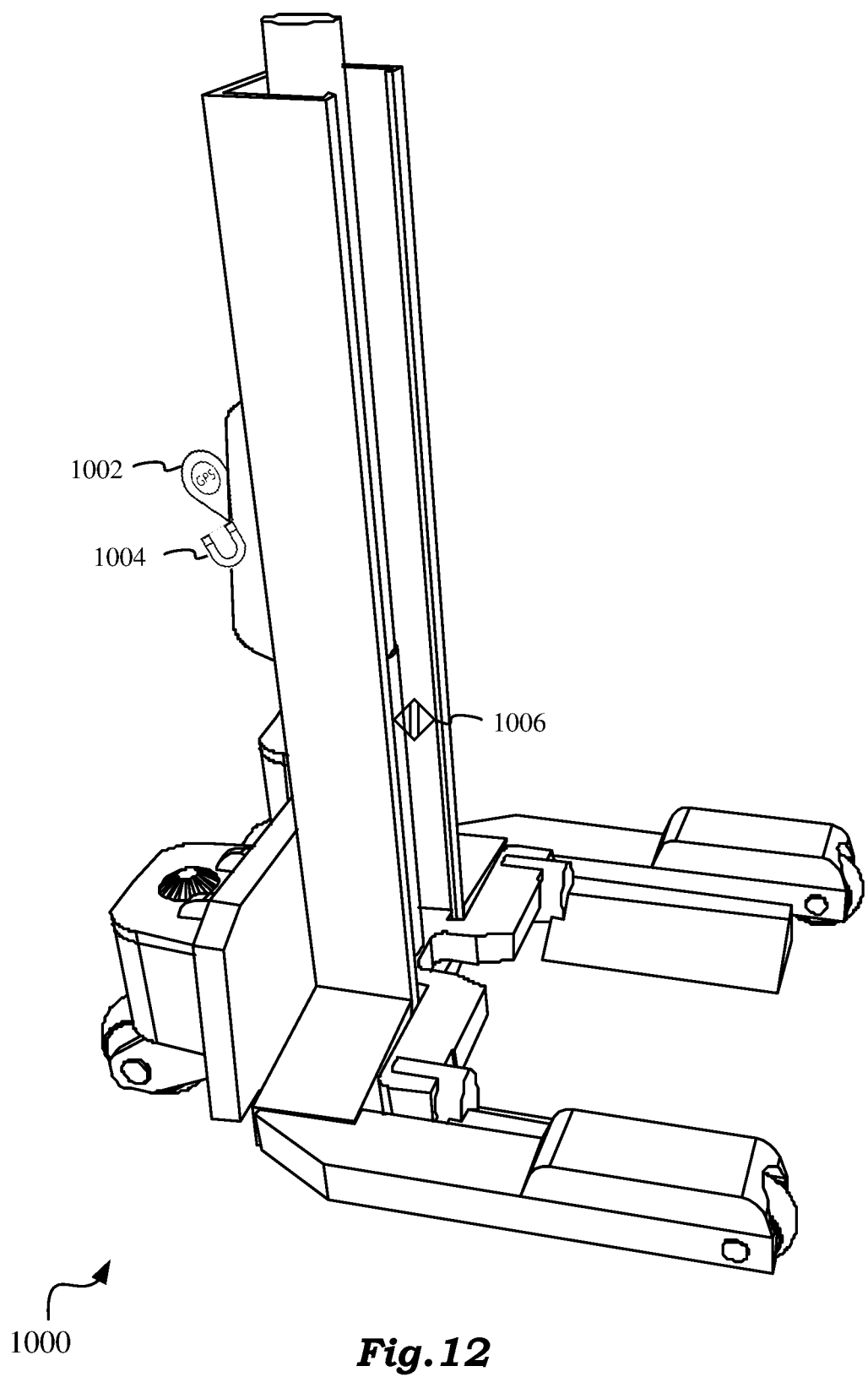

FIG. 12 shows a left isometric view of an instant motorized mobile lift with a GPS sensor, a magnetometer and a proximity sensor installed on it.

Figure 13:
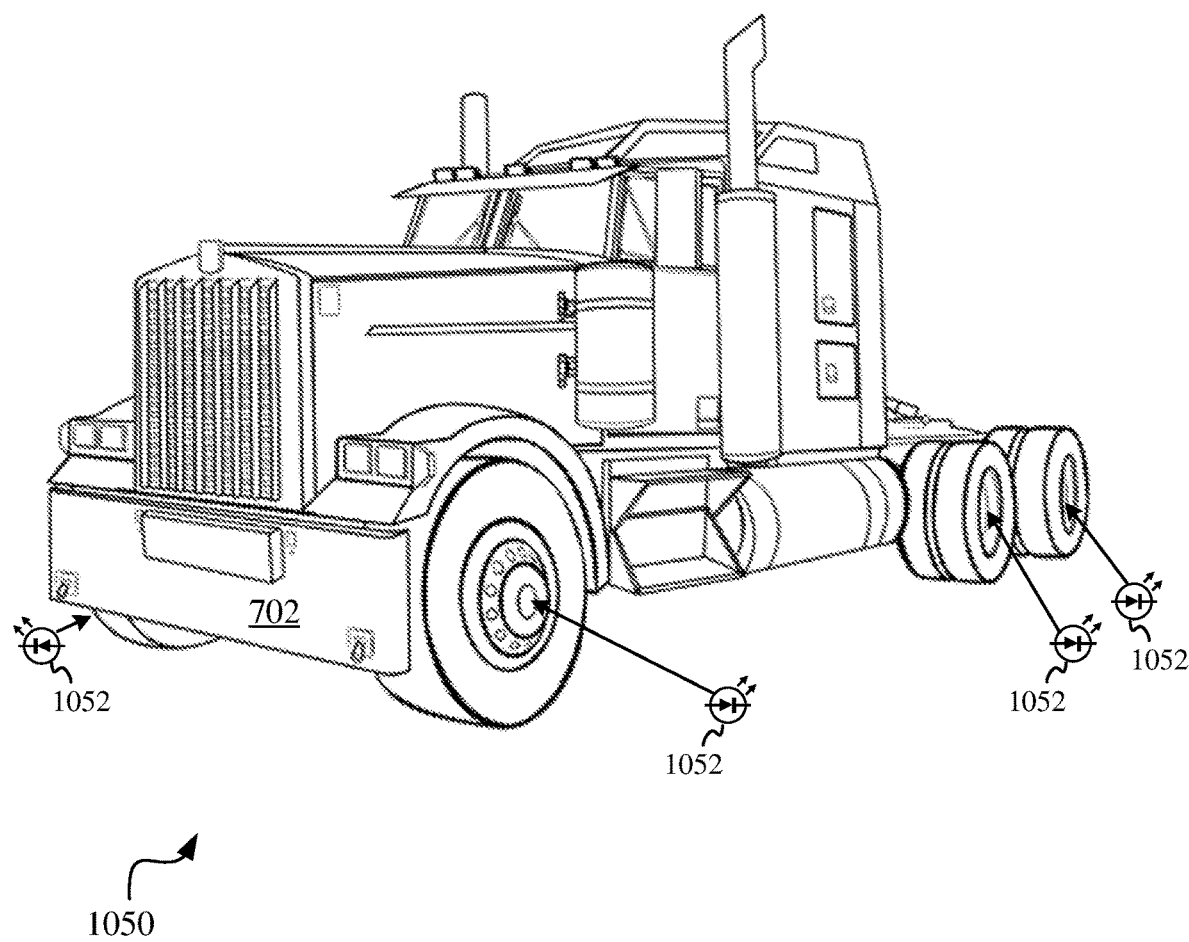

FIG. 13 shows the perspective of a vehicle in which light sensors are fitted on the vehicle to assist in the guiding/homing of the lifts.

Figure 14:
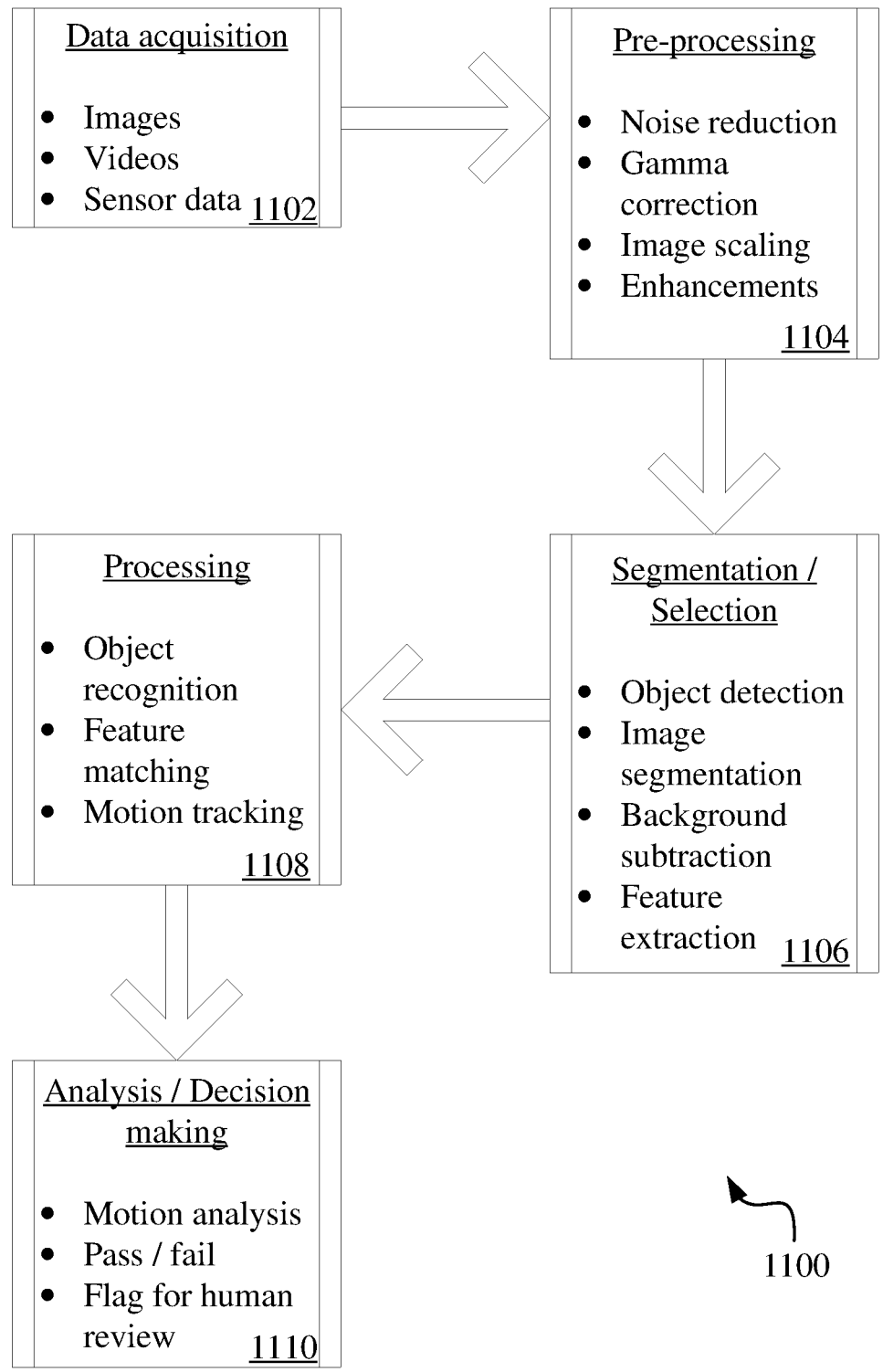

FIG. 14 shows a simplified computer vision pipeline utilized by the instance guidance system.

Figure 15:
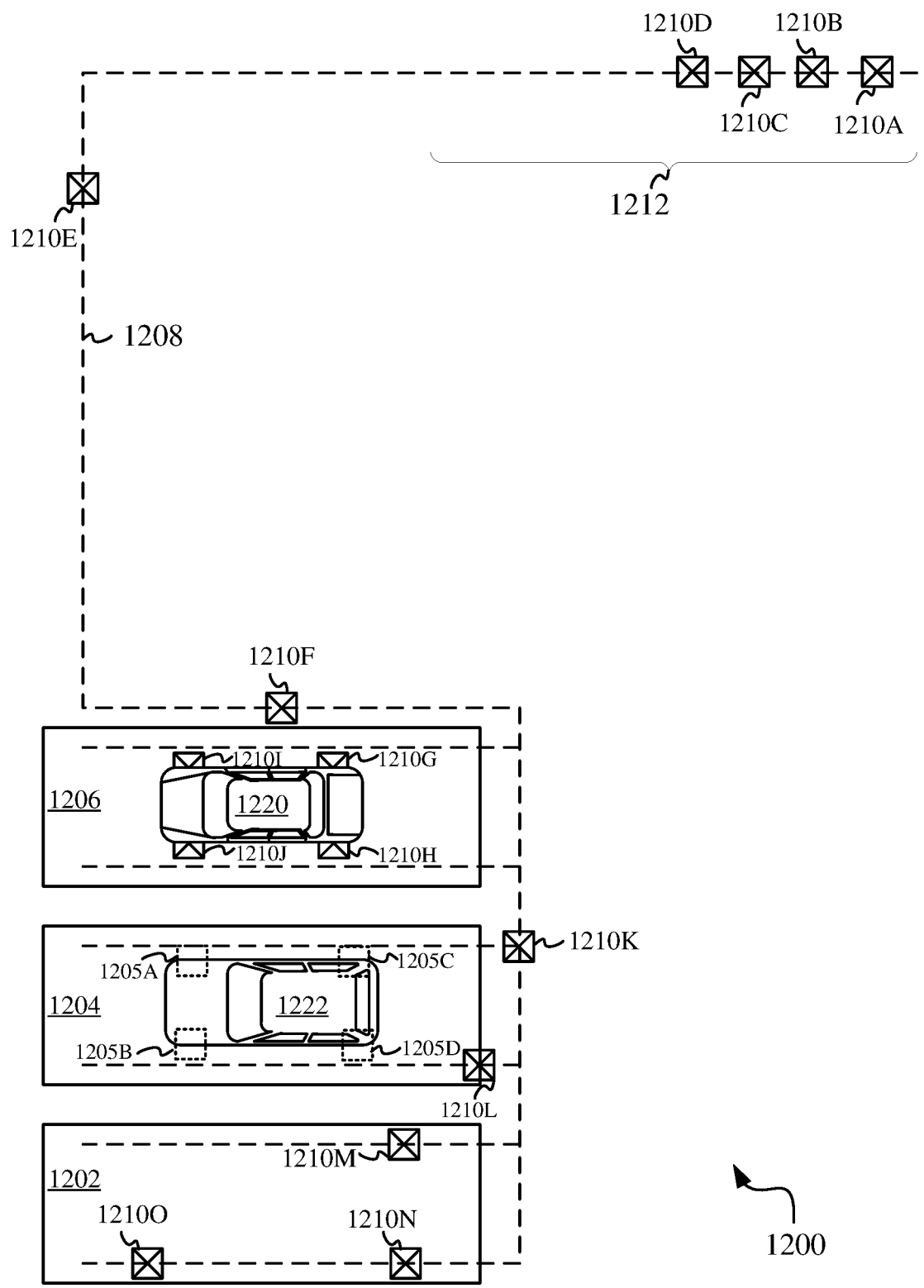

FIG. 15 shows yet another embodiment in which the instant motorized mobile lifts travel only on a designated path in the shop/facility/service center.

Figure 16:
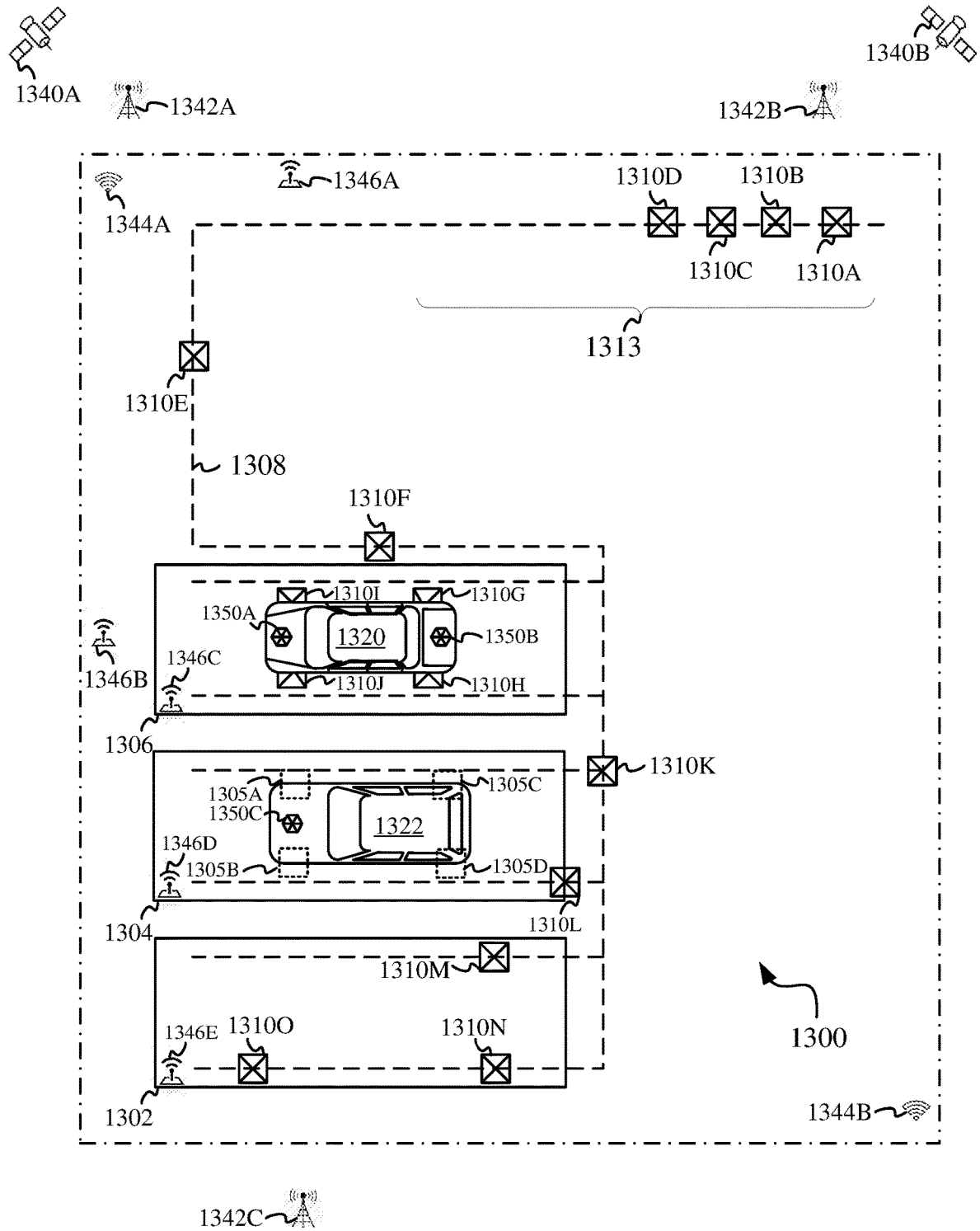

FIG. 16 shows one of a very useful set of embodiments employing sensors present onboard the vehicles. In the embodiment shown, instant motorized mobile lifts are guided during their transportation and engagement by utilizing any combination of sensors installed on the vehicles and/or the lifts and/or the service center.

Figure 17A:
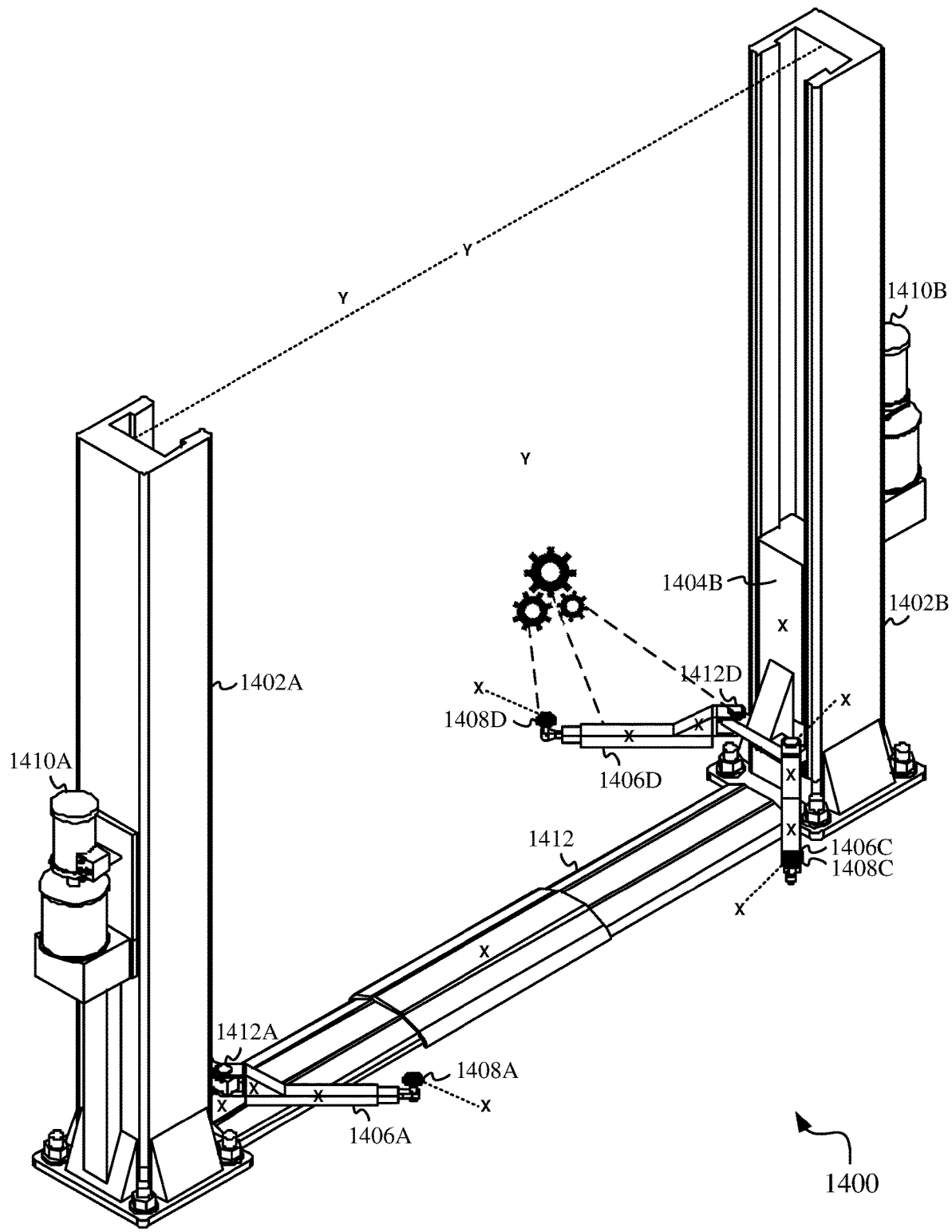

FIG. 17A shows a left isometric view of a two-post fixed lift system whose engagement process is automated according to the instant principles.

Figure 17B:
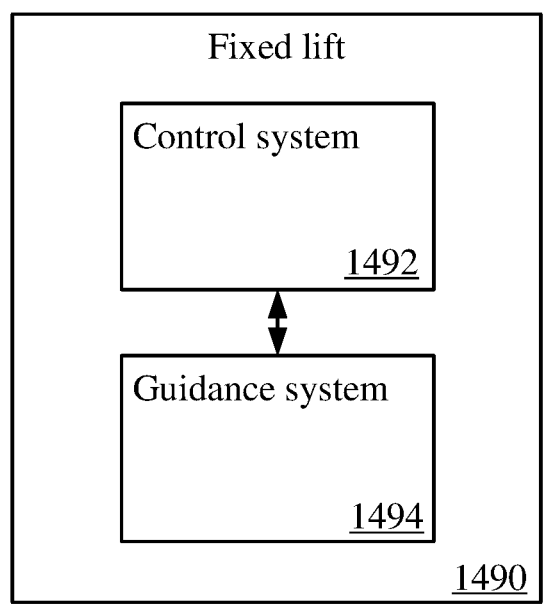

FIG. 17B shows an exemplary block diagram architecture of the key modules or components of the system employing fixed lifts.

Figure 18A:
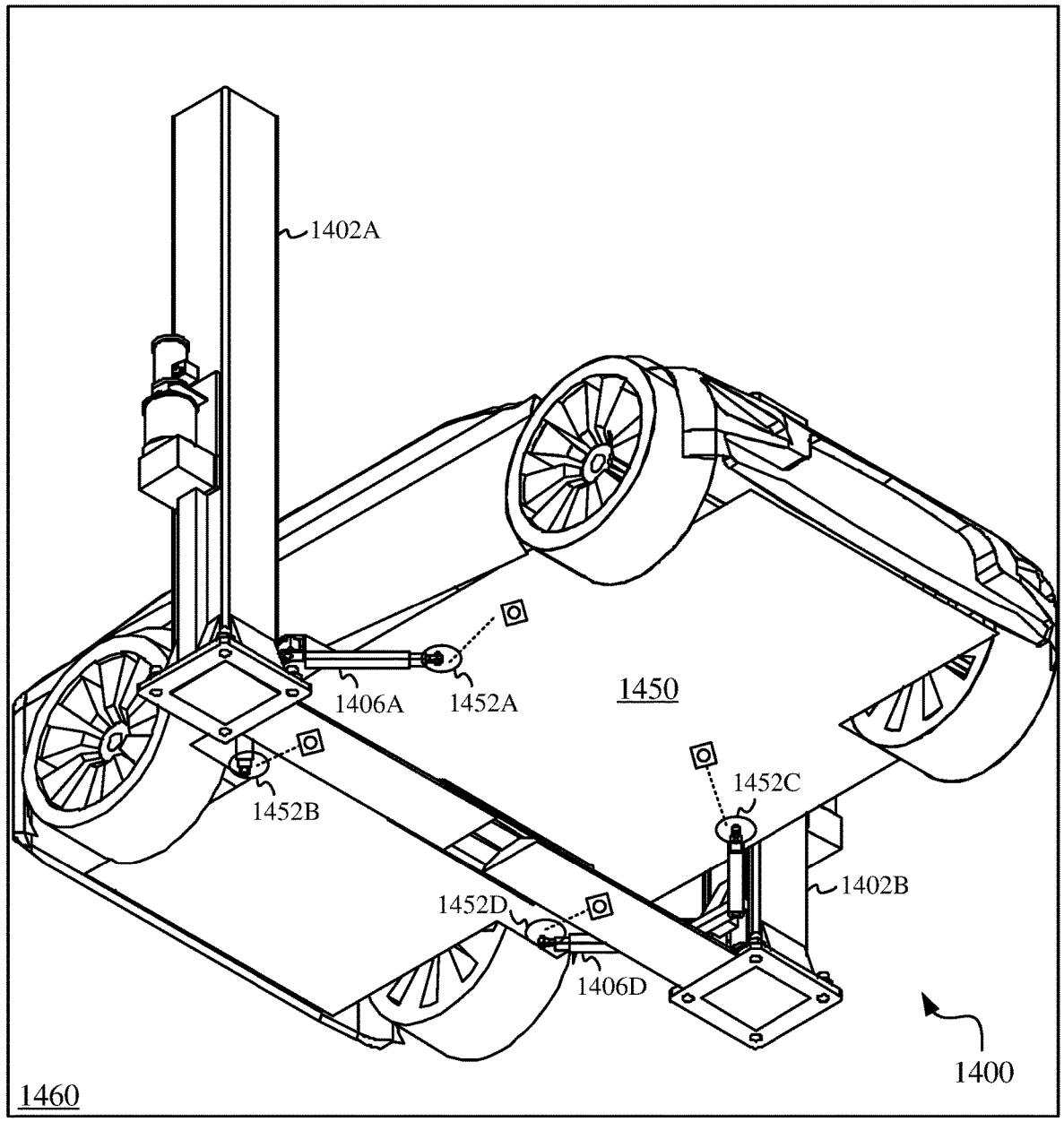

FIG. 18A shows a lower left isometric view of the lift of FIG. 17A in its lowered position with its lifting points/regions marked where the lift pads of the lift engage or make contact with the vehicle.

Figure 18B:
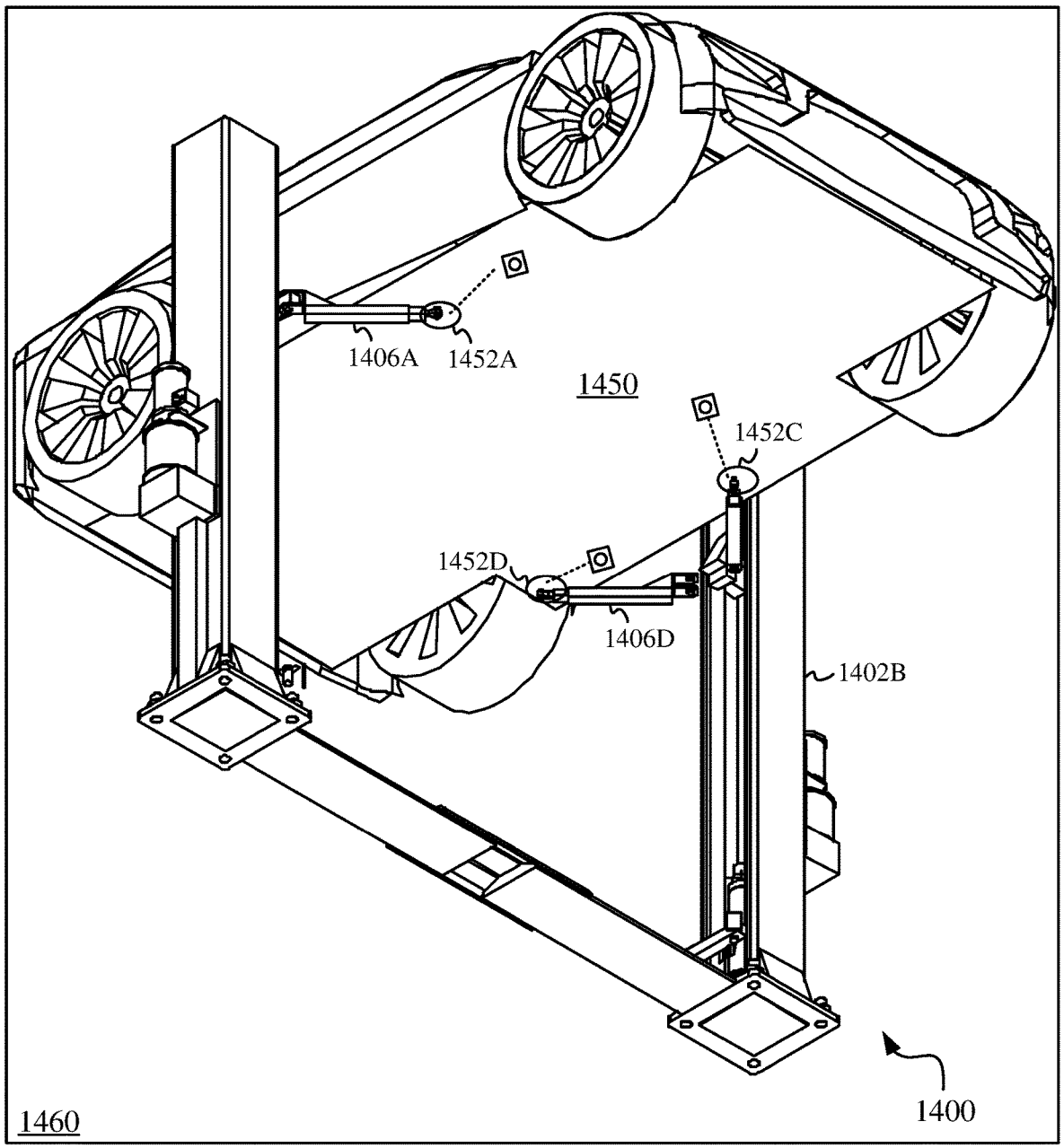

FIG. 18B illustrated the lift of FIG. 18A in its raised position showing the vehicle raised above ground.

Figure 19A:
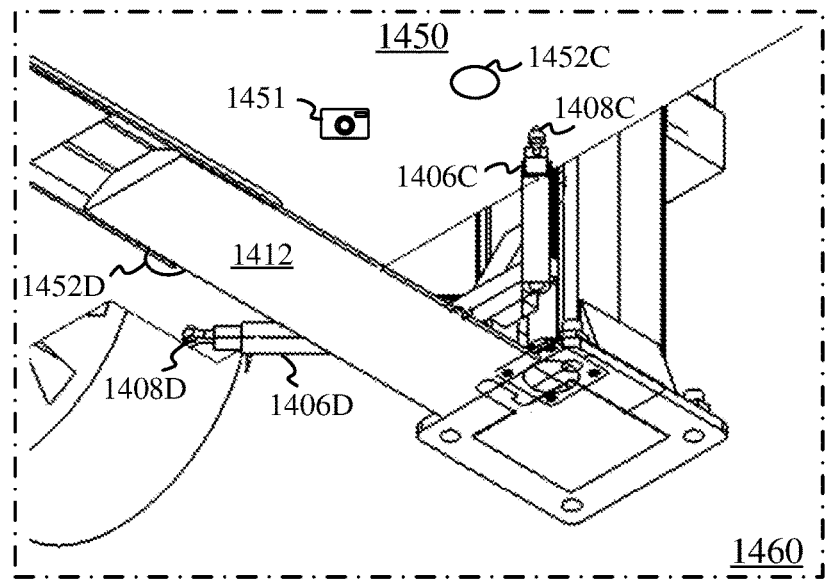

FIG. 19A is an exploded view from the embodiments of FIG. 18A-B, showing a sensor/camera installed on the underside of the vehicle.

Figure 19B:
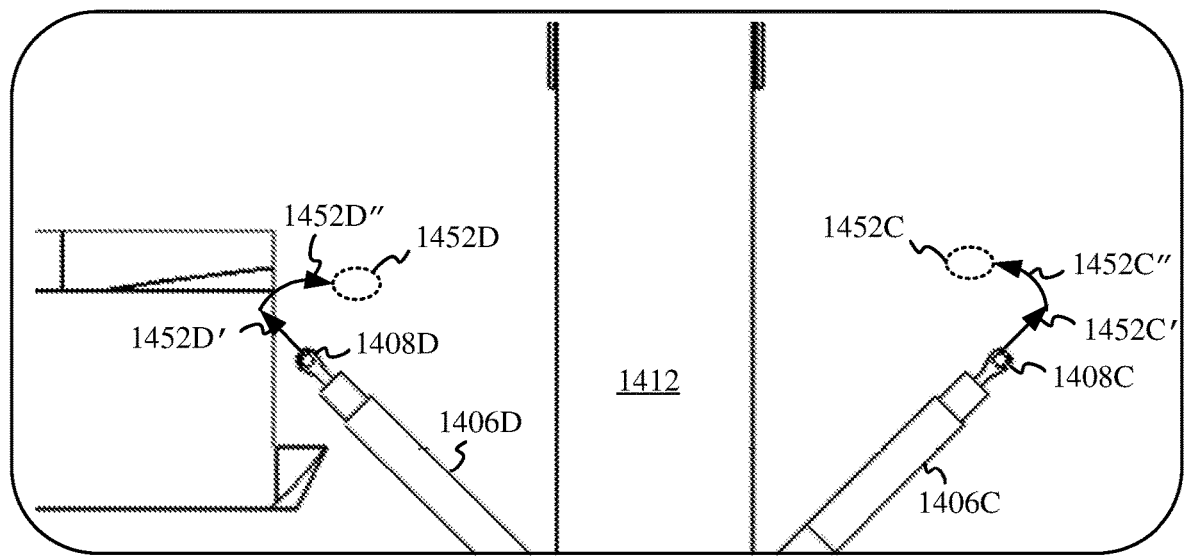

FIG. 19B shows the camera view of the camera of FIG. 19A.

Figure 20:
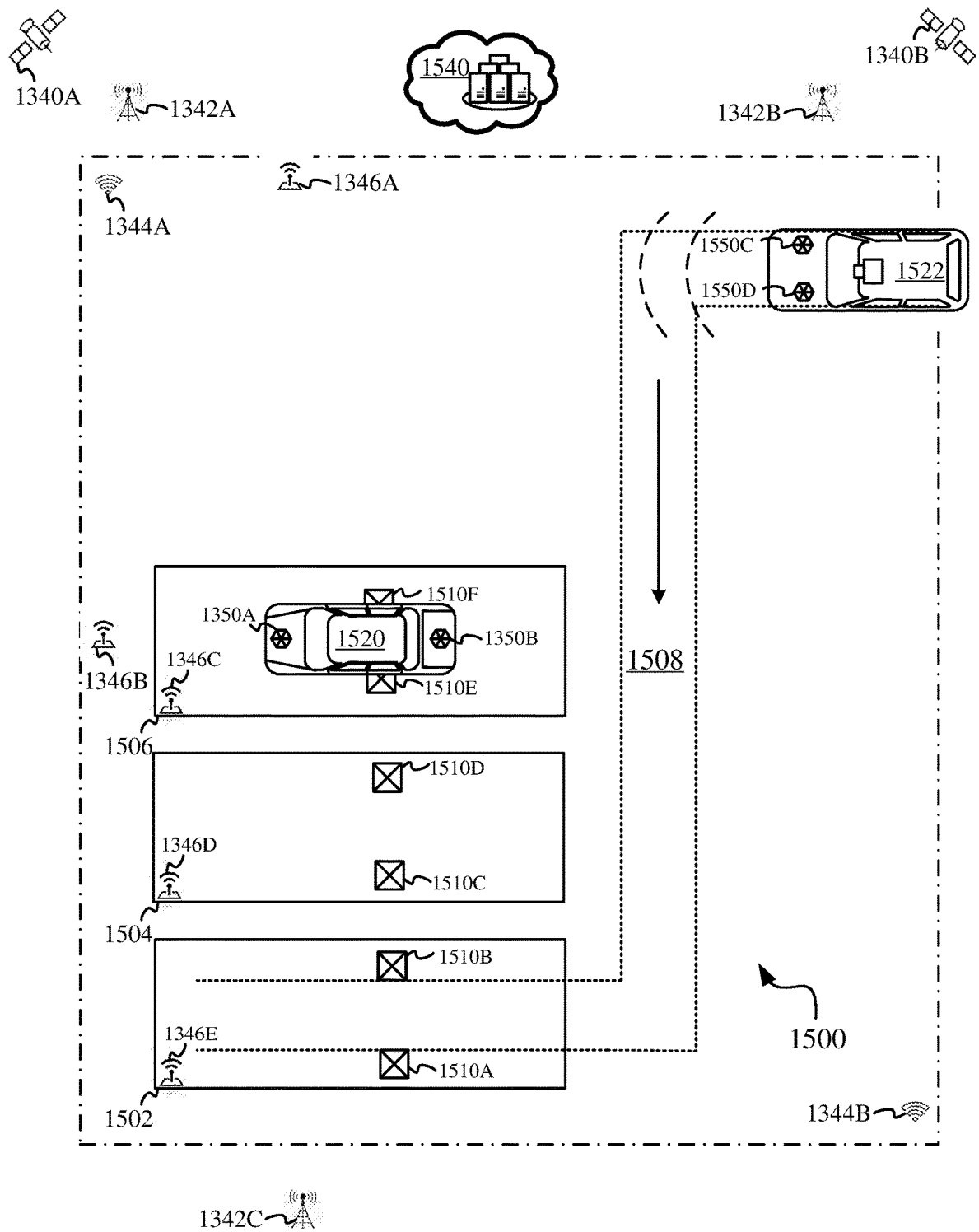

FIG. 20 shows another useful embodiment utilizing sensors onboard autonomous vehicles to automate the process of transportation to and engagement with the fixed lifts in the facility.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1A:
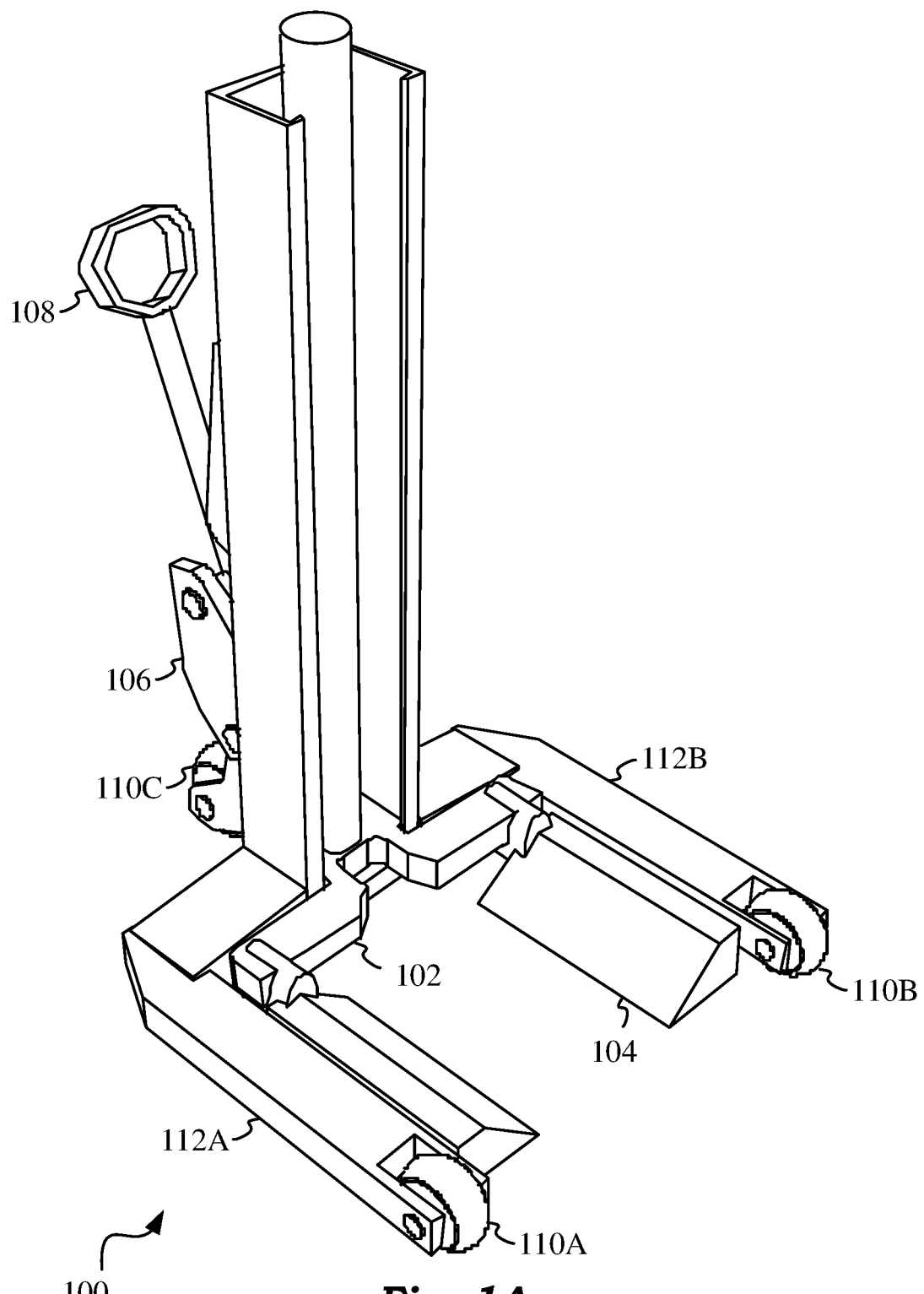
FIG. 1A illustrates in a left isometric view the mobile column/vertical lift of the prior art without a motorized transportation capability. The drawing figure shows the lift in its lowered position.
Figure 1B:
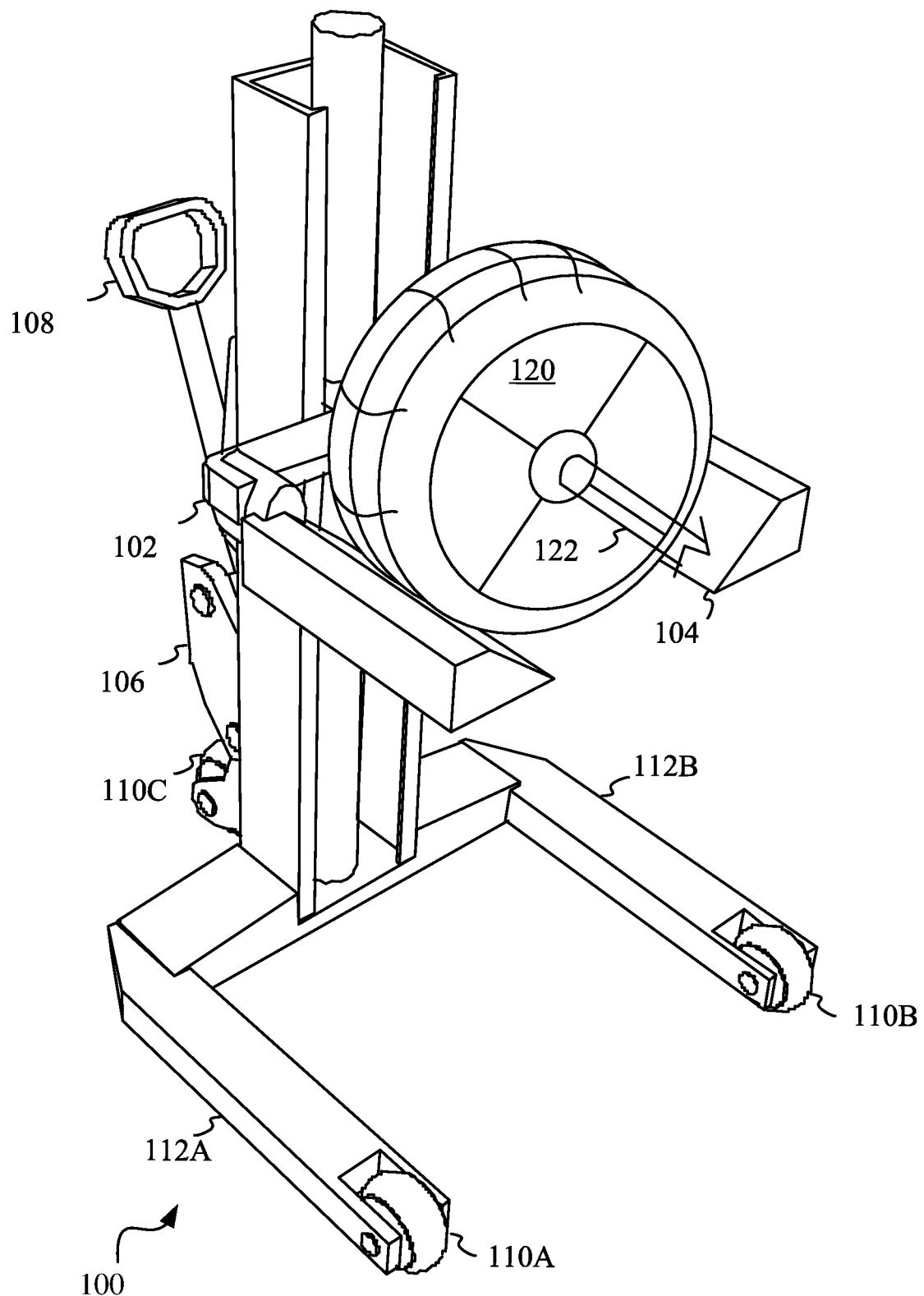
FIG. 1B illustrates the prior art lift of FIG. 1A in its raised position showing an axled wheel of a vehicle raised above ground.
Figure 1C:
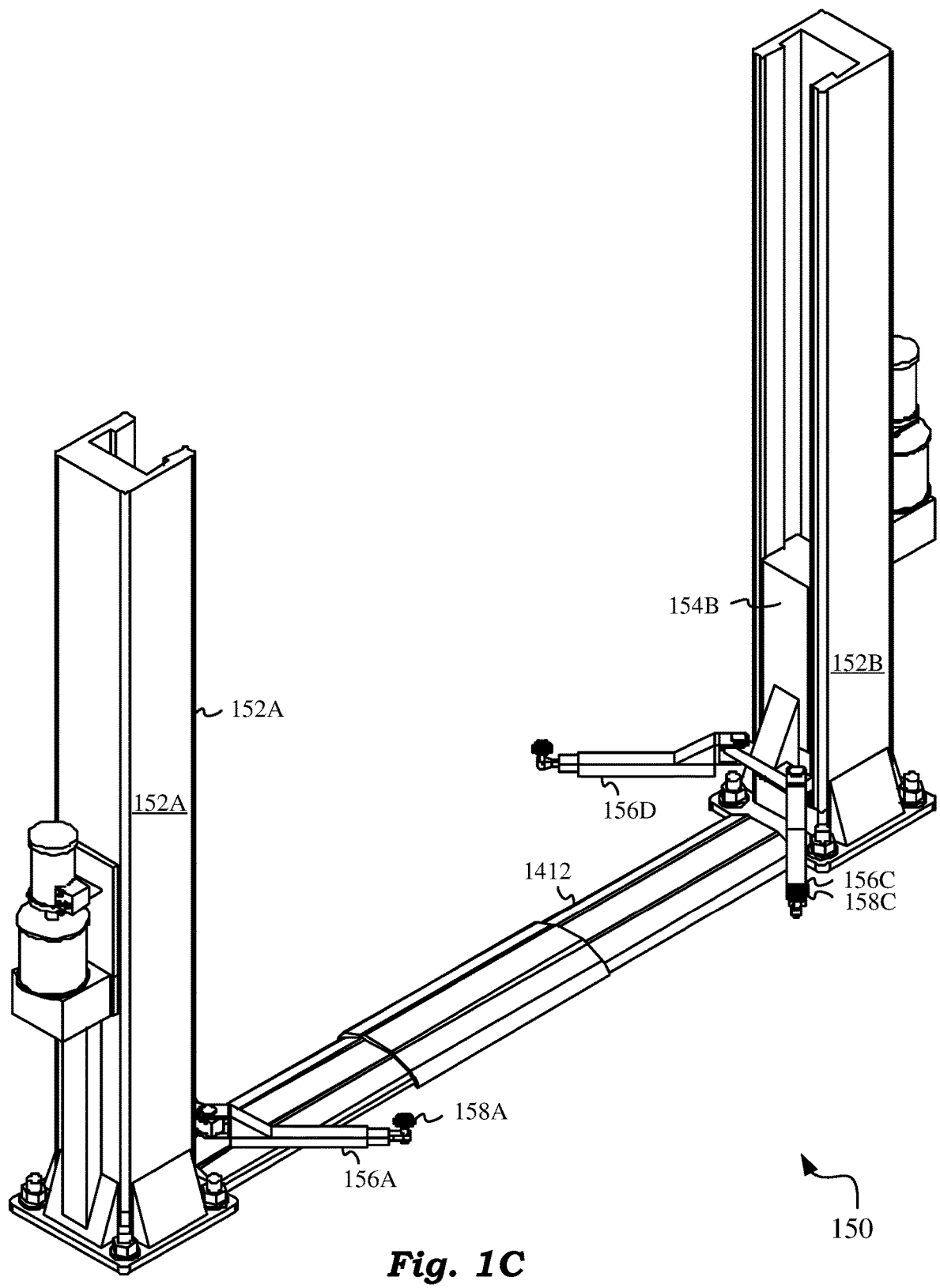
FIG. 1C shows a left isometric view of a typical two-post fixed lift system of the prior art without an automated engagement mechanism.
Figure 2A:
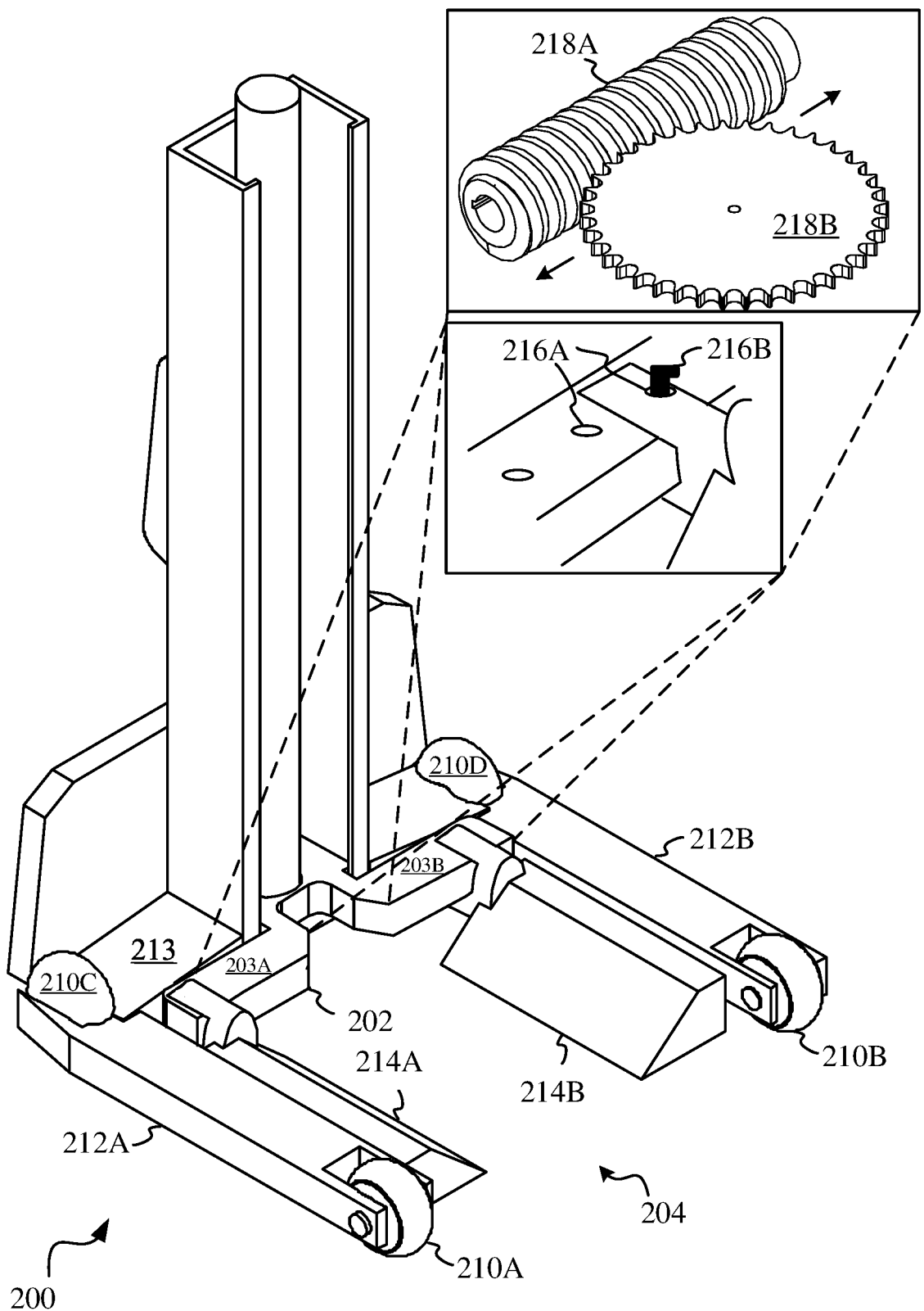
FIG. 2A shows a left isometric view of a motorized mobile lift with its potential engagement mechanisms according to the present teachings.

The present invention will be best understood by first reviewing a motorized or self-propelled or self-guided mobile column lift 200 as shown in FIG. 2A. FIG. 2A shows one column or vertical or mobile lift of a lift system which is presumed to have many or a plurality of such lifts. Lift 200 of FIG. 2A has a carriage assembly 202 and two resting arms 212A and 212B for substantially supporting or compensating the weight of the lift and that of the vehicle being raised. Arms 212A-B are connected by a connecting member 213 as shown. Carriage assembly 202 has an engagement mechanism 204 that is used to engage an axled wheel of an automotive vehicle that is to be lifted by a system of lifts such as 200.

In these teachings, we may use the terms column lifts, motorized column lifts, vertical lifts, motorized vertical lifts, motorized mobile lifts, and sometimes simply mobile lifts and lifts interchangeably. At times, we may prefer one of these terms over others to emphasize their motorized aspects as needed. At other times, we may simply refer to them as mobile lifts or lifts to avoid undue repetition. In any case, unless otherwise noted, it should be apparent from the context that we are referring to the motorized mobile columns lifts of the present invention, such as lift 200, and not the manually mobile lifts of the prior art.

Also in this disclosure, we may interchangeably use the terms a tire, an axled wheel or simply a wheel to refer to a wheel with its rim and tire mounted on it and in a driving position on an axle of an automotive vehicle. We may draw any distinction between these terms only as and when needed. Furthermore, although the present teachings are described in the context of automotive vehicles, the reader will notice that they also easily extend to railed vehicles, such as railcars and locomotives.

In the embodiment shown in FIG. 2A, engagement mechanism 204 consists of two prongs 214A and 214B. For lifting a vehicle, these are positioned underneath an axled wheel of a vehicle while it is parked on the ground in a service bay of a service center or shop or facility. In order to stably support the weight of the lifted vehicle, the clearance between prongs 214A-B is kept sufficiently less than the diameter of the axled wheel being lifted for a stable lift. In the preferred embodiment, the clearance between prongs 214A-B is adjustable based on the size or diameter of the wheel. We simply refer to this capability as having an engagement mechanism 204 that is adjustable.

Explained further, engagement mechanism 204 of carriage assembly 202 can be adjusted to accommodate wheels/tires of varying sizes/diameters. This is important because typically a service bay needs to accommodate various vehicles of differing makes and models and as such engagement mechanism 204 needs to be able to accommodate wheels large and small. For this reason, prongs 214A-B of engagement mechanism 204 need to be able to slide closer or farther apart to adjust the clearance between them.

There are various ways in which the engagement mechanism is made adjustable, two of which are shown in the exploded detail boxes in the upper right hand corner of the drawing page of FIG. 2A. In one embodiment, a manually adjustable engagement mechanism 204 involves the use of holes 216A at various intervals along shafts 203A and 203B of carriage assembly 202 as shown. Depending on the diameter of the wheel to be engaged, a technician or worker first manually moves prongs 214A and 214B along shafts 203A and 203B respectively. He or she then inserts pin 216B that goes through the prong and into the respective shaft thus securing the prong at that position as shown.

In the preferred embodiment, a motorized or automatic engagement mechanism 204 is used. Among other ways to accomplish this apparent to those skilled in the art, a worm 218A and sprocket 218B gear mechanism is used inside of shafts 203A-B. In other words, and as shown in the detailed box showing the inside of shafts 203A-B, a worm gear 218A rotates to laterally move sprocket 218B inwards or outwards along the directions of the two arrows shown.

Now, the assembly of prongs 214A and 214B is attached to sprocket 218B that also slidably moves inwards and outwards accordingly. This allows for a motorized or automatic adjustment of engagement mechanism 204, and specifically the clearance between prongs 214A and 214B. As a result, this mechanism does not require the physical presence of a technician/worker with lift 200 for adjusting engagement mechanism 204 according to the diameter/size of the wheel being engaged. Other ways of making engagement mechanism 204 adjustable within the instant scope include the design taught in U.S. Pat. No. 8,282,075 B2 to Chan.

Figure 2B:
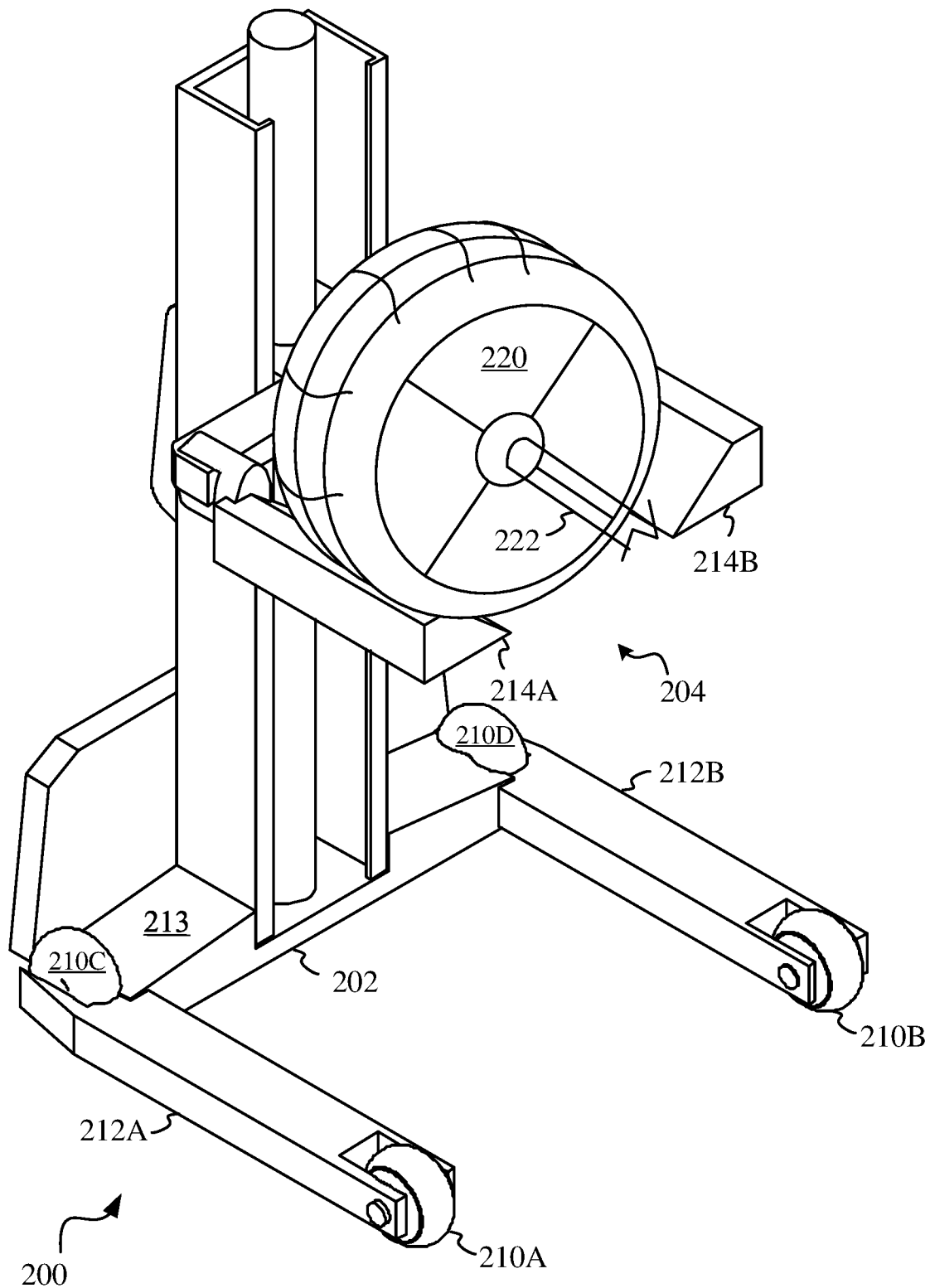
FIG. 2B shows the lift of FIG. 2A in its raised position showing an axled wheel of a vehicle raised above ground.

In the embodiment shown in FIG. 2A, prongs 214A and 214B are further shaped like wedges. The wedged shape of the prongs ensures a close or snug fit with the tire/wheel of the vehicle being lifted. FIG. 2B shows lift 200 in its a raised position where some of the reference numerals from FIG. 2A have been removed for clarity. In this raised position, engagement mechanism 204 is engaged with an axled wheel 220 of a vehicle being serviced. FIG. 2B also shows axle 222 of wheel 220 while the rest of the vehicle is omitted from the drawing to avoid detraction. FIG. 2B shows the vehicle being serviced raised above ground so a technician or service/repair person can view the underside of the vehicle.

In this position, resting arms 212A and 212B rest firmly on the ground for stably supporting the weight of the vehicle that is in turn being held in the raised position by carriage assembly 202 and its corresponding engagement mechanism 204. Obviously, FIG. 2A-B show one mobile column/vertical lift 200 of a system of presumably several such lifts. One mobile lift such as lift 200 is used to raise an axled wheel of the vehicle being serviced. Rest of the mechanical or electrical componentry of the lift, including any lifting gears, hydraulics, motors, etc. are well known to those skilled in the art, and are not explicitly delved into in this specification.

The height to which lift 200 is raised varies according to specific applications of the present technology. For example, welding or other services incorporating longer/larger tools may require the vehicle to be lifted higher than those requiring merely changing consumables such as lubricants and coolants. The height may also depend on the height of the technicians in the service center. The height can be set in system preferences. Alternatively, the height of the technicians/workers maybe input into the system which then automatically determines the correct height to raise the lift, based on the make/model of the vehicle and the service to be performed.

Lift 200 also has a motorized transport mechanism consisting of motorized wheels. In the embodiment shown in FIG. 2A, four motorized wheels 210A, 210B, 210C and 210D are used by the transport mechanism of lift 200. Using its motorized transport mechanism, lift 200 is able to transport itself to the location of an axled wheel of a vehicle to be serviced, without requiring a technician. This is a key distinguishing aspect of the present technology. Various electromechanical or fuel powered designs to power or motorize wheels, such as wheels 210A-D are conceivable. Some of these will be discussed below, while others are readily conceivable by those skilled in the art. As such, the appropriate powering/motorizing mechanisms for wheels 210A-D are not explicitly shown in FIG. 2A-B but are presumed to exist in lift 200.

The location of a specific axled wheel of the vehicle being serviced where lift 200 is transported to, so it can engage with that axled wheel, is called its engagement location. It should be remarked that for engagement to take place, lift 200 will normally arrive beside its correspondent wheel 220 while the vehicle is on the ground. It will then turn so its engagement mechanism 204 faces axled wheel 220. This location is called the pre-engagement location of lift 200. It will then move forward to its final engagement location so that engagement mechanism 204 slides underneath wheel 220. Alternately, depending on the configuration of the service center, lift 200 may arrive at its pre-engagement location beside wheel 220 from the side of the vehicle with engagement mechanism 204 facing wheel 220 all along.

Conversely of engagement, lift 200 disengages from wheel 220 by moving out backward again to its pre-engagement location from prior to engagement. This way, its engagement mechanism 204 slides out from underneath wheel 220 and the vehicle can be moved/removed. Of course, lift 200 needs to be in its lowered position shown in FIG. 2A for engagement or disengagement to occur. Once lift 200 has disengaged and has become available, it can then be assigned to an axled wheel of another vehicle or transported to a home location under the guidance of the guidance system. This will be delved into much more detail later in conjunction with the many embodiments disclosed further below. Note that unless otherwise noted, and as will be apparent from reading the specification that the above described concepts, including engagement, disengagement apply to other embodiments of the motorized mobile lifts as well.

Beside wheels 210A-D in the exemplary embodiment shown in FIG. 2A-B, other types of transport mechanisms are conceivable. These include different types or numbers of wheel configurations. For example, another embodiment not explicitly shown may have more than four wheels, or even less than the four wheels shown.

Indeed, in a particularly useful embodiment shown as lift 300 in FIG. 3A and FIG. 3B, lift 300 has a transport mechanism consisting of four wheels 210A-D of the embodiment of FIG. 2A-B of which only wheels 210A-C are visible in FIG. 3A-B. In addition, lift 300 also has a hand-truck/dolly/tie-bar mechanism 306 with a handle 308 and wheel 310E. In other variations, instead of one wheel 310E shown in FIG. 3A-B, a pair of wheels may be employed in dolly/tie-bar mechanism 306. A two-wheel configuration in dolly mechanism 306 provides additional stability to the tie-bar mechanism.

Similar to the embodiment of FIG. 2A-B, wheels 210A-D are motorized, allowing lift 300 to be transported without the need of a technician. However, dolly or hand-truck or tie-bar mechanism 306 consisting of wheel 310E and handle 308 allows a technician to perform any fine-grained adjustments. Such adjustments may be desirable once lift 300 has arrived at its above described engagement location using its automatic/motorized transport mechanism. This design allows for reaping the benefits of the labor cost reductions and safety improvements of the instant design, while still allowing finer adjustments to the final position of the lifts by humans. FIG. 3B shows lift 300 in the raised position.

It is important to note that before the lifting of a vehicle by lift 300 commences, a typical configuration of the instant motorized mobile lifts allows for a "jacking down" or "jack down" operation. A jacking/jack down operation lowers lift 300 all the way down to the ground so that the weight of the vehicle being lifted can be distributed over a larger contact area with the floor, as opposed to just on wheels 210A-D. Explained further, a jack down operation settles resting arms 212A-B firmly on the ground, so that wheels 210A-D are no longer bearing the bulk of the weight of lift 200 and the raised vehicle. In many configurations, a jacked down configuration is the default state of the lift if it is not being transported, whether or not it is currently being used to lift the vehicle.

Suitable mechanisms for accomplishing jack up/down operations include but are not limited to making wheels 210A, 210C and 210B, 210D electromechanically or hydraulically retractable upwards into arms 212A and 212B respectively. An alternative way to implement jack up/down mechanism is to make one or both of wheels 210A, 210C and similarly one or both of wheels 210B, 210D spring-loaded. A spring-loaded configuration allows for compressing the springs by the weight of the vehicle being lifted and thusly settling arms 212A-B on the floor.

Thus, further shown in FIG. 3A-B are relief slots 211A and 211B that can be used to accommodate the above mentioned implementations of jack up/down operations. Wheels 210A/210B with their respective axles can retract upwards or settle downwards in slots 211A and 211B respectively during a jack up/down operation. Wheels 210C-D may also retract upwards/downwards during jack up/down operations or alternatively they may remain fixed. Still alternatively, wheels 210A-B may be fixed while wheels 210C-D retract/settle up/down during jack up/down operations respectively.

When lift 300 of FIG. 3A-B needs to be transported by its transport mechanism, it first needs to be jacked up. This "jacking up" or "jack up" operation is needed to provide wheels 210A-D with enough clearance from the floor so lift 300 can be moved efficiently by its transport mechanism. During such movement, excessive contact of the frame of the lift, such as its resting arms 210A-B with the floor is thus avoided. In fact, any time lift 200 needs to be moved, a jack up operation is first performed for this purpose. After its engagement process per above explanation, and just prior to lifting of the vehicle, a jack down operation of lift 300 is performed.

Conversely, once the vehicle is lowered to the ground and just prior to disengagement of lift 300 from the vehicle and its movement to its pre-engagement location per above explanation, a jack up operation is performed. As will be discussed, the guidance system of the instant design ensures that lift 300 is in its jacked down position before lifting of the vehicle, and conversely it is in its jacked up position prior to activating its transport mechanism for any movement or transportation of the lift.

Such transportation/movement may include among others the backward movement of the lift from its engagement location to its pre-engagement location during disengagement, or its transportation from one location to another in the service center. The guidance system does so by activating the corresponding electromechanical and/or hydraulic controls for jacking up lift 300 prior to its movement/transportation and deactivating the controls prior to lifting so the lift can settle on the ground. In the preferred embodiment, the guidance system seamlessly integrates jack up/down operations in the guiding of the transport mechanism of the lift, so that a lift is jacked up prior to any movement or transportation and jacked down otherwise.

If a spring-loaded mechanism for jacking up/down is used per above discussion, then no separate activation of controls is needed. That is because lift 300 just jacks down to the ground under the weight of the vehicle being lifted. This happens because the springs of the spring-loaded mechanism compress under the weight of the vehicle so that wheels 210A-B are pushed upwards into slots 211A-B respectively. Same applies to wheels 210C-D. This process allows arms 212A-B to settle on the ground. Such a spring-loaded mechanism for wheels 210A-B and/or 210C-D inside of arms 212A-B is not explicitly shown in FIG. 3A and will be known to skilled artisans.

Conversely, lift 200 jacks up automatically once the weight of the vehicle is removed. This happens because the springs of the spring-loaded mechanism extend back to their original resting position resulting in wheels 210A-B to protrude back downwards in slots 211A-B respectively and onto the ground. The same applies to wheels 210C-D. Thus, in such a spring-loaded embodiment also, the jack up/down operations are seamlessly integrated into the lifting/lowering and transportation operations of lift 300. Therefore, no special guidance is required from the guidance system for jack up/down operations. It should be noted that in such an embodiment it is important for the guidance system to keep the wheels by default in a braked/stopped state. This is so that the lift does not free-wheel unsafely in the service center when its springs are not loaded by the weight of the vehicle, unless of course it is being transported.

In an alternate embodiment per prior explanation, if the wheels are electromechanically and/or hydraulically activated for jack up and down operations, the guidance system jacks down the wheels prior to the lifting operation. It also jacks them up prior to moving lift 300 for disengagement to its pre-engagement location or prior to its any other transportation. In yet another embodiment, handle 308 of dolly mechanism 306 as shown in FIG. 3A-B, is also sometimes used for manually performing jack up/down operations. This is accomplished by the technician pumping up the lift by pulling handle 308 back (usually by 45 O°) or by pushing and pulling it back and forth for a jack up operation. Conversely, the technician performs a jack down operation by pushing handle 308 all the way up towards the lift or by manually opening a relief/release valve.

As will be apparent, that in the present embodiment, the technician is not needed for the operation of the instant mobile lifts. If at all necessary, the technician may be need to for a short time for performing the above mentioned fine-grained adjustments of the lift at its engagement location. Additionally, the technician may also perform a manual jack down operation of the lift as explained above. In another useful variation, hand-truck mechanism 306 may also be used by the technician to disengage lift 300 by manually sliding it out backward to its pre-engagement location. Additionally, the technician may first need to perform a manual jack up operation for this purpose as explained above.

Per above explanation, the guidance system performs the jack up/down operation before and after lifting as needed, and depending on the configuration of wheels 210A-D. Thus, lift 300 automatically disengages and moves/slides back to its pre-engagement location by using its motorized transport mechanism under the guidance of the guidance system. Lift 300 can then commence its transportation by its motorized transport mechanism to its next destination. This will be explained in detail further below.

It should be noted that while some embodiments will discuss the jack up/down operations further, the above described and additional ways for implementing this mechanism will be apparent to skilled artisans. Therefore, in order to avoid undue repetition, jack up/down operations and their associated mechanisms are not explicitly shown or delved into detail in reference to all other embodiments involving the instant motorized mobile lifts. Moreover, the instant design does not require the presence or absence of the jack up/down mechanism. The present teachings are agnostic about configurations that may or may not employ this mechanism of better distributing the load of the vehicle on the floor as discussed.

In yet another variation and an innovation over the prior art, FIG. 4A and FIG. 4B, show a lift 350 with three motorized wheels 360A-C. FIG. 4A shows a left isometric view of a column/vertical lift 350 having a carriage assembly 352. Carriage assembly 352 of lift 350 has an engagement mechanism 354 for engaging an axled wheel of a vehicle. The lift also has two resting arms 362A and 362B that rest on the ground as carriage assembly 352 with its engagement mechanism 354 lifts an axled wheel of a vehicle. There is also a hand-truck or dolly mechanism 356 with its handle 358 using which a technician can manually transport lift 350 to a desired engagement location.

FIG. 4B shows lift 350 in its raised position. In this position, engagement mechanism 354 is engaged with an axled wheel 220 of a vehicle being serviced. FIG. 4B also shows axle 222 of wheel 220 while the rest of the vehicle is omitted from the drawing to avoid detraction. Note that FIG. 4B shows the vehicle being serviced raised above ground so a technician or service/repair person can view the underside of the vehicle. In this position, resting arms 352A and 352B firmly rest on the ground for stably supporting the weight of the vehicle that is in turn being held in the raised position by carriage assembly 352 and its corresponding engagement mechanism 354.

Obviously, FIG. 4A-B show one column/vertical lift 350 of a system of presumably several lifts. In this embodiment, wheels 360A-C can operate in either manual or motorized/automated modes. In motorized mode, wheels 360A-Bare used for propulsion while wheel 360C is used for steering by the transport mechanism operating under the guidance of the guidance system. By default, the wheels operate in motorized mode to transport the lift to its engagement location without requiring technician assistance. However, once the lift has moved/transported to its engagement location, a technician can arrive near its engagement location.

He/she can then operate wheels 360A-B in a manual mode by employing its hand-truck/tie-bar mechanism 356 and handle 358 to perform any fine-grained adjustments to the location of the lift underneath the correspondent axled wheel of the vehicle being serviced. Depending on specific implementations of the above design apparent to those skilled in the art, an explicit manual override option may be provided in the lift. In other words, wheels 360A-C will normally operate in a motorized mode unless the manual override is activated. For clarity, FIG. 4A-B also show the exploded view of resting arms 362A and 362B containing motors 370A and 370B respectively that are used to power or motorize wheels 360A and 360B respectively. The exact configuration of motors 370A-B in lift 350 will be readily conceived by those skilled in the art.

The componentry for jacking up/down operations and the associated teachings from previous embodiments apply here also and are not delved into explicitly to avoid undue repetition. Note also that in the embodiments shown and described above, other routine components required for powering/motoring and steering mechanisms for wheels 360A-C of FIG. 4A-B and wheels 210A-D of FIG. 2A-B and FIG. 3A-B have been left out to avoid detraction from the instant principles. Such componentry is abundantly available in the art and will be known to the skilled artisans.

For example, the wheels may be powered by electrical or mechanical means. Specifically, the wheels may be powered by one or more electrical motors which are in turn powered by rechargeable batteries. Alternatively, the wheels may be powered by one or more fuel combustion engines, such as an internal combustion engine. The steering mechanism may be modeled after automotive designs or cars, or after bicycles or motorbikes, or still incorporate one of the many other steering designs available. One can also power just the rear wheels 360C of FIG. 4A-B and wheels 210C-D of FIG. 2A-B and FIG. 3A-B in the above explained embodiments while the front wheels 360A-B and 210A-B are used for steering, or vice versa.

For the sake of completeness, FIG. 5 shows yet another embodiment detailing the above power and steering componentry. Lift 400 of FIG. 5 has four wheels 410A, 410B, 410C and 410D. Rear wheels 410C and 410D are powered by motors 420 and 422 respectively. These motors can be any of the above mentioned types of motors, or still other suitable motors available to skilled artisans. Front wheels 410A-B are used for steering. The steering mechanism for wheel 410B is shown in the detailed or exploded view in the upper right hand corner of the drawing page.

Specifically, wheel 410B is steered using steering plate 430 that is manipulated by a combination of a worm gear 432 and a spear gear 434. Worm 432 can in turn be powered by an electric/servomotor (not shown). The servomotor can in turn be controlled by the guidance system of lift 400. FIG. 5 also shows resting arms 412A and 412B with connecting member 413 joining them. Further shown are carriage assembly 402 and engagement prongs 414A and 414B similar to the earlier embodiments, while other reference numerals have been left out for clarity. Other routine components, such as brakes or braking mechanisms for wheels 410A-D will be known to skilled artisans and are not explicitly shown or delved into detail in this specification. As before, other teachings and functionalities from previous embodiments, such as jacking up/down also apply to the present embodiment, and are not unduly repeated.

As already mentioned, the automatic or motorized transport mechanism for instant mobile lifts is a key distinguishing aspect of their design. The motorized transport mechanism works under the guidance of a computerized guidance system. The implementation of the present teachings will include a number of instant lifts from the above explained embodiments in a given service center or shop or facility. At a given point in time, some of the lifts may be assigned and engaged with the vehicle(s) being serviced in the service center, while the others may be available.

Generally, when a lift is available and not in use at a service bay, it is transported back and parked or stored or stowed at a home location. However, if a lift that just becomes available after a vehicle has been serviced, may be transported directly to the service bay where an un-serviced vehicle is to be serviced, without an intervening stop at the home location.

When an un-serviced vehicle arrives in the facility, it is driven and parked in a specific service bay. At this point, the guidance system of the present design assigns available lifts to some or all of the axled wheels of the vehicle. Once a lift is assigned to an axled wheel of a vehicle, it is no longer available to be assigned to another vehicle or to a different axled wheel of the same vehicle. After its assignment, an assigned lift is transported to its corresponding or assigned axled wheel under the guidance of the guidance system. More specifically, the guidance system directs the transport mechanism of the lift to its engagement location directly underneath the correspondent axled wheel of the vehicle. Of course, the guidance system performs any needed jack up/down operations prior to transporting the lifts and lifting the vehicles, as already discussed.

The operational flow of the present embodiments is presented in flowchart 500 of FIG. 6, along with a block diagram architecture 600 of the instant design shown in FIG. 7A. Referring to flowchart 500, the first step is the arrival and parking of a vehicle to be serviced in the service bay of a service shop/center or the service facility. The vehicle may be a fully autonomous, a semi-autonomous or a non-autonomous vehicle. An autonomous vehicle drives automatically to the service bay with an appropriate lift.

Further, it may do so by guidance from guidance system 604, or by its own self-navigation without any help from the guidance system. These aspects will be discussed at length further below in relation to the application of the instant design to autonomous vehicles. In any case, the step of the arrival and parking of the vehicle in the service bay is indicated by process box 502. Now, by default, guidance system 604 of FIG. 7A assigns the same number of instant motorized mobiles lifts in the available state as are the number of axled wheels of the vehicle. This is shown by process box 504.

As will be explained that in other variations, the number of assigned lifts may be less than the total number of axled wheels of the vehicle depending on its weight and weight distribution. The weight may be unladen for some vehicles, whereas for fire trucks, for instance, it may be the laden weight with their water tanks full. The assignment process takes into account the specific axled wheels to which the lifts should be assigned based on the weight/distribution of the vehicle for a stable and safe lift.

Per prior explanation, the available lifts may be at a designated home location. Alternatively, they may be at another service bay after the service of a prior vehicle has been completed. Recall that during disengagement, the lifts move back to their pre-engagement locations. As such, these lifts will be at their pre-engagement locations in the service bay where the service of the other vehicle had been completed. After the disengagement of the lifts, the vehicle is generally removed from the bay, although that is not necessarily a requirement.

During, or for the service, in a scenario used in some variations and referred to in here as "lift-to-jack substitution", the technicians may transfer the weight of one or more axled wheels of the vehicle from an instant mobile lift to a jack stand. Thus, in a lift-to-jack substitution also, the lift first moves to its pre-engagement location behind its engagement location. That is required to accommodate the jack stand. Now, if the lift also has a hand-truck mechanism as taught above, a technician may simply pull it to its pre-engagement location manually. Otherwise, once the lift has been lowered and unlocked by the technician, it becomes available and resumes its automatic operation.

Under automatic operation, the lift is now moved by its transport mechanism under the guidance of guidance system 604 to its pre-engagement location. Still alternatively, a user input on the lift may be used to initiate its movement to its pre-engagement location. In addition or instead, a user input may also be used to activate its motorized/automatic mode of operation with its motorized transport mechanism operating under the guidance of the guidance system. In any case, as explained above, whether or not a lift-to-jack substitution occurs, and whether or not the lift is removed manually or automatically, it becomes available at its pre-engagement location.

Before proceeding further, let us take a closer look at the relationship between the pre-engagement and engagement locations according to the teachings. FIG. 7B illustrates a service bay 650 that has a vehicle 652 parked in it ready to be serviced. The drawing shows four lifts 654A, 654B, 654C and 654D stationary at their pre-engagement locations. As shown, these pre-engagement locations are laterally to the side of the corresponding engagement locations. As already taught, for engagement to occur these lifts have to turn to face their corresponding assigned wheels with their respective engagement mechanisms. They then move forward to slide their respective engagement mechanisms underneath the corresponding assigned axled wheels.

The final engagement locations for lifts 654A, 654B, 654C and 654D are shown by dashed boxes 656A, 656B, 656C and 656D respectively. During disengagement, the lifts move backward to their pre-engagement locations shown in the figure, with their respective engagement mechanisms sliding out from underneath the corresponding axled wheels. At this point, lifts 654A-D turn again to face away from vehicle 652 in order to start travel. In FIG. 7B, lifts 654A-D turn to face upwards after disengagement. FIG. 7B also shows the presumed path of travel 670 for the lifts.

Now returning back to flowchart 500 of FIG. 6, as shown by process box 506, guidance system 604 directs the transport mechanism 606 (see FIG. 7A) of each assigned lift to commence its transportation to its next destination. The transportation is to and ends at the new engagement location of the assigned lift for the servicing of an un-serviced vehicle. The engagement location is again directly underneath the assigned axled wheel of the un-serviced vehicle.

As mentioned, in other variations, the number of lifts assigned and sent to the vehicle may be less than the number of the axled wheels. This may happen if the weight distribution and stability of the vehicle so permits. A minimum of four lifts at four opposite-facing axled wheels of the vehicle are required for stable lifting/lowering of the vehicle.

Explained further, four lifts may be assigned to four opposite facing wheels of a vehicle having two or more axles (and consequently four or more axled wheels). Similarly, six lifts may be assigned to a vehicle having three or more axles (and consequently six or more axled wheels), and so on.

Even an odd number of lifts may be assigned, again depending on the weight distribution and stability factors related to the vehicle (so long as the minimum number of assigned lifts is four). Guidance system 604 is able to make the above determination of the number of lifts required either by user input, or by accessing/interfacing to a suitable Information Technology (IT) system of the service center. Such a backend IT system may be a service order management system or a fleet management system or the like. Alternatively, or in addition, guidance system 604 may also interface with an onboard vehicle diagnostics dashboard/system for this information.

The communication with an onboard system utilizes appropriate wireless sensors on the vehicle and their counterpart sensors in the lifts and/or the service center. Further, the interfacing typically involves using an application programming interface (API) correspondent to the system being interfaced to. The API includes but is not limited to any appropriate methods, tools, techniques, subroutines or protocols for such communication/interfacing available in the art. Such integration with a backend and/or onboard diagnostic/telematics system is also discussed in this specification in relation to other embodiments. As will be apparent to a skilled reader, those discussions are also relevant to the above teachings and vice versa. In some variations, it is control system 602 or even some other appropriate module of the instant design that does the above interfacing.

Note that a fleet management system/software also sometimes incorporates the functionality for the maintenance of the fleet. Such functionality is also referred to as maintenance, repair and operations (MRO) in the art. In any event, the above interfacing allows guidance system 604 to obtain the make and model of the vehicle being serviced and the current operating parameters. From this information, weight, weight distribution and other stability factors of the vehicle can be determined, and from that information in turn, the number of lifts required to be assigned.

The assigned lifts are assigned which then arrive at the end of their transportation at their corresponding engagement locations for the servicing of the vehicle just arrived. This transportation step is indicated by process box 508. Note that this transportation step involves the lifts first arriving at the pre-engagement locations, then turning to face the vehicle and then moving forward to their final engagement locations. However, these internal steps are not explicitly called out in flowchart 500 of FIG. 6 to avoid detraction.

Next step 509 is to ensure that the engagement mechanism of the lifts is set to accommodate the wheel diameter. Specifically, and referring back to FIG. 2A, engagement mechanism 204 may be manually adjusted by a technician using holes 216A and pins 216B along shafts 203A-B of carriage assembly 202. As already noted, the clearance between prongs 214A-B of lift 200 is kept sufficiently less than the diameter of the respective wheel for a stable lift.

Alternatively, engagement mechanism may be automatically adjusted by guidance system 604 by rotating worm 218A and adjusting gear 218B according to the wheel diameter. For this purpose, guidance system 604 of FIG. 7A has the knowledge of the wheel diameter by accessing the service order in a suitable IT system containing the make and model of the vehicle being serviced. In other embodiments as will explained further below, this information may be determined by utilizing sensors and suitable instrumentation of the service center/bay and/or the lifts themselves.

Furthermore, computer vision and machine learning may also be utilized for this purpose. Still alternatively, a technician may activate appropriate controls on the lift to adjust its automatic engagement mechanism of worm and gear 218A-B. Note that in other variations, step 509 may be performed at any convenient time earlier than engagement step 510 described below, and not necessarily immediately prior to step 510 as shown in flowchart 500 of FIG. 6.

At this point in the operational flow presented in flowchart 500, the lifts engage with the corresponding axled wheels of the vehicle, as shown by process box 510. Next, the lifts are locked as shown by box 512. Locking is the process by which all the engaged lifts are synchronized and coordinate together so that the vehicle can be stably and safely lifted or lowered. This task is typically accomplished by control system 602 of FIG. 7A. As many lifts in the industry possess this capability, the details of the locking mechanisms and associated componentry will be known to those skilled in the art and is not delved into detail in this disclosure. Furthermore, the mobile lifts also have a weight gauge/sensor that indicates the weight being lifted by the lift. If the weight being lifted is over the specified lifting capacity of the lift, control system 602 is alerted to take appropriate measures. These may include halting the lifting operation, raising an alarm, informing a technician, etc.

Note that in the industry, sometimes locking also refers to the mechanical, usually pin-based, locks that the lift engages in during its lifting. These mechanical locking levels or pins, usually accompanied by a loud clicking sound during lifting, prevent the lift from falling below the last locked level, if the electromechanical and/or hydraulic power of the lift were to suddenly fail. We will not be concerned with that mechanical locking in this disclosure and will use the term lock/locking to refer to the above discussed synchronization of the lifts by control system 602.

The present design allows for wired or wireless modes of communication between the individual lifts of the instant mobile lift system, or between the lifts and a backend system, such as the backend component of guidance system 604. The functionality of guidance system 604 will be taught in detail further below. For practical reasons, during transportation, a wireless mode of communication amongst the lifts themselves or between the lifts and a backend system is preferred over a wired mode of communication.

However, during locking/unlocking and raising/lowering of the lifts, a wired mode of communication will also be practical. This communication is coordinated by control system 602 of FIG. 7A and may also involve other suitable control operations. The wired form of communication may employ suitable communication lines/cables and the many protocols available in the art.

The wireless mode of communication may also employ any suitable technology such as Wi-Fi/IEEE 802.11, Bluetooth, ZigBee, IPv6 over Low power Wireless Personal Area Networks (6LoWPAN), etc. Just prior to or after locking but before lifting, the lifts are jacked down by guidance system 604 per above discussion. Then control system 602 controls or manages the lifting or raising of the vehicle by sending appropriate commands to the engaged column lifts. This is shown by process box 514 of FIG. 6. The height to which the vehicle is raised will depend on the service or application required on the vehicle and other parameters related to the shop/bay such as technician height. As discussed earlier, the height may be set as a preference or computed by the system based on parameters such as worker height, safety check requirements and/or knowing the make/model of the vehicle and the service required.

At this stage, the required service is performed on the raised vehicle as indicated by box 516. As already mentioned, the service may include among others a simple inspection, a repair/replacement service or a routine or ad-hoc maintenance service. The service may also include replenishing or replacing consumables such as oils or lubricants, fuels as well as fixing, replacing, adding or removing parts/components. The various types of such services are extremely varied as will be appreciated by skilled artisans. The present teachings are agnostic to the exact types of such services performed.

It may be that the vehicle stays raised on the column lifts for the duration of the service being performed, as mentioned earlier. However, as discussed above in a lift-to-jack substitution scenario, it is also entirely possible that the technician may shift one or more engaged axled wheels of the vehicle to a jack stand once the vehicle is in the raised position. The way this is accomplished is that the technician brings the desired number of jack stands under the vehicle, underneath corresponding lifting/jacking points. He/she then employs control system 602 of the lifts to lower the vehicle on the jack stands.

At this point, the vehicle may entirely be on jack stands or a combination of jack stands and instant lifts. The motivation of using jack stands is typically to service wheels, shocks, brakes, etc. but may also be to maximize the utilization of the lifts, which may be an expensive or scarce resource in the service center. Of course, the service may just be an inspection or repair or replacement or maintenance, etc.

After the completion of the service, the raised vehicle is lowered to the ground under the coordination and management of control system 604. This is shown by box 518. If the vehicle had been transferred onto one or more jack stand(s) per above teachings, process box 518 performs several internal steps referred in here as "jack-to-lift substitution" scenario. These internal steps are not explicitly called out in flowchart 500 to avoid detraction.

For jack-to-lift substitution to occur, as many motorized mobile lifts need to be brought back to the service bay as required to transfer the weight of the vehicle back onto the lifts. Control system 602 keeps a record of the number and the engagement locations of lifts assigned to the vehicle being serviced. Optionally, it also records the heights to which each lift was raised. If the vehicle is transferred onto jack stand(s) per lift-to-jack substitution above, control system 602 knows which lifts were removed, to what height they were raised, and the coordinates of their original engagement locations underneath the vehicle.

Now, after the completion of the service of a vehicle that is on jack stand(s), the technician first activates control system 602 for lowering of the vehicle. He may do so by a user interface of control system 602. At this point, control system 602 communicates the required number and engagement locations of the lifts to guidance system 604. Guidance system 604 then assigns the required number of lifts to the vehicles, and the lifts travel to their precise engagement locations communicated by control system 602. Optionally, the lifts are also raised to a little lower than their previously raised heights recorded by control system 602.

Now all the lifts are locked again in conjunction with control system 602. The vehicle is raised a little by the technician via control system 602, the jack stands are removed and the lifts are lowered to the ground. Note, that if the previous height of the lift(s) is not recorded, the technician would simply raise the lift(s) until it just engages with the correspondent wheel(s), and is ready for locking. The technician has to raise the vehicle to remove the jack stands per above.

Of course, the above jack-to-lift substitution internal steps of process box 518 of FIG. 6 are only required if a lift-to-jack substitution were performed in the first place. The above described functions for the internal steps of box 518 may be implemented entirely in guidance system 604 of FIG. 7 or entirely in control system 602. They may also be implemented in some other combination of systems 604, 602 or still in a separate computer module, partially or entirely. As mentioned, these include assigning the correct number of lifts required for jack-to-lift substitution by guidance system 604. Further needed are the coordinates of the engagement locations for jack-to-lift substitution, along optionally with the last height raised of the lifts.

After jack-to-lift substitution as needed and as described above, the lifts are lowered to the ground. They are then unlocked as shown by box 520 in FIG. 6. Next, engaged lifts disengage as shown by box 522. According to previous teachings, they do this by sliding/moving out backward from their engagement locations underneath their correspondent wheels to their pre-engagement locations. Per above discussion, guidance system 604 jacks up the lifts prior/during their disengagement as needed, so they have enough clearance above the ground for their movement/transportation.

Finally, the status of the lifts is changed to available. At this point, one, some or all of the available lifts may commence their transportation under the guidance of guidance system 604. The transportation may end at the home location or at a new engagement location for the servicing of another un-serviced vehicle. Alternatively, the available lifts may just stay in the service bay after disengagement at their pre-engagement locations, waiting for their next assignment. This step is shown by process box 524.

Looking at the various components of block diagram architecture 600 of FIG. 7A, as already mentioned, control system 602 manages/controls/synchronizes the lifts for locking, unlocking and lifting, lowering of the vehicle in a safe and stable manner. These functions have been available in the industry for quite some time, and as such, we will not delve into detail into the working of control system 602.

Similarly, the electrical, mechanical and/or hydraulic mechanisms for raising and lowering the lifts have also been available in the industry for many decades and will not be delved into detail. Transport mechanism 606 of FIG. 7A, and its possible forms were already introduced and described in reference to the embodiments and teachings related to FIG. 2A-B through FIG. 5. We will thus now focus on the working of guidance system 604 in detail.

Guidance system 604 of FIG. 7A selects and assigns available lifts from the pool of lifts in the service center. Based on the assignment of an available lift to a specific axled wheel of a vehicle, guidance system 604 guides its transport mechanisms 606. Transport mechanism 606 in turn transports the lift to its engagement location underneath its corresponding specific axled wheels of a vehicle parked in a specific service bay. Per above teachings, this transportation includes the steps of first transporting the lift to its pre-engagement location, orienting it correctly and then moving/transporting it forward to its ultimate engagement location.

Note that there is a resource management aspect to this assignment process, because available lifts are the resources that need to be assigned to the demands of the incoming vehicles. Thus, the assignment and resource management functions of guidance system 604 may also be separated out into a dedicated resource manager module without departing from the principles of the instant teachings. In one embodiment, guidance system 604 performs resource management simply on a first-in-first-out (FIFO) basis. In other words, vehicles that arrive first get the available lifts assigned first. If enough lifts are not available to assign to a vehicle, guidance system 604 does not perform new assignments until more lifts become available or alternately stated, the backlog is cleared.

The skilled artisan will appreciate the many different design choices available to design and architect the computerized software, hardware and control systems aspects of the present design. In one embodiment, guidance system 604 can be based on a client/server model where the client component resides on each individual lift and the server component resides on a server in the service center or in the cloud. Alternatively, guidance system 604 may be a monolithic software residing completely on each lift and able to coordinate with other peer guidance systems on other lifts.

In any case, once the assignment process has been completed, the main task of guidance system 604 is to direct transport mechanism 606 for each assigned lift. Under this supervision, guidance or direction of guidance system 604, transport mechanism 606 moves/transports the lift to its engagement location. This transportation may be from an existing pre-engagement location where the lift has disengaged after servicing of an earlier vehicle. Alternatively, the transportation may be from the home location. To accomplish its objectives, guidance system 606 employs one or more of a number of different techniques that we will delve into more detail below.

Firstly, to avoid undue repetition, the examples in the below teachings may cover scenarios only directing lifts to their engagement locations. However, the reader is instructed, that the same principles and explanation apply to other relevant scenarios. These include among others directing lifts from their pre-engagement location to the home location after the servicing of a vehicle. These also include directing lifts from their pre-engagement location to the home location during the servicing of a vehicle if the vehicle is transferred to jack stand(s) as explained above in reference to lift-to-jack substitution.

Secondly, the below as well as other embodiments in this disclosure may also benefit from also having a hand-truck/dolly or tie-bar mechanism, such as the one shown and explained in reference to FIG. 3A-B. This mechanism is provided in addition to motorized/automated transport mechanism 606 and computerized guidance system 604. As already explained that after the lifts have been positioned at or near their respective engagement locations in a motorized/automatic fashion, then the manual hand-truck/dolly mechanism is employed. If necessary, it is used for fine-tuning the positions of the lifts underneath their corresponding axled wheels by utilizing human expertise. As already taught, the hand-truck mechanism may also be used by technicians for manually disengaging the lifts and pulling them backward to their pre-engagement locations.

Sensor Based Guidance

Guidance system 604 employs sensors on the lifts and/or in the environment of the service center to guide/direct transport mechanism 606 of the lifts. These sensors include one or more from a variety of sensors, including but not limited to the following:

a. Global Positioning System (GPS) sensors: Widely used technology typically used to determine absolute position with respect to the earth. Since it uses satellites, outdoor use is preferred. If the indoor area is big and does not have multilayered walls and is not underground then it can work with reduced accuracy even indoors. Routine GPS have a precision of 2.5 meters or more. However, by using various techniques known in the art, the accuracy can be improved all the way up to 4 inches.

b. Magnetometer: These are used to determine the orientation of the device with respect to the earth's magnetic axis.

c. Angle sensors: They are used to determine the angle between two objects. They can be contact type sensors or non-contact type sensors such as optical or magnetic encoders. In the industry, non-contact type magnetic angle sensors are preferred for very long life. They typically have 0.1° accuracy.

d. Proximity sensors: There are two main types of proximity sensors for present consideration. One is based on ultrasonic wave reflection and other is based on infrared ray reflection. Ultrasonic sensors have greater range and can work up to 4 meters whereas infrared sensors work up to 0.8 meters. They typically have around 2 milli-meter accuracy. Ultrasonic sensors are preferred due to their robustness against the surface properties as color and temperature of surface does not impact their performance.

e. Laser obstruction sensors: These are simple sensors where a focused beam of light is projected on a photo-receiver on the other end. During such time when there is no obstruction, the circuit is closed. But as soon as some object enters in the path between the source and the receiver, the circuit becomes open.

f. Lidar (ht Detection And Ranging): A Lidar sensor/instrument measures the distance to a target by sending a pulsed laser light to the target, and then measuring the reflected pulses with a sensor. Differences in the return times and wavelengths of the laser are then used to make digital representations of the target. This technology is popularly used to make high-resolution maps as well as for control and navigation of some autonomous cars.

g. Image sensors: These are matrices of photodiodes of various sizes such as 16×16 or 32×32. Each diode senses the light coming to it and gives a voltage proportional to the intensity of the light. They can be used to detect a light source. With appropriate lensing, they are configured to create an imager or a camera.

h. Linear encoders: They are used to measure the linear distance travelled by one object/part with respect to another object/part. They come in various shapes and sizes and can have accuracy less than 0.1 milli-meter.

i. Indoor Positioning/Position Systems (IPS): Sometimes also referred to as indoor location sensing/positioning systems, IPS systems can employ a variety of sensors technologies. These include Global Positioning System (GPS) sensors introduced above in situations where the signal indoors is strong enough to be able to have a high degree of location accuracy, ideally a few centimeters. Additional possibilities include but are not limited to any combination of technologies including GPS, Wi-Fi, WiMax, Ultra-wideband (UWB), Bluetooth, cellular, Lidar, radar, as well as locally placed/installed beacons, and other like or otherwise solutions or sensors suitable for getting a fix on the current location of an object. Still additionally, any combination of the above described sensors, including those in sub-sections (a) though (h) of this section, may also be used to implement an IPS solution. Exemplary industry solutions that may be considered IPS or IPS-like include those from Navizon Technology, Skyhook Wireless, Acuity Brands, Locata (LocataTech—sometimes referred to as "Your own GPS"), etc.

IPS or IPS-like solutions may use any combination of techniques known in the art, such as triangulation, trilateration, dead-reckoning, geo-location, geo-fencing, etc. to obtain a fix on the present location of the sensor(s) in question. For this purpose, gyroscopic sensors and accelerometers may also be employed. The solutions may also combine these technologies and approaches with statistical techniques such as Bayesian statistical analysis and Kalman filtering and the like. For a thorough treatment of these and related subjects, the reader is directed to the books "Indoor Wayfinding and Navigation" dated 2015 of CRC Press, edited by Hassan A. Karimi (ISBN-13: 978-1482230840, ISBN-10: 1482230844), and "Indoor Location-Based Services: Prerequisites and Foundations" dated 2013 by Martin Werner (ISBN-13: 978-3319106984, ISBN-10: 3319106988).

In yet another variety of such IPS-like indoor location sensing/positioning systems referred to as a visual positioning service (VPS), computer vision and augmented reality (AR) are used in conjunction with a camera(s) to locate/sense the position of objects in a 3-dimensional (3D) environment. An exemplary implementation of such a system is the VPS system of Google, enabled by Google Tango.

j. In general: The present teachings and sensor based guidance are agnostic to a particular choice of sensors, technologies, techniques or approaches. As such, the teachings are easily extended to any type of sensor(s)/camera(s) and associated hardware or software that may be used to sense its own position or the position of an object in an environment. For this purpose, the sensor(s)/camera(s) may be installed on the lifts and/or the environment (such as the service bay or anywhere else in the service center) and/or the vehicles themselves. Obviously, the camera(s) may just produce still images or a continue/video output.

The knowledge of this position, also sometimes referred to as obtaining a fix, is then employed in automating a variety of vehicle lift operations. The details of such automation are presented throughout this disclosure in reference to the various embodiments. These operations include but are not limited to:

Guiding the transportation of motorized mobile.

Guiding the engagement of fixed or motorized mobile lifts based on knowing the position/orientation of their engagement mechanism with respect to the target engagement locations. Relatedly, knowing the exact position of the vehicle in a service bay for proper engagement and safe hoisting.

Guiding the transportation of the vehicles (autonomous or otherwise) to an appropriate service bay.

Therefore, sensor based guidance of the present teachings may also employ other sensors including but not limited to inertial sensors such as accelerometers, gyroscopes, vibration sensors or optical flow sensors (for motion detection or other relevant applications), acoustic sensors, microwave sensors, ultrasonic, sonars or radio frequency identification (RFID) sensors (for position/location information and other relevant applications), compasses, Hall effect sensors or magnetometers (for orientation information and other related applications), etc.

Additionally, techniques known in the areas of inertial navigation systems (INS) and simultaneous localization and mapping (SLAM) may also be applied for position/location determination applications of the present design. For a given implementation, the choice and determination of the presently described techniques, technologies, approaches and sensors will be apparent to a person of average skill who will also understand their particular limitations, pros and cons and suitability for specific situations.

By employing one or more of the above sensors, technologies and techniques, guidance system 604 of FIG. 7A directs the movement of each lift by sending appropriate commands/instructions to its transport mechanism 606. In one embodiment, proximity sensors are fitted in an array on each side of a service bay where the vehicle is parked. This embodiment is represented by service bay 700 shown in FIG. 8. Specifically, service bay 700 of our shop/facility/service center has a vehicle 702 parked in it. Vehicle 702 is shown as a truck however, it can be any automotive vehicle with axled wheels/tires. Vehicle 702 has axled wheels 704A, 704B, 704C, 704D, 704E and 704F. Of these, only wheels 704A-C and 704E are visible in the perspective view of truck 702 shown in FIG. 8.

Ultrasonic proximity sensors 720 are installed in arrays 710A and 710B on the two opposite-facing length-wise or longitudinal sides of bay 700 as shown. Note that FIG. 8 explicitly shows four such sensors marked by reference numeral 720 although any number of these sensors may be present as shown in FIG. 8. Sensors 720 may be present along the entire length of the bay or only on selected sections along which the wheels of the vehicle to be serviced, such as wheels 704A-F of vehicle 702 are expected to be parked. Using the above described functionality, proximity sensors 720 determine the exact coordinates of each axled wheel/tire 704A-F of vehicle 702. This information is conveyed to guidance system 604 (see FIG. 7A). Based on the number of axled wheels, guidance system 604 assigns the required number of lifts per above teachings.

In alternative embodiments, once vehicle 702 is processed into the service center, guidance system 604 can access the service order for the vehicle to determine its make and model number. Additionally, or instead, it may also interface with an onboard diagnostic system to obtain such and/or other diagnostic information per above teachings. This information allows guidance system 604 to know the number of axled wheels 704A-F in vehicle 702 in advance, as well as the size and width of wheels 704A-F and those of vehicle 702 itself. Also as a result of the above interfacing, guidance system 604 may further know the weight and stability factors for the vehicle. With this information, it can determine if the actual number of lifts required for safe lifting/lowering of the vehicle is less than the number of its axled wheels.

In any case, armed with the knowledge of the number and the exact coordinates of the wheels requiring lifts, guidance system 604 first assigns available lifts to the axled wheels per above teachings. It then computes the optimal path for each assigned lift. The path is computed from the present location of each assigned lift to its destination. As already taught above, the present location may be the home location or a pre-engagement location. Additionally, it can be any other location in the service center. The destination may be the home location or the next engagement location.

Based on the size/diameter of wheels 704A-F at any time prior to their engagement, guidance system can adjust automatic/motorized engagement mechanism 204 of each lift 200 (see FIG. 2A and the associated explanation). Guidance system does that by rotating worm 218A and gear 218B to a clearance of prongs 214A-B sufficiently smaller than the diameter of the respective wheel to which the corresponding lift is assigned. Alternatively, a technician/worker can manually adjust engagement mechanism 204 at any convenient/safe time prior to the engagement of the lift by inserting pin 216B in an appropriate hole 216A.

Recall from above that guidance system 604 computes/determines the optimal path for each assigned lift from its current location to its destination location. In one embodiment, guidance system 604 uses the well-known Dijkstra's algorithm for finding this path. In such an embodiment, the facility is modeled in the software as a graph with nodes. Each node has predetermined coordinates based on the physical location of the node in the facility. Each service bay, such as bay 700 of FIG. 8 is modeled as a node. Similarly, each possible pre-engagement location and engagement location in a service bay can also be modeled as a node.

Additional suitable locations in the facility, such as turns and intersections can also be modeled as nodes. Now, the coordinates of wheels 704A-F in bay 700 are conveyed by sensors 720 to guidance system 604 and are known. Thus, for each assigned lift, guidance system 604 computes the path to the engagement location node in the graph at or closest to the location of its assigned wheel of vehicle 702 in bay 700.

The path between nodes is modeled as an edge in the graph and is weighted based on the distance between the nodes, or on other properties of the path. For instance, some paths may have less human or other traffic and may be more preferred than others. Such paths would be modeled as having less distance in the graph, to be preferred by Dijkstra's algorithm. The algorithm and the software can be implemented using any language and computer technology of choice, such as Java, C/C++, assembler, SQL, etc. Such implementations for the algorithm are well known in computer systems and computer science disciplines and will not be delved into detail in this specification.

In alternative embodiments, guidance system 604 uses other path finding algorithms available to skilled artisans in computer science and software/systems programming. These include but are not limited to A* search algorithm, Bellman-Ford algorithm, Euclidean shortest path algorithm, Floyd-Warshall algorithm, Johnson's algorithm, etc. Again, the implementation of these algorithms in computer science is well-known and will not be delved into detail.

Once guidance system 604 has determined the optimal/desired path for each assigned lift, it directs transport mechanism 606 of the lift to power/motor the lift to its engagement location. Lifts can be activated/directed sequentially to avoid collisions or bottlenecks. But if multiple lifts are motorized/moved simultaneously, guidance system 604 ensures that it avoids or minimizes collisions or accidents between the lifts.

In such a scenario, guidance system "schedules" the traffic of the assigned lifts to their engagement locations in a manner so as to avoid/minimize bottlenecks or collisions. One way it ensures that is that on a given path only a predetermined maximum number of lifts are traveling at a given time. Another way it ensures that is in a given path with no intervening nodes, lifts are not traveling in opposite directions at a given time. Similarly, it can also employ other such heuristics and rules.

To further avoid/minimize collision between lifts and with other objects, one or more of the above described types of sensors, such as cameras or proximity sensors are fitted on the lifts themselves. These sensors/cameras may be integrated into the lifts from the time of their manufacture or installed in a retrofitted manner. One such lift 800 is shown in FIG. 9. Lift 800 is a variation of lift 400 shown earlier in FIG. 5 except with the addition of a camera 802 and a sensor 804, which can be a proximity sensor taught above. Note that any number of such cameras and/or sensors may be present on lift 800, although only camera 802 and sensor 804 are explicitly shown in FIG. 9.

If lift 800 detects another object or lift in its proximity during its travel to its destination, it immediately brakes and stops. It then waits a given/predetermined amount of wait time or until the object or lift is cleared from its proximity, before resuming travel. This is also an important safety feature of the system because it prevents any human or property accident from happening as the brakes stop the lift immediately upon detecting an obstacle. If the obstacle is another lift then this race condition is resolved as will be explained below. Otherwise, the obstacle may need to be removed by a human, or if the obstacle itself is a human then he/she will need to step out of the way of the lift. In fact, once a lift is stopped per above, it may also sound a safety alert or alarm for cautionary reasons.

Since sensors/cameras are present on the lifts such as lift 800 of FIG. 9, a lift will "know" when it is stopping because another lift is in its way. Tie-breaking rules may be employed by guidance system 604 to resolve such a race conditions. Since human safety is not the primary concern in this scenario, the lift can also reverse a predetermined distance and then wait a predetermined wait time before resuming its travel. For example, when two or more lifts, such as lifts 800, are stopped for collision avoidance per above, the lift with the highest identification number reverses a given distance first. An exemplary distance may be 6 feet back on its traversed travel path. It then waits for a predetermined wait time, for example 5 seconds.

The lift with the next lower identification number then attempts to proceed forward. If it is still unsuccessful, it then also reverses a predetermined distance and then waits for a predetermined wait time, for example 3 seconds. The lift with the next lower identification number then attempts and so on. Of course if the lifts stop because of an obstacle other than the lift, safety alarm is sounded by the lift and travel does not resume until the obstacle is cleared.

Ultimately, one of the lifts will proceed, clearing the path for the next lift which will then succeed on its next attempt. In the preferred embodiment, the lifts and specifically their guidance systems, can directly communicate with each other using any of the available suitable wireless technologies or modes of communication, including the ones provided above. In such an embodiment, guidance system 604 residing on the lifts does not have to rely on communicating with a backend server in the service center or the cloud to obtain individual instructions for their movements.

In another variation of bay 700 shown in FIG. 8, sensors 720 in arrays 710A-B are made retractable so that they can be retracted inwards below the ground. Once vehicle 702 has been parked and prior to commencing the assignment and transportation of lifts, sensors 720 are brought above or at ground level so that they can have maximum effectiveness. However, when vehicle 702 needs to move, they are brought inwards below ground level, to avoid potential damage from or interference with wheels 704A-F of the moving vehicle or other shop equipment.

In yet another variation of sensor based guidance according to the present teachings, arrays of laser obstruction sensors described above are placed on either side of the service bay. Such an embodiment is depicted by service bay 900 shown in FIG. 10 which is a variation of service bay 700 of the embodiment of FIG. 8. Note that reference numerals 704A-F depicting the wheels of vehicle 702 from FIG. 8 have been removed in FIG. 10 for clarity. For each row of the axled wheels of vehicle 702, laser/light sources 920A are placed on the outer side of the service bay and photoreceivers 920B are placed on the inner side of the wheels as shown. FIG. 10 also shows the 1:1 correspondence between laser sources 920A and receivers 920B, while designating only one pair of source/receiver combination by reference numerals 920A/920B to avoid clutter.

The positions of sources 920A and receivers 920B may also be reversed. In other words, source 920A may be placed on the inside of the wheels and receivers 920B on the outside. Furthermore, one or more sources 920A may be on the inside of the wheels while the others on the outside of the wheels in a given implementation. The same process is repeated for the other row of the axled wheels as shown. These laser sensors determine the exact coordinates of the wheels once vehicle 702 is parked. This information is then conveyed to guidance system 604 (see FIG. 7A and the associated explanation) which then determines the number and the exact engagement locations of the lifts required and the process continues per above teachings. Guidance system 604 may further incorporate the knowledge of the make/model of the vehicle in guiding lifts to their destinations, also per previous teachings.

In one variation of the above embodiment represented by service bay 950 illustrated in FIG. 11, one or more laser source/receiver pairs 960A/960B are moved in conjunction with each other longitudinally in bay 950. This longitudinal movement is depicted by the solid arrows shown in FIG. 11 and its purpose is to scan for the location of the axled wheels once vehicle 702 is parked. The movement of laser source/receiver pairs 960A/960B may be accomplished using a guide rail and a suitable linear motor. The exact locations of the parked axled wheels is then communicated to guidance system 604, and the rest of the process continues per above explanation. The advantage of above laser based embodiments is that they are robust against any after-market modifications in the vehicle body or wheels.

In other words, the make/model of the vehicle utilized by guidance system 604 per above explanation, may not accurately convey the exact size of the wheels. That is the case, if the vehicle owner has performed any non-standard modifications to the vehicle. The laser based embodiments of FIG. 10-11 are still able to determine the exact coordinates for the location of axled wheels 704A-F of vehicle 702. As such, in these embodiments, the make/model information may be kept optional to guidance system 604.

In addition to or instead of the laser source/receiver pairs 920A/920B and 960A/960B in the above laser based embodiments of FIG. 10 and FIG. 11 respectively, proximity sensors explained earlier may also be used. Furthermore, similarly to the embodiment of FIG. 8, source/receiver pairs 920A/920B and 960A/960B of FIG. 10 and FIG. 11 respectively can be made to retract inward into the ground to avoid being damaged when vehicle 702 is moving. Finally, any other suitable electromagnetic, radio or light sources and corresponding receivers may also be applied in the embodiments of FIG. 8-11.

In a highly preferred variation of sensor based guidance techniques, a sensor fitted on the lifts may be used by guidance system 604 to first direct the lifts near their destination. A magnetometer fitted on the lift is then used to orient it in the correct direction with its engagement mechanism facing the wheel. Thereafter, proximity sensors are used by guidance system 604 to direct individual lifts accurately to their engagement location underneath corresponding axled wheel. Such an embodiment is represented by lift 1000 shown in FIG. 12 where first a GPS sensor is used for above described directing of the lifts near their destination.

Lift 1000 is reminiscent of earlier embodiments, except it has a GPS sensor 1002, a magnetometer 1004 and a proximity sensor 1006 integrated/retrofitted as shown. The advantage of such an embodiment is that it does not require the capital expense of retrofitting or upgrading the service bay/center. The sensors are fitted on just the lifts themselves. As in other embodiments, the guidance system resides entirely or partially on the lifts per above teachings. Note that the choice and number of placement of sensors 1002, 1004 and 1006 on lift 1000 is exemplary only. The skilled artisan will have many choices for various combinations, number and placement of these sensors and the like, on the lifts within the present scope.

In a fixed variation of the mobile column lifts, the column lifts are attached to the service bay using hinged arms. The number of lifts thus attached may vary according to the types of vehicles serviced in the facility and/or the specific service bay. For typical uses, four lifts may suffice. In other cases, six, eight or more lifts may be needed. The hinged arms have angle sensors to accurately position the lifts underneath corresponding angled wheels. Additional sensors can be employed for the final positioning as well.

In yet another embodiment utilizing sensor based guidance according to the instant teachings, sensors are retrofitted or embedded into the vehicles themselves. Their purpose is to assist in the guidance of the lifts to their engagement locations and in their engagement with the vehicle. In this embodiment 1050 illustrated in FIG. 13, sensors such as light sources 1052 are attached to the axled wheels of vehicle 702. This is done either on an aftermarket basis, or by technicians upon the arrival of vehicle 702 into the facility and prior to its service.

Then image or other appropriate sensors capable of detecting the sensors placed on the wheels above are fitted on the lifts. These are then used by guidance system 604 to direct the lifts onto these axled wheels and specifically to their engagement locations. In the exemplary embodiment shown in FIG. 13, these light sources may take the form of battery powered Light Emitting Diode (LED) source with magnetic bases to attach to the rims. Appropriate mechanisms to turn on/off these light sources prior and after the service will be apparent to those skilled in the art. The appropriate placement choices/locations of corresponding detecting sensors, such as image sensors described above, on the instant lifts will also be apparent to the skilled artisans.

Advantageously, all light sources such as LEDs 1052 of FIG. 13 are attached to the axle at the center of the rim. This allows for a constant height of the LEDs to home in the lifts to their respective engagement locations under the direction of guidance system 604. Of course, other techniques/sensors of the previous embodiments may also be used to first bring the lifts near their destinations so that final directing/homing of lifts can take place. These include among others using GPS sensors as in an earlier embodiment. The lifts direct or home onto their engagement locations in this embodiment by steering towards increasing light intensity and consequently towards the wheel under the guidance of guidance system 604.

Computer Vision and Artificial Intelligence

Instead of or in addition to using sensor based guidance techniques described above, guidance system 604 of FIG. 7A may also utilize computer vision based techniques. It may also supplement computer vision with artificial intelligence techniques of machine learning. More specifically, a camera fitted on the lift captures a screen shot or continuous video of its surroundings. In combination with any other sensors present on the lifts, the images/video from the camera and inputs/readings from the sensors are then processed by an appropriate computer software based module on the lift and/or the backend facility or the cloud. In an exemplary embodiment, this task may be carried out by the guidance system 604 of FIG. 7A itself.

There are many computer vision techniques that can be employed for this purpose in order for the motorized mobile lifts to "understand" their environment, as they are transported from their present location to a destination location within the service center. Computer vision techniques are typically employed in sequential stages, commonly referred to as a computer vision pipeline. A vision pipeline typically employs the following broad categories of techniques:

a. Image acquisition: The first stage of the process is the acquisition of the input data or images/videos. The data may be captured/acquired using one or more cameras or image sensors. Besides light-sensitive cameras, these sensors may also include among others range sensors, radar, ultra-sonic sensors, etc. Depending on the types of the cameras/sensors involved, the resulting data is a two-dimensional or a three-dimensional image or a sequence of images.
 b. Pre-processing: Before applying specific vision based processing to the data, it is typically necessary to do some preprocessing of the data. This is to ensure that the data satisfies certain assumptions implied by the vision techniques to be applied. Exemplary preprocessing steps include, re-sampling, noise reduction, contrast and brightness enhancements, scaling, etc.
 c. Feature extraction: Next, features of interest at various levels are extracted from the image data. Typical examples include edges, lines, ridges, corners, blobs/points, shapes, motion, etc. Among the many techniques available to skilled artisans in this area is the popular Canny edge detection algorithm for edge detection.
 d. Segmentation: Because of the enormity of the processing required, usually a decision needs to be made about which image regions or points are of further interest. These are then passed onto the subsequent stages.
 e. Processing: At this stage, the segmented/selected data is further processed to satisfy specific objectives. These include object recognition, tracking, feature matching, pose determination, registration, etc.
 f. Decision making: Finally, decisions are made about the data based on the application objectives. These may involve match/no-match decisions, pass/fail decision, or decisions flagged for further human review.

A simplified version of such a computer vision pipeline is illustrated in FIG. 14 with each stage of the pipeline represented by a sub-process box. Specifically, vision pipeline 1100 includes sequentially fed stages of data acquisition 1102, pre-processing 1104, segmentation or selection of areas of interest 1106, main processing 1108 and analysis/decision making 1110 as shown. For a more thorough treatment of the subject of computer vision pipelines, the reader is referred to Chapter 8 of the textbook Computer Vision Metrics by Scott Krig dated 2014.

The computer vision techniques presented above are often used in conjunction with machine learning or artificial intelligence techniques to automatically "learn" about the environment being processed. These techniques can include unsupervised learning, supervised learning or a combination of the two. In unsupervised learning, the system automatically established its knowledge about the environment whereas in supervised learning a human user imparts the right inputs and knowledge to the system for its learning and training.

For a detailed treatment of the topic of machine learning for computer vision, the reader is directed to the book Machine Learning for Computer Vision by Roberto Cipolla, Sebastiano Battiatoand Giovanni Maria Farinella dated 2013. Obviously, supervised and unsupervised machine learning techniques can also be used without necessarily using a computer vision pipeline in order to accrue the benefits of incrementally "learning" and improving the performance of the many embodiments described herein.

Armed with the above techniques of machine learning and computer vision, in the present embodiments, guidance system 604 (see FIG. 7A) of each lift captures and processes input data about its environment. As mentioned, the input data may be acquired through one or more cameras and/or additional sensors. Based on the input data at a given location of a lift, guidance system 604 will first determine the present location of the lift in the service center. It will do so based on a combination of computer vision techniques and any sensor data available. It may also apply supervised and unsupervised machine learning for this purpose.

Alternatively, the present location may also be already known to guidance system 604. This is because, the present location will be a node in a graph as per previous teachings, and as such its coordinates will be known to the system if the lift has not moved from that location. In one embodiment, guidance system 604 will determine the final destination of the lift based on a user supplied input such as the number/id of the service bay where the vehicle is parked. Alternatively, it may determine the final destination based on any sensor data available as in the embodiments of FIG. 8-11. In addition, it may also utilize make/model number and other onboard diagnostic data of the vehicle via requisite interfacing per previous teachings. The final destination will also be a node in the graph as already explained. It will then compute a path to the final destination as already taught and direct the lift accordingly.

Based on its computer vision capabilities, it will make any corrections to the movement/transportation of the lift during its travel based on the environment encountered by the lift. Such self-correction at a given point in its travel involves determining the current location of the lift in the environment/graph again and recomputing its path to the destination. Events that may cause this self-correction to occur include any exception scenarios from the input data and specifically from the vision pipeline. These include among others encountering of an unexpected object/obstacle in its path based on the image data processed. Such self-correction is a desirable capability because it allows the lift to be operated autonomously.

The autonomous transportation capability of the lifts allows for a more realistic environment of the service center with other machines and human users/technicians to exist. Once the lift has arrived at the requisite bay and near its ultimate engagement location, further computer vision capabilities may be employed by guidance system 604 to accurately position the lift underneath its corresponding axled wheel. Such vision techniques may include among others image processing and feature extraction from cameras looking at the tires/wheels and consequently determining the exact engagement location/position for the lift.

As already noted, sensor data fitted into the service center/bay is also fused with the above image data. For example, sensors fitted into the bay send the coordinates of the engagement locations of the wheels to guidance system 604 per previous embodiments. The guidance system may utilize these coordinates as the destination nodes for computation of its path per earlier teachings. In addition, or instead, it may use these coordinates to validate or refine its own knowledge of the environment.

Let us look at still another embodiment employing one or more of the above explained sensor, vision and machine learning based guidance techniques with the help of FIG. 15. In FIG. 15, lifts 1210A . . . 1210O belong to a service center 1200 that has three service bays 1202, 1204 and 1206. The home location of lifts 1210A-O is in the upper right hand corner designated by reference numeral 1212. There is a designated path 1208 which lifts 1210A-O can travel on. Path 1208 is instrumented with suitable sensors which lifts 1210A-O can detect and adjust their direction so as to stay on path 1208. Appropriate sensors include but are not limited to light sources, infrared, ultrasonic, laser as well as radio frequency sources.

Lifts 1210A-O are also fitted with corresponding sensors to detect the above sources on path 1208. The data sensed by these sensors on lifts 1210A-O is provided to their guidance system 604 which makes appropriate adjustments to their steering mechanisms (also see FIG. 5 and FIG. 7A and associated explanation). Appropriate locations on the lifts to place these sensors include but are not limited to the underside of connecting members 213 and 413 (see FIG. 2A-B, FIG. 3A-B, FIG. 5 and associated explanation).

When a vehicle such as vehicle 1222 arrives in a service bay, such as bay 1204 as shown in FIG. 15, guidance system 604 assigns the lifts and guides/directs transport mechanism 606 of the lifts. Consequently, the lifts are set in motion and travel only along path 1208 thus avoiding the potential for obstructions or collisions on this designated path. Guidance system 604 schedules lifts 1210A-O in a manner so as to avoid or minimize traffic jams or collisions.

FIG. 15 shows lifts 1210K and 1210L on their way to bay 1204 to the respective engagement locations 1205A and 1205B shown. Bay 1202 is empty with lifts 1210M, 1210N and 1210O still present there, possibly after the service of a prior vehicle. More specifically, these lifts are at their pre-engagement locations per previous teachings. Also per previous teachings, two of lifts 1210M-O can be assigned to empty engagement locations 1205C and 1205D and transported accordingly, without them having to go to home location 1212. The figure further shows a vehicle 1220 already raised on lifts 1210G, 1210H, 1210I and 1210J in bay 1206, while lifts 1210E and 1210F are in transit to home location 1212.

The advantage of such an embodiment is that it simplifies the navigation of the lifts by the guidance system because the lifts always stay on path 1208. Thus, the task of guidance system 604 of FIG. 7A simplifies to scheduling the travel of lifts 1210A-O in a manner so as to avoid/minimize bottlenecks/jams and collisions. One way to accomplish this is to ensure that there is no other lift on the travel path of a lift prior to initiating/commencing its travel. In a variation, more than one lifts can travel along a path in the same direction, so long as there is sufficient gap between them. Still other more complex scheduling mechanisms may be conceived. There is no other learning or vision based training of the system required.

In other useful variations of the above embodiments, guidance system 604 of FIG. 7 employs sensors specifically to guide the movement of the lifts between their pre-engagement and engagement locations. The reason for this is that this movement is highly specialized and constrained. Therefore, more complex guidance techniques taught above may be reserved for guiding the transportation of the lifts to/from their pre-engagement locations rather than all the way to/from their engagement locations.

Once a lift is at pre-engagement location, the guidance system can then orient the lift correctly and use a proximity sensor taught above to move the lift to its final engagement location. This sensor may be specialized for this task. For example, it may use a specialized proximity sensor for this purpose. Alternately, it may use a compression sensor to slowly move the lift forward until it touches the body of the vehicle so that its engagement mechanism is snug under the corresponding assigned wheel. For disengagement, it may just move the lift backward a predetermined distance to its pre-engagement location. It can then resume its normal operation employing the various sensor, vision and machine learning based guidance techniques taught above.

Other useful extensions of the technology include but are not limited to having a mobile application that provides the status of all the lifts. The status includes their current locations, whether en route or stationary, assignments by vehicles, service bays, engagement locations, unfulfilled demand for available lifts, etc. Such a mobile application can also provide appropriate controls to the user for performing human intervention as necessary. One scenario for such an intervention is to immediately halt the movement of all the lifts in case of an incident for safety concerns.

Other scenarios include but are not limited to allowing a user to input source and destination locations for the lifts. The inputs may be provided as location identifiers, which in turn may be nodes in the graph, or specific coordinates. Such inputs may be overrides to the paths already computed by the guidance system. This will be useful for training the system in a supervised machine learning manner. Another useful feature of such a mobile application will be its integration with the control system of the lift. This will provide a unified user experience for both lift transportation and management of the locking, unlocking, lifting and lowering operations.

Other extensions include among others scanning by sensors/cameras installed on the lifts and/or the service bay for any human or other obstacles before lowering the lifts in the bay. This further improves the safety aspects of the system. Still other extensions include using omni-directional wheels, such as ball-wheels or omni-wheels for the transport mechanism of the lifts. Such extensions would allow sideways movements of the lifts and would make the lifts more maneuverable in tight/busy environments.

It should be noted that the motorized mobile lifts of the above embodiments were taught in their typical wheel-engaging configuration. As noted earlier in the background section that a wheel-engaging mobile column lift can also be converted into a frame-engaging lift by deploying appropriate frame-engaging adapters. Specifically, a bumper adapter may be installed and locked onto the engagement prongs of a mobile column lift. With the bumper adapters, a pair of such mobile column lifts may then be used to lift a vehicle, such as a pickup truck, from the front and the back. Specifically, the adapters allow for engaging the lifts at appropriate hoist/lifting/jacking points on the chassis or frame of the vehicle. In such a configuration, thus two instead of four lifts are required to lift a vehicle.

Detailed Discussion of Embodiments Employing Sensors Present on the Vehicles

Now we will focus on a set of embodiments that employ sensors present on the vehicles themselves to assist in the guidance system in guiding the lifts to their corresponding engagement locations and/or their engagement with the vehicles. This functionality was introduced earlier in reference to FIG. 13 and associated explanation. As discussed, FIG. 13 by way of example shows LEDs attached to the wheels of vehicle 702 to assist the guidance system of the lifts for guiding/homing them to their corresponding engagement locations and their engagement with vehicle 702. However, as mentioned earlier, other types of sensors embedded on the vehicles, such as vehicle 702 in FIG. 13 are also entirely conceivable.

Such sensors may be integrated/embedded into the vehicles during the manufacturing process of the vehicles. These sensors may further include integrated sensors whose express purpose upon original vehicle manufacture was not intended for use in the automation of vehicle lift operations of the present teachings. However, their functionality can henceforth be appropriately leveraged to enable such automation nonetheless, according to the principles described herein.

Still alternatively, such sensors may be installed or retrofitted into the vehicles on an after-market basis. This retrofitting may even be done once a vehicle has arrived in the service center to be serviced. The retrofitting may even be temporary. This was the case with our example of FIG. 13. In other words, sensor(s) may be fitted onto the vehicles prior to the service and removed afterwards. To reference all these scenarios, we simply state that the sensors may be present in the vehicles either in an integrated (during manufacture) or on a retrofitted (any time after manufacture) fashion/manner/basis.

For the present embodiments, any practical combination is possible of the various sensors/cameras based approaches, technologies and techniques described earlier in the section entitled "Sensor based guidance". As already noted, such a combination may be directed by an implementation requirement or by the design choices of a person of average skill.

From an operational perspective, in these embodiments, sensors appropriate for a given implementation are present (integrated or retrofitted) on the vehicles. Then, with any appropriate instrumentation of the environment or the service center required for a given implementation, the vehicle once parked in a service bay obtains a fix on its own location. Based on the location of the vehicle thus known, and the specifications of the vehicle, either the same or other sensors on the vehicle communicate the coordinates of the engagement locations of the vehicle to the motorized mobile lifts, and more specifically to their guidance system. Using these coordinates, the guidance system directs the transport mechanism of the lifts to transport them to their engagement locations per previous teachings.

For further clarity, FIG. 16 shows an exemplary embodiment employing an IPS solution. FIG. 16 is a variation of an earlier embodiment shown in FIG. 15 and uses similar reference numerals from FIG. 15 as practicable. Specifically, FIG. 16 shows a service center 1300 indicated by the dotted and dashed rectangle. Service center or facility 1300 has lifts 1310A-O, service bays 1302, 1304, 1306 and vehicles 1320 and 1322. A key difference from facility 1200 of the embodiment of FIG. 15 is that path 1308 is no longer a designated path as path 1208 of FIG. 15. This will become clear from the ensuing explanation.

FIG. 16 also shows various types of wireless technologies, any combination of which may be utilized to obtain a fix on the present location of a sensor in the indoor environment of service center 1300. Examples of such solutions were provided above. A given implementation of the present teachings may use all or some of the wireless technologies shown in the exemplary embodiment of FIG. 16 for explanatory purposes.

The wireless technologies specifically shown in the example of FIG. 16 include the infrastructure outside of facility 1300, such as GPS satellites 1340A and 1340B and cellular towers 1342A, 1342B and 1342C. The wireless infrastructure inside service center 1300 includes Wi-Fi transceivers 1344A and 1344B (which may be Wi-Fi access points), and locally installed beacons 1346A, 1346B, 1346C, 1346D and 1346E. Moreover, vehicle 1320 has a sensor 1350A for obtaining a precise fix on its location based on some or part of the above described outside and/or inside wireless infrastructure. Sensor 1350A may be a GPS receiver, a Wi-Fi transceiver, a cellular transceiver or some other appropriate electromagnetic/radio transceiver or sensor. In other variations, it is conceivable that beacons are present on the vehicles themselves to assist the guidance system or another appropriate backend system to determine the location of the vehicles within the shop/facility.

Vehicle 1320 of FIG. 16 also has a sensor 1350B for wirelessly communicating/broadcasting the coordinates of its four engagement locations 1310G, 1310H, 1310I and 1310J to guidance system 604 (see FIG. 7A and associated explanation) of the instant motorized mobile lift system. The communication may also involve using an appropriate API including but not limited to any appropriate methods, tools, techniques, subroutines or protocols for such communication/interfacing available in the art. For this purpose, sensor 1350B may use Wi-Fi, Cellular, Bluetooth, ZigBee, 6LoWPAN, or some other suitable wireless technology available in the art. In comparison, vehicle 1322 has only one sensor 1350C which has a composite functionality for both obtaining a fix on the location of vehicle 1322 in service bay 1304 as well as transmitting the coordinates of its engagement locations 1305A, 1305B, 1305C and 1305D to guidance system 604.

Let us look at the operational working of the above embodiment in even more detail. Let us assume that vehicle 1322 has just arrived in facility 1300 and is parked in service bay 1304 as shown. Per above discussion, sensor 1350C present on vehicle 1322, either in an integrated or a retrofitted manner, will first know the precise location or fix on the location of vehicle 1322. For this purpose, it will use one or more of the various wireless technologies shown. The choice of such technologies and IPS solutions will depend on a specific implementation as will be appreciated by skilled artisans. Examples of some of such solutions and technologies were provided above.

As will also be appreciated by skilled artisans that sensor 1350C will normally work in conjunction with a computer software or hardware module present in the car. This may be an onboard diagnostics and/or a telematics system or another dedicated software or hardware module working with sensor 1350C. Such a software/hardware module then computes the precise coordinates of engagement locations 1305A-D of vehicle 1322 underneath each correspondent axled wheels as shown. It is able to do that because it knows the specification of vehicle 1322 itself, including vehicle length, vehicle width, size, number and location of axles, diameter and width of the tires, make, model, etc.

The above information may be configured into the telematics/diagnostics system or in the dedicated software/hardware component/module working with sensor 1350C. Such configuration may be done for an integrated sensor at the time of manufacture. It may also be performed by a car dealer or an Original Equipment Manufacturer (OEM) or a Value-Added Reseller (VAR) for a retrofitted sensor on an after-market basis. This information may also reside in a fleet management system with which guidance system 604 of FIG. 7A interfaces.

In any event, the transmitting/communicating/interfacing functionality of sensor 1350C is then invoked to transmit the coordinates of engagement locations 1305A-D. This invocation may also be done by the dedicated software/hardware of sensor 1350C or the telematics system. Now, guidance system 604 (see FIG. 7A and associated explanation) receives these location coordinates. Per previous teachings, guidance system 604 may just be contained on lifts 1310A-O themselves. However, in the preferred embodiment, guidance system 604 has a backend/server component running on a dedicated server or in the cloud, and has a separate client component on the lifts.

Guidance system 604 then communicates the coordinates of these engagement locations to the lifts assigned for serving newly arrived vehicle 1322 per above teachings. The assigned lifts then transport/travel to the engagement location underneath corresponding assigned axled wheels also per previous teachings. FIG. 16 shows assigned lifts 1310K and 1310L traveling to engagement locations 1305A and 1305B respectively.

Furthermore, based on the diameter of the respective axled wheels communicated by sensor 1350C, guidance system 604 also adjusts the motorized engagement mechanisms of the lifts. Referring back briefly to FIG. 2A and associated explanation, recall that guidance system 604 adjusts engagement mechanism 204 of lift 200 by rotating worm and sprocket 218A and 218B respectively. It does this according to the diameter of the respective/assigned axled wheel. Of course, the engagement mechanism may also be manually adjusted by a technician in the present embodiments also.

Now referring again to FIG. 16 in conjunction with FIG. 7A, as part of its communication with guidance system 604, sensor 1350C may also communicate other parameters about vehicle 1322. These include the physical dimensions and weight distribution of vehicle 1322. Based on weight distribution, as already taught, guidance system 604 may determine the minimum number of lifts 1310A-O to assign if vehicle 1322 has more than two axles. Following that, transport mechanism 606 (see FIG. 7A and associated explanation) of assigned lifts from motorized lifts 1310A-O transports them under the guidance/direction of guidance system 604 to their correspondent engagement locations.

Recall from earlier teachings, that more specifically, transport mechanism 606 transports the assigned lifts to their pre-engagement locations laterally to the side of the correspondent wheels. At this juncture, each assigned lift would turn so its engagement mechanism faces the correspondent wheel. For correct orientation of the lifts, a magnetometer is preferably used that is installed on the lift. After this, transport mechanism 606 would move the lift forward to its final engagement location. During disengagement, this process is reversed as per earlier teachings. The above process, as well as other aspects/processes/operations including engagement, locking and lifting/lowering of the vehicle by control system 602, servicing of the vehicle, and disengagement, jacking up/down, etc. were explained extensively earlier in relation to FIG. 2A-B through FIG. 15. These are not repeated here to avoid undue repetition.

In addition to the wireless sensors associated with the infrastructure of the present embodiments shown in FIG. 16 described above, other sensors from previous embodiments of FIG. 2A-B through FIG. 15 may also be employed. These include sensors instrumented into service center 1300 and specifically bays 1302, 1304 and 1306 and/or present on lifts 1310A-O themselves. Analogously to the vehicles, sensors on the lifts may also be integrated or retrofitted.

The sensors installed in the service bays and/or the lifts may also be used for obtaining coordinates for the engagement locations for the vehicles, as well as the size/diameters of the axled wheels as needed. The engagement location coordinates and wheel diameter information thus obtained may be used to supplement or refine such information already obtained from IPS systems/sensors of FIG. 16 per above explanation. Instead of or in addition, this information may be used redundantly in case the outside/inside IPS/wireless infrastructure is unavailable.

Similarly to sensors 1350A-C on vehicles 1320 and 1322, the sensors on the lifts may be integrated at manufacturing of the lifts or retrofitted afterwards. As per previous teachings, these sensors include magnetometers for ensuring correct orientation prior to engagement and proximity sensors for final homing/guiding to the engagement locations. Furthermore, cameras and/or image sensors on the lifts and the associated computer vision pipeline may also be employed to further refine the axled wheel diameters and coordinates for the engagement locations obtained from IPS/wireless technologies.

Alternatively or in addition, this information may be used to verify the correctness of such information already obtained from other systems such as IPS/wireless technologies taught above. Still alternatively, this information may be used as a redundant source of such information in case the information is unavailable from the IPS infrastructure. The skilled artisan will appreciate the many combinations of above described technologies and solutions available to practice the instant teachings. Additionally, machine learning techniques may be employed in conjunction with computer vision to augment the understanding about the environment and for further accurately determining the coordinates of the engagement locations as well as wheel diameters.

Note that path 1308 is an exemplary path traveled by lifts 1310A-O. Unlike the embodiment of FIG. 15, path 1308 is not predesignated. In other words, guidance system 1308 computes this path by utilizing any combination of wireless technologies 1340A-B, 1342A-C, 1344A-B and 1346A-E, in conjunction with onboard sensors 1350A-C present on vehicles 1320 and 1322. More specifically, guidance system 604 computes this path based on a choice of previously taught path finding algorithms. It applies one or more of a suitable choice of those algorithms. The choice is based on the present locations/fixes of assigned lifts from the total number of lifts 1310A-O. It is also based on the precise coordinates of their respective engagement locations obtained from the above explained wireless sensors, technologies and/or solutions.

As such, path 1308 may be the shortest computed by guidance system 604 by utilizing Dijkstra's algorithm or an alternative algorithm. This path may be different from one computation to the next depending on the location of the lifts and the obstacles in the path/environment. As per above teachings, these obstacles may be other lifts or other types of obstacles, human or non-human. Unless otherwise stated, other features/functions of previous embodiments, including the safety features, also apply to present embodiments employing IPS/wireless technologies and sensors present onboard the vehicles.

It should be noted that in conjunction with the onboard sensors on the vehicles and IPS/wireless technologies discussed above, one can also accrue the benefits of the embodiment of FIG. 15. Specifically, one can have the lifts travel on a dedicated path while still utilizing sensors 1350A-C and associated wireless infrastructure shown in FIG. 16. In other words, in a variation of the embodiment of FIG. 16, path 1308 may be dedicated for travel of the lifts thus simplifying the navigation and guidance of lifts. However, the exact coordinates of the engagement locations and diameter of the wheels are still communicated by sensors 1350A-C and the associated wireless infrastructure.

The onboard sensors in the present embodiments may be attached to the vehicles at any number of suitable locations that will be apparent to those skilled in the art. For example, sensors 1350A-C may be attached to the body or the engine block under the hood, or at a suitable location on the frame or below/underside on the chassis or one of the seams. The sensors may have antenna(s) for effective communication, that may be incorporated into the standard radio antenna/housing of the vehicle or these may be separate antenna(s).

The disciplines of installation/manufacturing of wireless sensors (including GPS, Wi-Fi, cellular, Bluetooth, ZigBee, 6LoWPAN, Lidar, etc.) on automobiles is well understood and will not be delved into detail in this specification. Finally, sensors present onboard the vehicles of the present embodiments, such as vehicles 1320 and 1322 in FIG. 16 may be chosen from any one or more of suitable sensor technologies taught earlier in the section entitled "Sensor based guidance". The appropriate ultimate choice of a given set of sensor technologies for a specific implementation will be readily ascertained by those skilled in the art.

Now let us look at another set of embodiments employing onboard sensors on vehicles. Instead of motorized mobile lifts, these present embodiments are directed at fixed lifts. The lifts of the present embodiments are affixed to the service bays and are stationary where the vehicles are serviced. Typically, these lifts are frame-engaging lifts because they engage with the chassis/frame of the vehicle as will be discussed below. As such, unlike motorized mobile lifts from the embodiments of FIG. 2A-B through FIG. 16, the fixed lifts of the present embodiments do not have a transport mechanism.

These lifts have an engagement mechanism that engages the lift to the vehicle, not underneath the wheels, but rather to lift points or lifting points or jacking points on the chassis or frame of the vehicle. Therefore, the engagement locations in the present embodiments consist of specific lifting points underneath the vehicle as prescribed for the vehicle. Such a prescription may be made by the primary manufacturer of the vehicle or another appropriate entity in its supply or distribution chain, including an original equipment manufacturer (OEM) or a dealer or a value-added reseller (VAR) or a service/maintenance provider. There may be several lifting points prescribed on the vehicle. These may be on the frame/chassis or on various seams.

As in the previous embodiments employing motorized mobile column lifts, these fixed lift embodiments also employ sensors onboard the vehicle. Also as before, these sensors are then used to wirelessly communicate the precise coordinates of the lifting points of the vehicle to the guidance system of the lifts. This information is obviously available to the sensors which are installed on the very vehicle, the coordinates of whose lifting points are communicated to the guidance system. Such communication may be direct, or alternatively via a backend fleet management system that is integrated with or is interfaced with the guidance system by an API. Then based on this information, the guidance system accurately positions the fixed lifts underneath the vehicles for its safe lifting/hoisting.

One configuration of such fixed lifts of the present embodiments is a fixed two-post or two-column lift system such as the one shown in FIG. 17A. In the exemplary embodiment shown in FIG. 17A, the two lifts are shown bolted to the ground in the service bay. The two-post fixed lift system 1400 shown consists of a fixed lift, column or post 1402A and another fixed lift, column or post 1402B. The engagement mechanism of lift 1400 consists of four swing-arms, two on each carriage assembly 1404A and 1404B. Note that in the left isometric view of lift 1400 shown in FIG. 17A, only carriage assembly 1404B is visible. The engagement mechanism of lift 1400 comprises swing-arms 1406A, 1406B attached to carriage assembly 1404A, and swing-arms 1406C, 1406D attached to carriage assembly 1404B. Note that swing-arm 1406B is not visible in the view shown in FIG. 17A but is presumed to exist.

Swing-arms 1406A-D are also telescopic and can extend inward or outward as shown. Further, swing-arms 1406A, 1406B, 1406C and 1406D can swing or rotate or pivot about axes 1412A, 1412B, 1412C and 1412D respectively. To avoid clutter, FIG. 17A only shows pivot/axis 1412A for the rotation of arm 1406A, and pivot/axis 1412D for the rotation of arm 1406D. The telescopic movement of swing-arms 1406A-D as well as their rotation/pivoting can be manual or automatic/motorized. A fixed lift of the present embodiments may have short arms or long arms as known in the industry. It may also have a combination of such short and long swing-arms. Nonetheless, the present design is agnostic of the types of swings for the lifts as will be apparent from below teachings.

The manual telescopic movement can be implemented analogously to the manual adjustment consisting of pin 216B and hole 216A of engagement mechanism 204 of lift 200 of FIG. 2A. The manual rotational movement or pivoting can also be implemented analogously to the manual adjustment consisting of pin 216B and hole 216A of engagement mechanism 204 of lift 200 of FIG. 2A. Further, the motorized telescopic and pivotal movements of the arms are not explicitly shown in FIG. 17A. These details will be apparent to the skilled reader and are left out from the drawing of FIG. 17A and associated explanation to avoid detraction from the main principles.

At the end of each swing-arm of fixed lift 1400 of the present embodiment, there is a lift pad or support plate, which eventually makes contact with a lifting point of the vehicle during its lifting/lowering. Specifically, there is a lift pad 1408A at the end of swing-arm 1406A, lift pad 1408B at the end of swing-arm 1406B, and so on. Lift pads 1408A-D can be fixed or have adjustable heights, so they can make a snug contact with the lifting points of the vehicle. Again, the height of adjustable lift pads 1408A-D may be adjusted in a motorized fashion, or by manual means. An exemplary manual means of adjustment can be by having lift pads 1408A-D threaded and then rotating them upwards or downwards via a nut and bolt mechanism.

If lift pads 1408A-D are fixed, then a snug contact is achieved by the lifting of the entire corresponding swing-arm 1406A-D.

Carriage assemblies 1404A and 1404B along with their respective swing-arms 1406A-B and 1406C-D respectively move up and down inside of fixed lifts or columns 1402A and 140B respectively. This up and down movement of the carriage assembly raises and lowers the vehicle resting on lift pads 1408A-D. The vertical movement of carriage assemblies, and consequently that of the vehicle is accomplished by suitable electromechanical and/or other means such as hydraulic. In the embodiment shown in FIG. 17A electric motors 1410A and 1410B cause the vertical movement of assemblies 1404A and 1404B respectively. There are also weight sensors incorporated or installed at/on lift pads 1408A-D that measure the weight being lifted/compensated by the corresponding lift pad during a lifting/lowering operation. Other mechanical or hydraulic componentry required for this purpose and for compensating the weight of the vehicle is known in the art and is not explicitly delved into in this specification.

As shown by the gears symbol, the pivotal and telescopic movement of the arms 1406A-D, as well as the up and down movement of the lift pads 1408A-D can be automated based on the instant teachings. Otherwise, just the pivotal and telescopic movement of the arms 1406A-D along with their lift pads 1408A-D is automated while the height of the lift pads stays fixed or is adjusted manually. In any case, the above automation is achieved through the use of sensors/cameras placed on the vehicle being serviced, and/or sensors/cameras installed on lift 1400 and/or sensors/cameras installed in the service center or service bay where lift 1400 is affixed. This will be explained in detail further below.

Also shown in FIG. 17A are exemplary locations where sensors/cameras may be present on lift 1400 as marked by "X" and/or the service bay as marked by "Y". To avoid clutter, the gears symbol for automation is shown only in relation to swing-arm 1406D, its pivot 1412D and its lift pad 1408D, though the same relationship is understood to exist with the rest of the swing-arms 1406A-C, pivots 1412A-C and lift pads 1408A-C.

As in the previous embodiments involving motorized mobile lifts, fixed lifts/columns 1402A-B are also controlled by a control system. The control system is responsible for synchronizing and locking the lifts once they are engaged and in raising/lower them in unison in a safe and stable manner. For this purpose, lifts/columns 1402A-B communicate with each other in conjunction with the control system. This communication may be wireless utilizing one or more suitable technologies such as Wi-Fi, Cellular, Bluetooth, etc. Alternatively, the communication may be wired in which case the communication and/or power cables connecting the two lifts/columns/posts are generally secured in housing 1412 shown in FIG. 17A. Still alternatively, the cables may be above columns 1402A-B in a connecting bridge (not shown) connecting the two columns.

FIG. 17B shows an exemplary block diagram architecture 1490 of a system employing fixed lifts of the present technology. Notice the similarity with FIG. 7A, except the absence of the transport mechanism. Because the present lifts are fixed and have as such no transport mechanism, guidance system 1494 of FIG. 17B does not need to guide the transportation of the lifts by their transport mechanism, as in the case of motorized mobile lifts. Instead, guidance system 1494 is responsible for ensuring that vehicles arrive safely/accurately in their assigned service bays and are properly engaged for safe lifting and lowering. This will be explained in much more detail below.

As mentioned, control system 1492 in FIG. 17B is responsible for the coordination/synchronization of the lifts, including locking them once they are engaged and in raising/lowering them in unison in a safe and stable manner. Of course, also as before, guidance system 1494 may fully reside on the present fixed lifts, or have a client portion on the lifts with a backend/server portion running in the service center or in the cloud. The functioning of the modules of architecture 1490 will now be explained in detail below.

Let us look at an automated operational working of the fixed two-post or two-column lift system in detail. Such a system may also be referred to as a fixed lift system consisting of two fixed lifts, columns, or posts 1402A and 1402B as shown in FIG. 18A. More specifically, FIG. 18A shows lift 1400 from the embodiment of FIG. 17A in its lower left isometric view with many reference numerals and potential location markings for sensors removed for clarity. FIG. 18A also shows a vehicle 1450, which in the exemplary figure is a car, although it could be any other type of automotive vehicle. Lift 1400 is in its lowered position while vehicle 1450 is parked in service bay 1460 where fixed lift 1400 is installed.

FIG. 18A also shows four engagement locations 1452A, 1452B, 1452C and 1452D underneath vehicle 1450 for hoisting or lifting vehicle 1450. Locations 1452A-D are where swing-arms 1406A-D respectively make contact with vehicle 1450. Typically, these are the jack/jacking points or hoist points or lifting points or lift points prescribed for vehicle 1450. Note that on a given vehicle, there may be more than four such lifting points prescribed for the vehicle. One set of lifting points may be suitable for some types of services, while another set of lifting points may be suitable for some other types of services. Of course, the two sets of lifting points may overlap.

Thus, first a determination is made by guidance system 1494 (see FIG. 17B and associated explanation), as to which lifting points are to be engaged on the vehicle. Guidance system 1494 can make this determination because it knows the make/model of the vehicle, which in turn determines the prescribed lifting points on its body. As per earlier teachings, guidance system 1494 acquires this information by accessing the corresponding service order from a suitable IT system. Alternatively, this information may also be set in system preferences accessed by guidance system 1494 per above.

The guidance system may then also combine this information with the type of service needed, also as determined from the service order, as well as the weight/distribution of the vehicle. Based on this knowledge it can then determine the appropriate lifting points for the vehicle. As mentioned above, the sensors onboard the vehicle may also communicate the locations of the available and prescribed lifting points to guidance system 1494. Alternatively, the lifting points can be any suitable locations on vehicle 1450, as determined by a technician. Still alternatively, the lifting points are automatically located by guidance system 1494 by determining the suitable locations/regions on the underside of vehicle 1450 that can withstand the weight of the vehicle for its safe lifting by lift 1400.

Generally, the lifting points are lift "regions" and so long as lift pads 1408A-D make contact with the vehicle anywhere in these respective prescribed regions, the vehicle can be safely lifted. Another way to state this is that so long as lift pads 1408A-D make contact at respective engagement locations within a prescribed tolerance (of the lift regions), the vehicle may be safely lifted. As explained, arms 1406A-D make contact with vehicle 1450 via four respective lift pads 1408A-D which are not explicitly marked in FIG. 18A to avoid clutter. FIG. 18B shows lift 1400 in the raised position with vehicle 1450 raised/lifted above ground so it can be serviced.

According to the present embodiments, vehicle 1450 has sensors embedded into it that allow for an accurate and automatic positioning of lift pads 1408A-D at prescribed lifting points/regions 1452A-D respectively. These sensors may be integrated into vehicle 1450 during manufacturing or installed on a retrofitted basis. This automatic positioning of lift pads 1408A-D at the end of rotatable telescopic swing-arms 1406A-D does not require a technician.

Therefore, such a system significantly improves the operational safety of the workplace/service center by removing human error from its operation and the consequent risk of accidents. It also improves the ergonomics as technicians no longer need to get on hands and knees to position lifting pads in place. Furthermore, the sensor guided and technician-less positioning of the lift improves the efficiency of the operation, thereby reducing the time required to service each vehicle.

In one exemplary embodiment, proximity sensors at engagement locations or lifting points or lift regions 1452A-D of car 1450 are used to guide/home motorized swing-arms 1406A-D with their lift pads 1408A-D respectively. Potential locations of such proximity sensors are shown by dotted lines in FIG. 18A-B. This way, lift pads 1408A-D at the end of swing-arms 1406A-D are brought directly underneath lifting points/regions 1452A-D respectively. More specifically, sensor data is communicated by the proximity sensors to the guidance system of the lifts, which then guides the swing arms and pads to the corresponding lifting points/regions. In alternate embodiments, any other suitable choice or combinations of sensors available in the art may be deployed.

These include various sensor technologies taught above, as well as IPS wireless technologies introduced earlier in reference to FIG. 16. Moreover, service bay 1460 of FIG. 18A-B may also be instrumented according to the previous teachings of the embodiments of FIG. 8 and FIG. 10-11 to assist in the accurate and automatic guiding of swing-arms 1406A-D. As explained, this guiding performed by guidance system 1494 positions lift pads 1408A-D accurately underneath engagement locations 1452A-D. In such a way, the engagement of lift 1400 with vehicle 1450 can be automated.

Furthermore, cameras and a computer vision pipeline may also be deployed for this purpose. In such an embodiment using computer vision, one or more camera(s) may be mounted on vehicle 1450. These camera(s) are directed at swing-arms 1406A-D and lift pads 1408A-D. Then based on image processing of the captured image(s) utilizing computer vision pipeline and associated techniques taught above, swing-arms are guided so as to accurately position lift pads 1408A-D under locations 1452A-D respectively. To facilitate explanation, this scenario is explicitly illustrated in FIG. 19A and FIG. 19B.

Thus, in a variation of the embodiments of FIG. 18A-B, FIG. 19A shows an exploded view in dotted-and-dashed line of vehicle 1450 parked in service bay 1460 containing our lift 1400 from FIG. 18A-B. Note that in this variation, several reference numerals from the drawing figures of FIG. 18A-B have been omitted to avoid clutter. Note also that in this variation, sensor locations from FIG. 18A-B on vehicle 1450 are not shown because we are now focused on computer vision based engagement automation of lift 1400 per below explanation. FIG. 19A further shows swing-arms 1406C and 1406D of lift 1400 reaching out underneath vehicle 1450 towards their respective engagement locations 1452C and 1452D respectively. Also shown is a camera 1451 affixed on the underside of vehicle 1460. It is understood that more than one such cameras may be utilized without departing from the principles described herein.

FIG. 19B shows an exemplary view from camera 1451. Note that engagement locations or lifting regions 1452C-D in the camera view of FIG. 19B are depicted by dotted lines in FIG. 19B. This is because they are the target lifting regions computed and superimposed on the view of camera 1451. This may be done by an appropriate software/hardware module onboard vehicle 1450 working with camera 1451. Alternatively, this is done by guidance system 1494 of FIG. 17B executing on lift 1400 and/or the service center or the cloud.

In such a scenario, obviously the output from camera 1451 is communicated to the guidance system using one of suitable wireless techniques/sensors taught above. The output may be in the form of successive screenshots or a video. Now, guidance system 1494 knows the coordinates of the target lifting regions in dotted lines on the screen/view of FIG. 19B. This is because it knows the make/model and other configuration parameters of the vehicle per above explanation.

Alternatively, this information is communicated to the guidance system from sensors onboard vehicle 1450 per above. Then based on image processing of this view utilizing above described computer vision techniques, instant guidance system 1494 computes the exact displacement required of the lift arms and the lift pads. For this purpose, the techniques of feature extraction of computer vision taught above are particularly useful. Also see FIG. 14 and associated explanation.

More specifically, guidance system 1494 computes the pivotal movements of lift arms 1406C-D and the telescopic movement of their respective lift pads 1408C-D required. These movements or displacements will place or "home in" the lift pads accurately underneath engagement locations or lifting points/regions 1452C-D on vehicle 1450. Guidance system does this based on the present location of arms 1406C/1406D and pads 1408C/1408D as determined by above mentioned image processing and feature extraction. The present location of arms 1406C/1406D and pads 1408C/1408D is determined by "recognizing" the arms by their features such as edges, lines, ridges, corners, shapes, etc.

Once their current location is known, then guidance system 1494 performs the requisite computations for determining the displacement of lift pads 1408C/1408D from their present locations to directly underneath their ultimate engagement locations or lifting points/regions 1452C/1452D. These computations utilize the computed/superimposed target regions 1452C/1452D in the camera view of FIG. 19B as shown by the dotted lines, as well as the knowledge of the current location of arms 1406C/1406D and pads 1408C/1408D per above. Such computations may employ appropriate geometric and/or trigonometric techniques and will be apparent to those skilled in the art. The required displacements computed by the guidance system are depicted in FIG. 19B by vectors 1452C'/1452D' for the telescopic movements of lift arms 1406C/1406D with lift pads 1408C/1408D, and arcs 1452C"/1452D" for the rotational/pivotal movements of arms 1406C/1406D respectively.

Based on the above computations and the resultant displacement vectors 1452C'/1452D' and arcs 1452C"/1452D", guidance system 1494 then actuates the corresponding mechanisms (not shown) in arms 1406C/1406D for the above described displacement. As already mentioned, the required electromechanical and/or hydraulic mechanisms for the above mentioned telescopic and pivotal movements will be apparent to those skilled in the art. Although the scenarios depicted in FIG. 19A-B utilize camera(s) 1451, one can easily conceive analogous scenarios utilizing other sensors, such as proximity sensors on vehicle 1450. In such scenarios also, based on the present location of arms and pads 1406C/1406D and 1408C/1408D respectively as determined by sensor data, guidance system 1494 determines their above described required displacements.

For brevity, FIG. 19A-B and the above explanation only references swing-arms 1406C/1406D and pads 1408C/1408D, but of course the same applies to swing-arms 1406A/1406B and pads 1408A/1408B. Also, during above camera or other sensors based embodiments, guidance system 1494 may course correct the movement of the arms and lift pads as needed. Such course correction will be based on monitoring the present location of the arms and the pads as they displace towards their target lifting points/regions. Depending on the requirements, the course correction may be performed once, twice, periodically, on-demand or on a repetitive basis.

Additionally, machine learning may also be utilized for the system to continually improve its behavior and accuracy. Using machine learning, a fixed two-post lift may "learn" or improve its engagement accuracy over time. The accuracy may be improved for particular types of vehicles such as pickups, semi's, vans, etc. The learning may also be improved over time for specific makes and models of the vehicles. The machine learning may also be carried out in a supervised manner with appropriate technician/user inputs, or in a completely automated or unsupervised fashion. As previously taught, such machine learning techniques are often employed in conjunction with computer vision techniques.

In other variations of the embodiment of FIG. 19A-B, camera 1451 and associate image processing is not used. Although in such variations still, guidance system 1494 determines the displacement vectors and arcs for the swing-arms 1406A-D for accurate placement of lift pads 1408A-D underneath the lifting points. Recall that for this purpose, it first needs the coordinates of the lifting points of the vehicle which are communicated to it by sensors onboard the vehicles. However, it does not use camera 1451 and associate image processing to determine the present location of the swing-arms and the pads.

In one such variation, any of the above taught sensors, technologies and techniques (other than a camera), in the section entitled "Sensor based guidance" are instead employed. These may also include image sensor(s) explained earlier, or optical flow sensor(s). Using these sensor(s), guidance system 1494 then determines the present location of the swing-arms and the pads based on processing the sensor data. It then computes the requisite displacement vectors and arcs by performing similar calculations as per above teachings.

In another such variation, the motorized mechanisms of the telescopic and pivotal movements of the swing-arms, directly provide the guidance system the coordinates of the present location of the arms and the pads. Then, as before, it performs similar computations to determine the requisite displacement vectors and arcs. The rest of the actuation of the motorized mechanisms of the telescopic and pivotal movements of the swing-arms for both these variations, proceed as taught in the embodiment of FIG. 19A-B.

In other alternate embodiments, instead of or in addition to camera(s) mounted on vehicle 1450, camera(s) mounted on lifts 1402A and 1402B may also be used. These lift cameras may then be used to guide swing-arms to the respective engagement locations or lifting points/regions per above teachings. In still other embodiments, in addition to or instead of the above mounting of camera(s), camera(s) may be mounted in service bay 1460 of FIG. 18A-B or the service center to guide swing-arms 1406A-D. In still other embodiments, a given service center may have both the instant motorized mobile column lifts as well as the instant fixed lifts. In such a facility, the two types of instant lifts will operate according to the above teachings. Note that in such a facility, a given service bay will still utilize either the motorized mobile column lifts or the fixed lifts, but not both, at a given time for the servicing of a vehicle.

In still other variations, add-on motors and similar movement mechanisms may be retrofitted onto fixed lifts with manual swing-arms with no such integrated motorized movements. The objective is to automate their engagement process with the vehicle based on the sensor based guidance, computer vision and machine learning techniques of the present disclosure. As in other embodiments, in these embodiments also, the sensors/cameras may be present on the vehicles, and/or the lifts and/or the service bay/center.

The fixed lifts of the above embodiments were used in their typical frame-engaging configuration. However, with appropriate wheel adapters, they can also be converted into wheel-engaging lifts. Recall also from earlier, that mobile column lifts may also be converted to frame-engaging lifts with appropriate adapters. The above described teachings of sensor based guidance, computer vision and machine learning may also be used for homing in frame engaging configurations of motorized mobile lifts. This is done by guidance system 604 of FIG. 7A of motorized mobile lifts guiding their transport mechanism. This is done so that their frame-engaging adapters are accurately placed underneath the prescribed engagement points/regions on their chassis/frames, typically in the front and the back of the vehicle.

Similarly, the above described teachings of sensor based guidance, computer vision and machine learning may also be used for automating the engagement process of wheel-engaging configurations of fixed lifts. This is done by guidance system 1494 of FIG. 17B of fixed column lifts guiding their engagement mechanism, specifically their swing-arms. This guidance involves providing appropriate displacement vectors and arcs to the swing-arms for their pivotal and telescopic movements per above teachings. These movements result in the accurate placement of their wheel-engaging adapters at their engagement locations underneath the corresponding axled wheels of the vehicle to be serviced.

In still another set of highly preferred variations, the lift systems of the present disclosure are directed to servicing autonomous vehicles. In these embodiments, employing autonomous vehicles, either self-propelled, self-guided or motorized lifts or fixed two-post lifts of above teachings may be used. These embodiments also benefit from sensors/cameras present on the vehicles either in an integrated or retrofitted manner. Unless otherwise stated, all other features, technologies and associated teachings from earlier embodiments are applicable for the present embodiments also. The choice of these for a specific implementation will be suitably determined by a person of average skill in the art.

More specifically, the autonomous vehicles of the present embodiments are automatically driven to the appropriate service bays in the facility. This task is accomplished by transmitting the path leading to a specific service bay to an autonomous vehicle that just entered or in advance of its entry into the service center. The service bay is the specific bay where the autonomous vehicle is supposed to be serviced. The path is computed preferably by a backend guidance system running in the service center or in the cloud. The guidance system is also responsible for assigning an available lift to the arriving vehicle.

As such, as in previous embodiments, the guidance system performs the function of resource management. Alternatively, the resource management functionality of the guidance system required for assigning/allocating available lifts to the vehicles to be serviced, may be separated out into a dedicated resource manager module. Still alternatively, this capability may be housed in a fleet management system which may be directly integrated with or interfaces with the guidance system via an API. As before, the resource assignment may be performed on a first-in-first-out (FIFO) basis. If enough lifts are not available to assign to a vehicle, the guidance system does not perform new assignments until the backlog is cleared.

Factors used by the guidance system in determining the suitability of a service bay for a given vehicle include but are not limited to the dimensions and weight of vehicle and the size and lifting capacity of the lift installed in the service bay. For example, certain fixed lifts can only lift up to 16,000 lbs. Similarly, certain lifts are able to accommodate vehicles up to a certain size and dimensions. Guidance system computes the path for the vehicle, using one of the available path finding algorithms taught earlier. Additional sensors, cameras and vision technologies discussed above may also be deployed to assist in this process, as will be appreciated by skilled artisans. Guided by the guidance system, autonomous vehicle then traverses the path in the service center, computed for it by the guidance system to arrive at the service bay where it is supposed to be serviced.

In alternate and highly useful embodiments, the autonomous vehicle computes the path to an available service bay by itself. In these embodiments, the autonomous vehicle finds an available service bay in the service center and autonomously drives to it and parks there. Since autonomous vehicles are equipped with sensors and navigation technology to drive on the road in complex traffic conditions, driving to an available service bay is an easy application of that technology.

The range of sensors for autonomous navigation of vehicles and the navigation technology for this purpose is well understood by artisans skilled in the discipline of autonomous automotive navigation. The above path computation by the vehicle is preferably done in conjunction with communicating with a fleet management or backend system. The fleet management or backend system determines where an empty service bay is that has a lift with an appropriate lifting capacity for the vehicle, and informs the vehicle accordingly.

Therefore, in the navigation system of the autonomous vehicle, a service bay in the service center may be entered as a destination. Instead of being entered as a postal address, the destination address of the service bay may be entered as location on a grid in the service center. Still in other variations, the navigation system is preconfigured to "recognize" an empty service bay with an appropriate lift. This recognition is based on incorporation of the requisite image data and learning of its navigation system. It then drives the vehicle to that service bay in the service center and parks it there.

At this point, if motorized mobile lifts are to be sent to the service bay where the autonomous vehicle is parked, they are assigned to their respective engagement locations. Then their transport mechanism 606 of FIG. 7A, under the guidance of guidance system 604, transports them to those engagement locations per previous teachings. Each such lift has one engagement location underneath an axled wheel of the vehicle as already taught. Rest of the locking, raising, servicing, lowering, jacking up/down processes continue as per earlier teachings. See FIG. 2A through FIG. 16 and associated explanation.

Alternatively, if the lifts are fixed lifts with swing-arms, they will have corresponding engagement locations or lifting points underneath the autonomous vehicle per above teachings. Guidance system 1494 of FIG. 17B then guides the swing-arms with their lift pads accurately underneath the lifting points/regions of the autonomous vehicle. Rest of the locking, raising, servicing, lowering processes continue as per earlier teachings. See FIG. 17A-B, FIG. 18A-B, FIG. 19A-B and the associated explanation. As already mentioned, the present teachings may also be applied to the frame-engaging configurations of mobile column lifts, and wheel-engaging configurations of fixed lifts, employing appropriate adapters as taught earlier.

FIG. 20 shows such a present exemplary embodiment, as a variation of the embodiment of FIG. 16 discussed earlier. Facility or service center 1500 of FIG. 20 has two-post fixed lift systems consisting of two fixed lifts with two swing-arms each. Explained above in reference to FIG. 17A, FIG. 18A-B and FIG. 19A-B, these lifts are 1510A-B affixed in service bay 1502, 1510C-D in service bay 1504 and 1510E-F in service bay 1506. Other wireless sensors and IPS instrumentation from FIG. 16 is also present in facility 1500 of FIG. 20 and is marked with the same reference numerals (also see FIG. 16 and associated explanation).

FIG. 20 also shows vehicle 1520 raised by lifts 1510E and 1510F and being serviced in service bay 1506. Now, an autonomous vehicle 1522 is just shown entering facility 1500. Vehicle 1522 has sensors 1550C and 1550D. For clarity, FIG. 20 shows only two sensors 1550C-D, although it is understood that any number and types of sensors including cameras may be present on autonomous vehicle 1522 and their location on vehicle 1522 may vary. To further stress this point, vehicle 1522 shows a top mounted camera which is not explicitly labeled to avoid clutter.

These sensors/cameras may be used for the autonomous navigation of the vehicle as well as for obtaining a fix on its location in service center 1500 and communicating with any backend system, such as a guidance system. Earlier embodiments have already discussed the many types of sensors that can be utilized by such a guidance system. As explained, the guidance system guides the engagement mechanism of lifts 1510A-F as well as for guiding autonomous vehicle by providing it the path to follow in service center 1500. As noted earlier that in alternate and very useful variations, the autonomous vehicle itself determines the path to available service bay 1502 without necessarily any guidance provide by the guidance system. The navigation system of the autonomous vehicle is well suited for the above task.

As discussed in reference to earlier embodiments, the backend guidance system preferably runs in the cloud. FIG. 20 shows such a backend guidance system 1540 running in the cloud. Of course, backend guidance system 1540 can also be housed in a local server running inside service center 1500. FIG. 20 further shows path 1508 within dotted lines computed by guidance system 1540 or alternately by autonomous vehicle 1522 itself. More specifically, the coordinates of path 1508 are computed by the guidance system and communicated to vehicle 1522 or the coordinates are computed by autonomous vehicle 1522 itself. Following the coordinates of path 1508, vehicle 1522 then autonomously arrives at service bay 1502 to be lifted by fixed lifts 1510A-B and be serviced.

In a highly preferred set of variations, the vehicle lifts, whether mobile or fixed, are able to communicate with the autonomous vehicle to automate the engagement process. Because motorized mobile column lifts are mobile with their own transport mechanism and can adjust their own location with respect to the vehicle, the above functionality is especially useful for fixed lifts. Explained further, a fixed lift by its very nature cannot move and thus it is highly beneficial for it to give instructions to an autonomous vehicle to adjust its position so that it can be safely engaged and lifted. Frequently, technicians must readjust the position of the vehicle between the posts of a fixed lift because it is improperly positioned for safe lifting. This functionality would eliminate the need for readjustment.

In the context of above taught fixed two-column lifts, and in conjunction with its motorized swing-arms, the lift gives instructions to the vehicle to move as required until it is in an ideal position for engagement with the lift pads. This movement may be forward/backward, or even lateral as needed. This is because the vehicle may not have entered centered into the service bay but rather more to one side. Further, the correct weight distribution of the vehicle may dictate that it is more forward in the lift than backward.

The above maneuvering is done by accurately knowing the position of the vehicle with its lifting points/regions with respect to an imaginary grid with (X,Y) coordinates on the service bay. Then appropriate adjustments to the X and Y locations of the vehicle are performed by instructing the vehicle per above. Further, the above process is ideally performed with the lift and the vehicle in cooperation to perform a successful engagement. The cooperation is enabled by continuous communication between the two.

The vehicle may continually convey its position on the grid to the lift, that may instruct it accordingly. Alternatively, sensors/cameras on the lift and/or the bay may be used to determine the accurate location of the vehicle on the grid. In particular, weight sensors associated with the lift pads, and introduced earlier, are used to determine the weight being lifted by the lift pad.

If the weight distribution on the lift pads is outside of a prescribed tolerance for the vehicle, the swing-arms and the lift pads are lowered to the ground and the vehicle is instructed to adjust its position for proper engagement and consequent safe lifting. The same capability extends to semi or non-autonomous vehicle by providing the appropriate instructions to the vehicle driver on a console. The console may be in the service bay or in the vehicle. Instead of or in addition to weight sensors, any of the above described sensor technologies and techniques may also be used in the above implementations. Even if the swing-arms, specifically their telescopic and/or pivotal movements were manual or fixed or temporarily non-functional, then the lift can still instruct the vehicle to adjust its position so that it can engage with the vehicle at the prescribed lifting points.

Furthermore, the above functionality of lifts to give instructions to the autonomous vehicles can also be used in conjunction with other types of fixed lifts. These include but are not limited to drive-on as well as frame-engaging fixed lifts. These may still be in-ground or surface-mounted. Examples include but are not limited to drive-on scissors, drive-on multi-post, drive-on parallelograms and drive-on alignment (used for wheel alignment services), etc. Further examples include frame-engaging surface-mounted scissors, frame-engaging in-ground scissors, etc. The reader is referred to the website of Automotive Lift Institute (www.autolift.org) for further information on some exemplary types of lifts that may be supported. Any of these fixed lifts is able to guide/instruct an autonomous vehicle to drive, position and stop itself precisely at a location in the service bay for proper engagement and for safe lifting to occur, based on the instant teachings.

Of course, the engagement locations for the above types of fixed lifts will depend on the type of the lift. For example, for a frame-engaging lift, they are the locations on the frame/chassis of the vehicle on its underside where the lift platforms make contact. For a drive-on lift they may simply be the bottom of the vehicle tires because the vehicle simply drives onto the runways which make contact with the tires. In summary, within the instant scope, the engagement locations where the instant lifts make contact with the vehicle may vary according to the design of the lift and/or the vehicle itself.

Weight sensors and their previously described functionality may also be utilized for secure engagement for the above types of fixed lifts. For example, for a drive-on lift, weight sensors associated with the runways may be used to determine the weight distribution of the vehicle. If the weight distribution is improper then, the lift is lowered and the vehicle is instructed to adjust its position as per earlier teachings. Again, the same capability extends to semi or non-autonomous vehicle by providing the appropriate instructions to the vehicle driver on a console. The console may be in the service bay or in the vehicle.

The above communication of the lifts with the autonomous vehicle may be done in conjunction with the previously taught guidance system. In such a scenario, it is the portion of the guidance system residing on the lift that communicates with the autonomous vehicle. Of course, in addition or instead of guiding/instructing the autonomous vehicles for accurate engagement, the lifts may also be able to provide to the autonomous vehicle the coordinates of the path of the service bay where they are located. This may also be done in conjunction with the guidance system as previously discussed.

Fleets of automotive vehicles, whether autonomous or otherwise, provide interesting applications for the present technology. Examples of such fleets include but are not limited to the fleets of car rental companies such as Hertz, Avis, etc. as well as other fleets which are or may become privately owned such as Uber, Lyft, Tesla and other vehicles of the like. Telematics based fleet management software and solutions such as Fleetmatics, Telogis, etc. perform a key role in ensuring proper and timely maintenance of the vehicles and higher availability and longevity of such fleets. Telematic and onboard sensors on the vehicles automatically and/or predictively determine when service should be scheduled within a range of time or a part on the vehicle needs to be replaced. In addition, they can determine the schedule for routine maintenance of the vehicles, as well as any other preemptive repairs.

In an interesting application of the present technology, the present lift systems' guidance systems interface with or directly integrated with such a fleet management solution via an application programming interface (API). Such an API is typically provided by the manufacturer of the fleet management software/solution. Preferably, it is guidance system 1540 of FIG. 20 that does the interfacing or is integrated with. By interfacing with the fleet management solution, guidance system 1540 can proactively know if autonomous car/vehicle, such as car 1522 is scheduled to arrive at facility 1500.

Guidance system 1540 can then ensure that appropriate lifts at a suitable service bay are available as quickly as possible after the arrival of vehicle 1522 for its quick servicing. Similarly, it can compute path 1508 for vehicle 1522 inside service center 1500 in advance and communicate it to autonomous vehicle 1522, so the vehicle can travel to its intended service bay 1502 without delay. As already noted, in a useful variation, vehicle 1522 itself locates an available service bay, such as bay 1502 in service center 1500 and drives to it.

Furthermore, vehicle maintenance can be directly linked to lift availability. For example, an autonomous vehicle of a fleet such as Lyft or Uber may not have a scheduled job/ride for some time. Now, if the vehicle is scheduled for maintenance based on diagnostic factors or based on timing/mileage of last maintenance, and if there is an available lift matching the vehicle in a service center within a configurable distance then the autonomous vehicle automatically travels to that lift in the corresponding service bay and is serviced. It does so by coordinating with its fleet management system working in conjunction with the lift guidance system, with the former communicating with the later to schedule and notify about the arrival of the vehicle in advance. The configurable distance, for example, can be three miles. The above scenario further improves the automation of the fleet maintenance process and reduces vehicle and lift downtime.

Note that in the above embodiments employing autonomous vehicles, the degree of autonomy of the vehicles can be varied. The autonomy/automation is typically classified in levels from level 0 to level 5, as will be appreciated by skilled artisans. As such, the present variations interfacing with a fleet management solution, also work with manual or non-autonomous or level 0 vehicles. As such, the driver of the vehicle drives the vehicle to the service center and to the service bay.

In such a scenario also, the guidance system will know the arrival of the vehicle in the service center in advance. It can then ensure the availability of appropriate lifts. Depending on a specific implementation, it may also compute the path to the service bay and communicate it to the vehicle, specifically to its driver, so he/she can safely bring and park the car in service the bay. By extension, above teachings are also easily conceivable for semi-autonomous vehicles at any of the intermediate levels between level 0 and level 5.

In view of the above teaching, a person skilled in the art will recognize that the apparatus and methods of invention can be embodied in many different ways in addition to those described without departing from the principles of the invention. Therefore, the scope of the invention should be judged in view of the appended claims and their legal equivalents.

What is claimed is:

1. A motorized mobile lift system comprising:
   (a) a plurality of mobile lifts each comprising a motorized transport mechanism;
   (b) each of said plurality of mobile lifts further comprising an engagement mechanism for engaging with one of a plurality of axled wheels of a vehicle;
   (c) a guidance system for assigning available mobile lifts from said plurality of mobile lifts to at least four of said plurality of said axled wheels of said vehicle and thus obtaining assigned mobile lifts;
(d) said guidance system also responsible for guiding said transport mechanism of each of said assigned mobile lifts for transporting it to an engagement location for said engaging; and
(e) a control system for lifting and lowering said vehicle by controlling each of said mobile lifts after said engaging;
wherein said guidance system comprises a microprocessor executing program instructions stored in a non-transitory storage medium, and
wherein at least one of said plurality of mobile lifts communicates with said vehicle to drive, position and stop said vehicle where said lifting can occur safely.

2. The system of claim 1 wherein said mobile lifts communicate with each other in conjunction with at least one of said guidance system and said control system via at least one of a wired mode and a wireless mode of communication.

3. The system of claim 1 wherein an Application Programming Interface (API) is used to integrate with one or both of a backend system and an onboard diagnostics system.

4. The system of claim 1 wherein said transporting is performed along a designated path in a service center.

5. The system of claim 1 wherein said engaging occurs after one of a manual adjustment and a motorized adjustment of said engagement mechanism according to the diameter of said one of said plurality of said axled wheels.

6. A lift system comprising:
(a) a plurality of fixed lifts, each comprising an engagement mechanism containing swing-arms with lift pads for engaging at engagement locations underneath a vehicle;
(b) a guidance system for guiding said engagement mechanism in said engaging at said engagement locations within a prescribed tolerance; and
(c) said vehicle having one or more sensors in at least one of an integrated and a retrofitted manner, for assisting said guidance system in said guiding;
(d) a control system for lifting and lowering said vehicle by synchronizing each of said plurality of fixed lifts;
wherein said guidance system comprises a microprocessor executing program instructions stored in a non-transitory storage medium, and
wherein at least one of said plurality of lifts communicates with said vehicle to drive, position and stop said vehicle where said lifting can occur safely.

7. The system of claim 6 wherein a service bay where said vehicle is parked also has one or more sensors for said assisting in said guiding.

8. The system of claim 6 further comprising an interface with at least one of a backend system and an onboard diagnostics system.

9. The system of claim 6 wherein the coordinates of said engagement locations are determined based on at least one parameter of said vehicle, said at least one parameter selected from the group consisting of a vehicle make, a vehicle model, a vehicle length, a vehicle width, a tire diameter and an axle location.

10. The system of claim 6 wherein said one or more sensors are used for communicating said engagement locations to said guidance system for said assisting in said guiding.

11. A lift system comprising:
(a) a plurality of lifts, each comprising an engagement mechanism for engaging at one or more engagement locations of a vehicle;
(b) a guidance system for guiding said engaging at said one or more engagement locations;
(c) said vehicle having one or more sensors in at least one of an integrated and a retrofitted manner, for assisting said guidance system in said guiding;
(d) a control system for lifting said vehicle by controlling said plurality of lifts after said engaging;
wherein said guidance system comprises a microprocessor executing program instructions stored in a non-transitory storage medium, and
wherein said at least one of said plurality of lifts communicates with said vehicle to drive, position and stop said vehicle where said lifting can occur safely.

12. The system of claim 11 wherein at least one of said plurality of lifts is a fixed lift selected from the group consisting of a frame-engaging lift, a drive-on lift, an in-ground lift and a surface-mounted lift.

13. The system of claim 11 further comprising an Application Programming Interface (API) to integrate with one or both of a backend system and a system onboard said vehicle.

14. The system of claim 11 wherein at least one of said plurality of lifts is a motorized mobile column lift.

15. The system of claim 11 wherein at least one of said plurality of lifts is a fixed lift with two swing-arms having lift pads, and said one or more engagement locations are lifting points underneath said vehicle where said lift pads make contact within a prescribed tolerance.

16. A method of operating a plurality of motorized mobile lifts, said method comprising the steps of:
(a) providing each of said plurality of mobile lifts with a motorized transport mechanism;
(b) providing each of said plurality of mobile lifts with an engagement mechanism for engaging with one of a plurality of axled wheels of a vehicle, said engaging performed at an engagement location;
(c) providing a guidance system for obtaining assigned mobile lifts by assigning available mobile lifts from said plurality of mobile lifts to at least four of said plurality of said axled wheels of said vehicle;
(d) configuring said guidance system for also guiding said transport mechanism of each of said assigned mobile lifts for transporting it to and from said engagement location; and
(e) providing a control system for controlling each of said mobile lifts for lifting after said engaging;
whereby said guidance system comprises a microprocessor executing program instructions stored in a non-transitory storage medium; and
communicating, via at least one of said plurality of lifts, with said vehicle to drive, position and stop said vehicle where said lifting can occur safely.

17. The method of claim 16 further interfacing with a fleet management system.

18. The method of claim 16 allowing one of a manual and a motorized adjusting of said engagement mechanism according to a size of said one of said plurality of said axled wheels.

19. The method of claim 18 utilizing at least one of a make and a model of said vehicle in said motorized adjusting of said engagement mechanism.

20. The method of claim 18 utilizing at least one of sensors and a computer vision pipeline for at least one of said guiding by said guidance system in said step (d) and said motorized adjusting of said engagement mechanism.

21. A method of operating a plurality of lifts, said method comprising the steps of:
   (a) providing each of said plurality of lifts with an engagement mechanism for engaging with a vehicle;
   (b) providing a guidance system for guiding said engagement mechanism for facilitating said engaging;
   (c) providing said vehicle with one or more sensors in at least one of an integrated and a retrofitted manner, for assisting said guidance system in said guiding;

whereby said guidance system comprises a microprocessor executing program instructions stored in a non-transitory storage medium; and communicating, via at least one of said plurality of lifts, with said vehicle to drive, position and stop said vehicle where said lifting can occur safely.

22. The method of claim 21 further interfacing with a fleet management system.

23. The method of claim 21 providing said plurality of lifts to be motorized mobile column lifts and configuring said guidance system to further guide a transport mechanism of at least one of said motorized mobile column lifts to an engagement location for said engaging.

24. The method of claim 21 providing said plurality of lifts to be fixed lifts with swing-arms, each swing-arm having a lift pad, and configuring said guidance system to guide said lift pad on said each swing-arm to a lifting point underneath said vehicle, for said engaging within a prescribed tolerance.

25. The method of claim 21 whereby said vehicle is autonomous.

* * * * *